(12) United States Patent
Daniels

(10) Patent No.: US 10,698,492 B2
(45) Date of Patent: *Jun. 30, 2020

(54) WEARABLE ELECTRONIC, MULTI-SENSORY, HUMAN/MACHINE, HUMAN/HUMAN INTERFACES

(71) Applicant: John James Daniels, Madison, CT (US)

(72) Inventor: John James Daniels, Madison, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/452,611

(22) Filed: Jun. 26, 2019

(65) Prior Publication Data

US 2019/0346925 A1     Nov. 14, 2019

Related U.S. Application Data

(62) Division of application No. 15/562,752, filed on Sep. 28, 2017, now Pat. No. 10,437,335.

(51) Int. Cl.
*G06F 3/01*     (2006.01)
*G06F 1/16*     (2006.01)

(52) U.S. Cl.
CPC .............. *G06F 3/016* (2013.01); *G06F 1/163* (2013.01); *G06F 3/011* (2013.01); *G06F 3/014* (2013.01); *G06F 3/015* (2013.01)

(58) Field of Classification Search
CPC .......... G06F 1/163; G06F 3/011; G06F 3/014; G06F 3/015; G06F 3/016

USPC ...................................................... 340/407.2
See application file for complete search history.

(56) References Cited

U.S. PATENT DOCUMENTS

| 2008/0103639 A1* | 5/2008 | Troy | ................... | G05D 1/0027 |
| | | | | 701/2 |
| 2014/0240103 A1* | 8/2014 | Lake | ..................... | G08C 17/02 |
| | | | | 340/12.5 |

* cited by examiner

*Primary Examiner* — Joseph H Feild
*Assistant Examiner* — Sharmin Akhter
(74) *Attorney, Agent, or Firm* — John J. Daniels, Esq.

(57) ABSTRACT

A wearable Haptic Human Machine Interface (HHMI) receives electrical activity from muscles and nerves of a user. An electrical signal is determined having characteristics based on the received electrical activity. The electrical signal is generated and applied to an object to cause an action dependent on the received electrical activity. The object can be a biological component of the user, such as a muscle, another user, or a remotely located machine such as a drone. Exemplary uses include mitigating tremor, accelerated learning, cognitive therapy, remote robotic, drone and probe control and sensing, virtual and augmented reality, stroke, brain and spinal cord rehabilitation, gaming, education, pain relief, entertainment, remote surgery, remote participation in and/or observation of an event such as a sporting event, biofeedback and remotality. Remotality is the perception of a reality occurring remote from the user. The reality may be remote in time, location and/or physical form. The reality may be consistent with the natural world, comprised of an alternative, fictional world or a mixture of natural and fictional constituents.

19 Claims, 33 Drawing Sheets

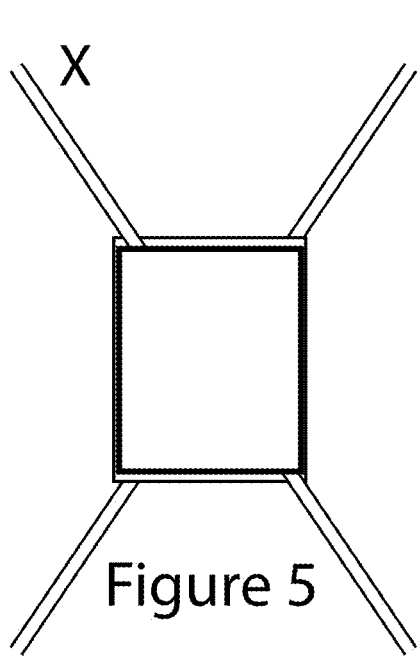
Figure 5
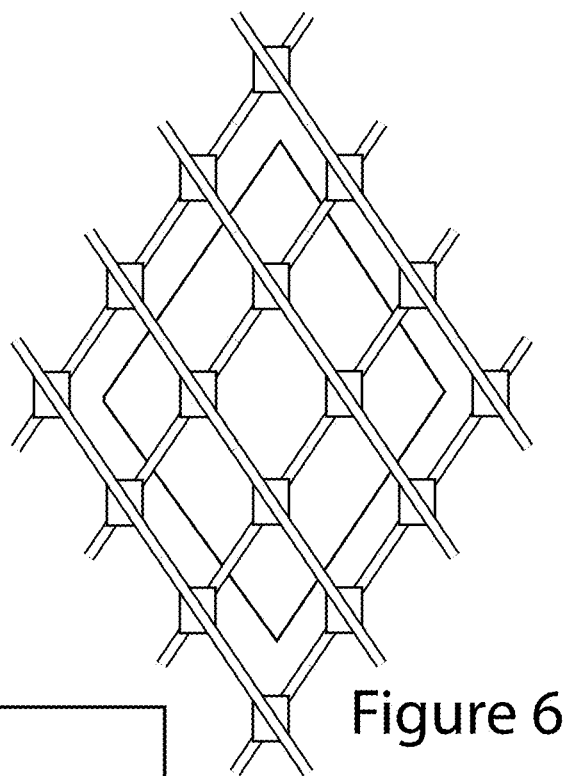
Figure 6
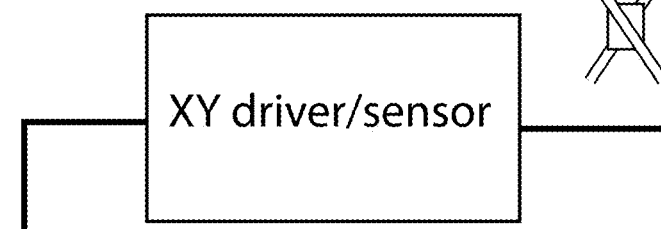
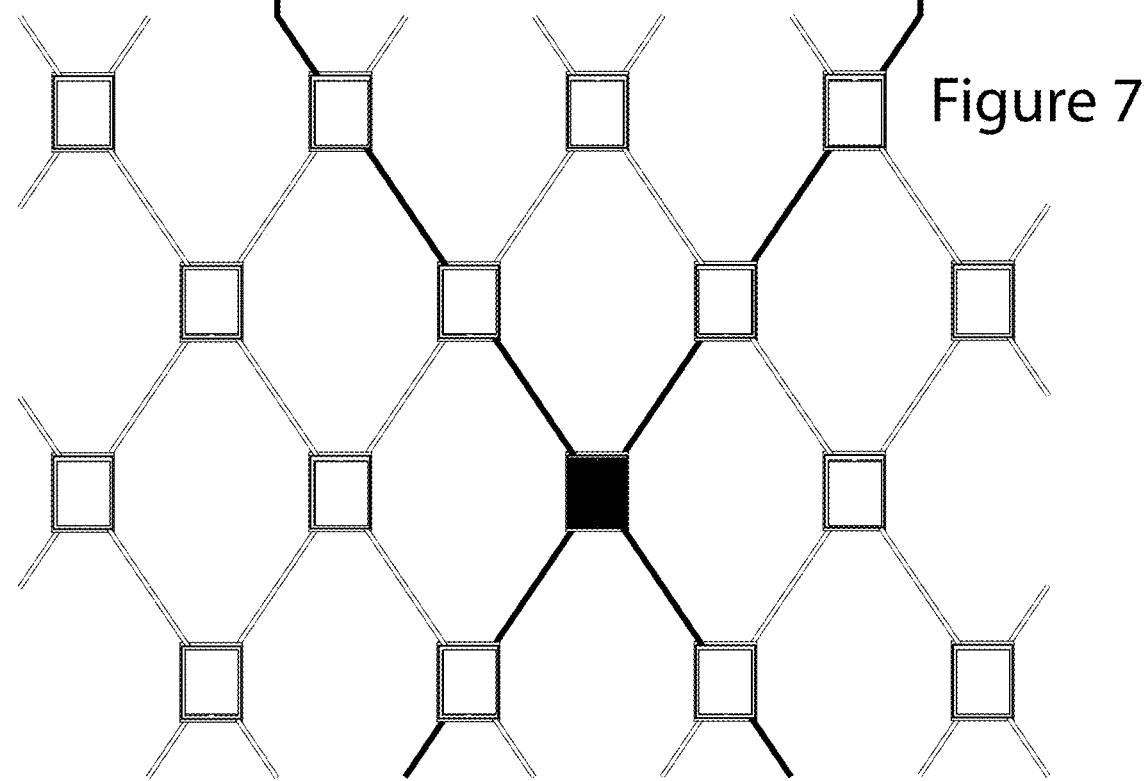
Figure 7

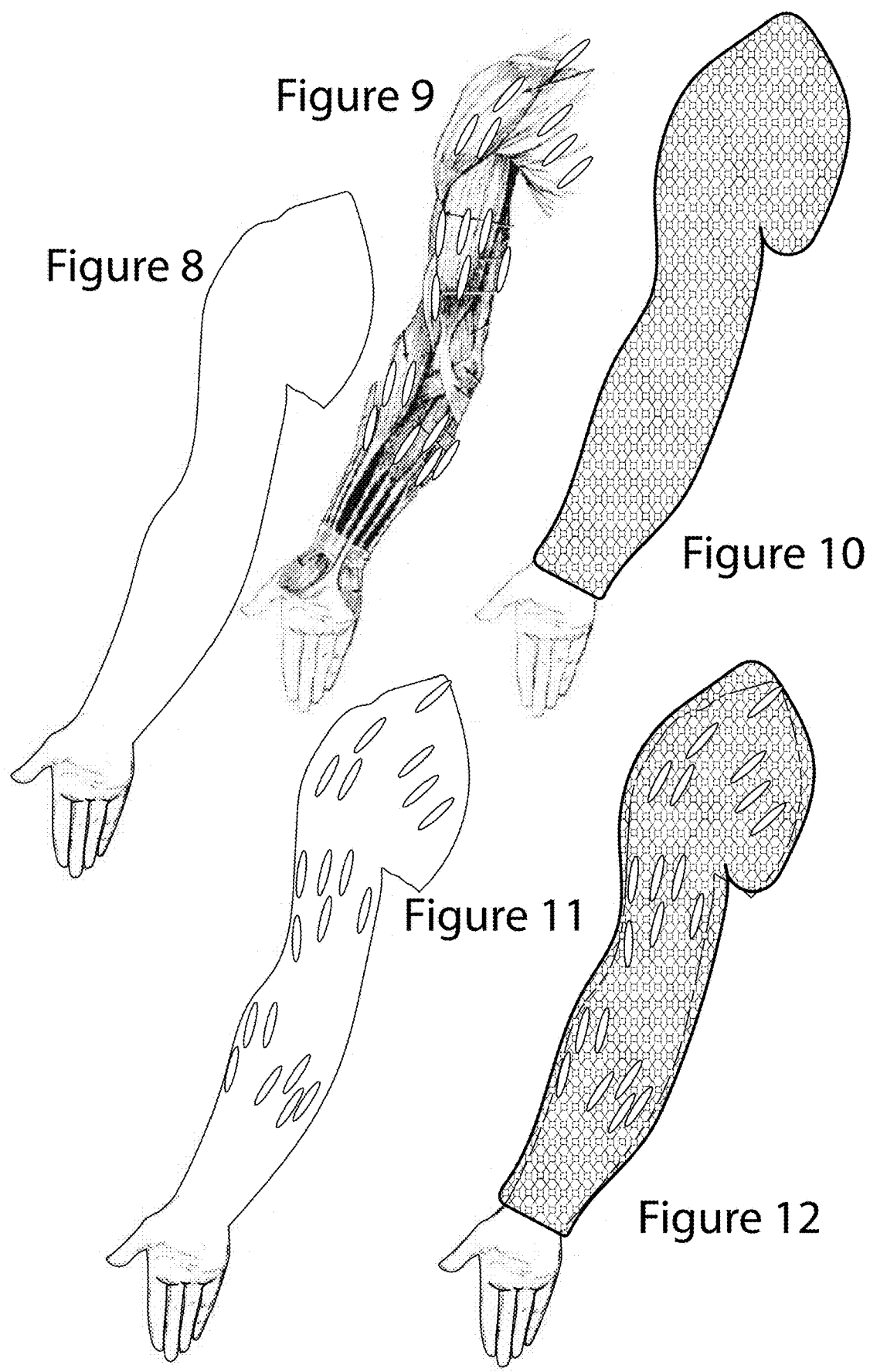

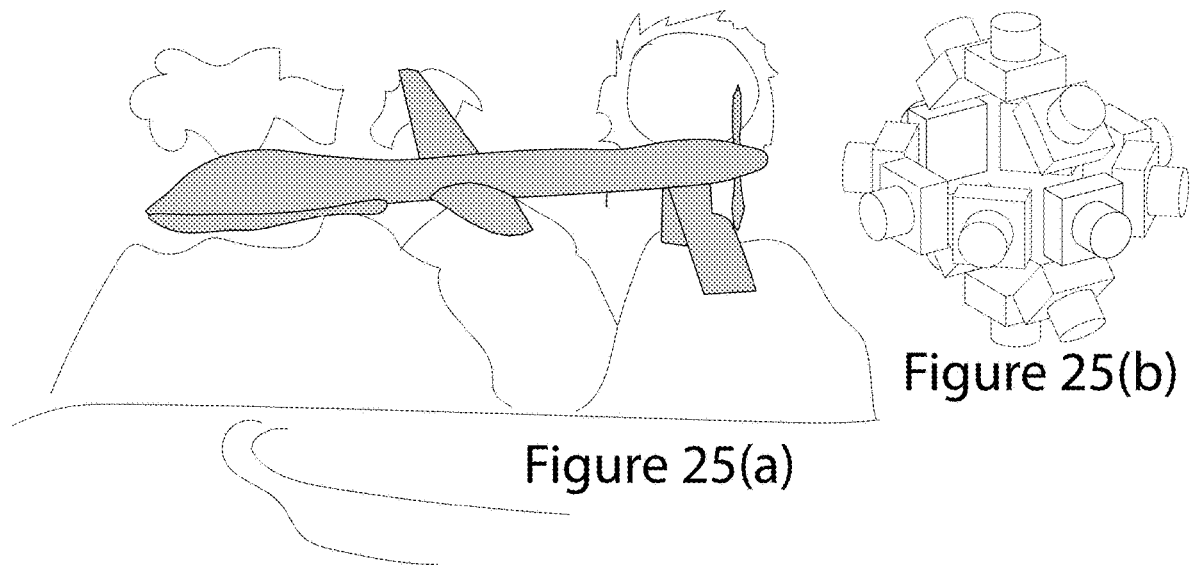
Figure 25(b)
Figure 25(a)
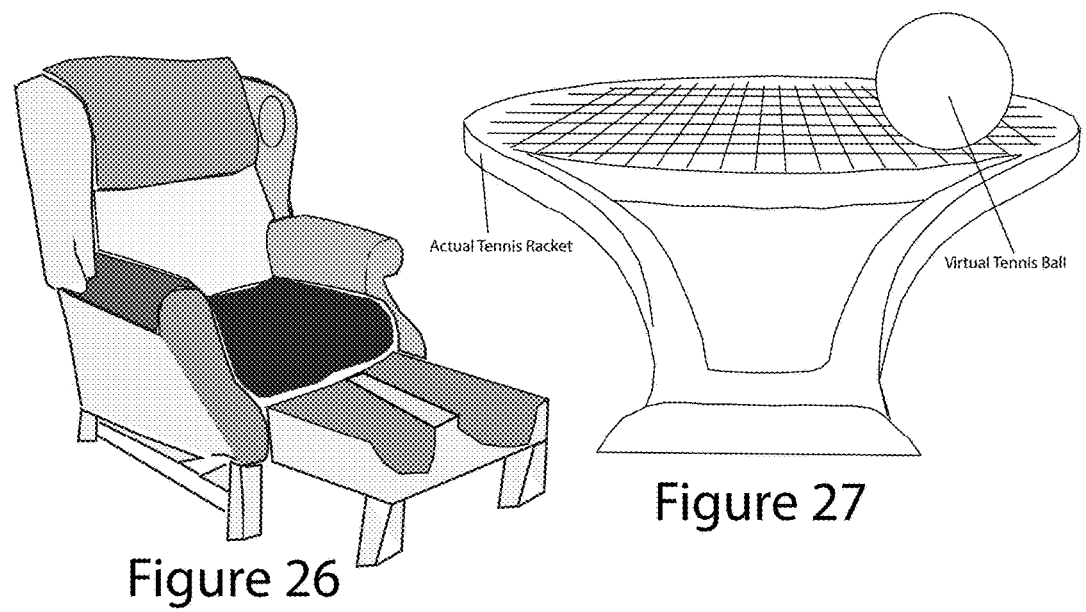
Figure 26
Figure 27

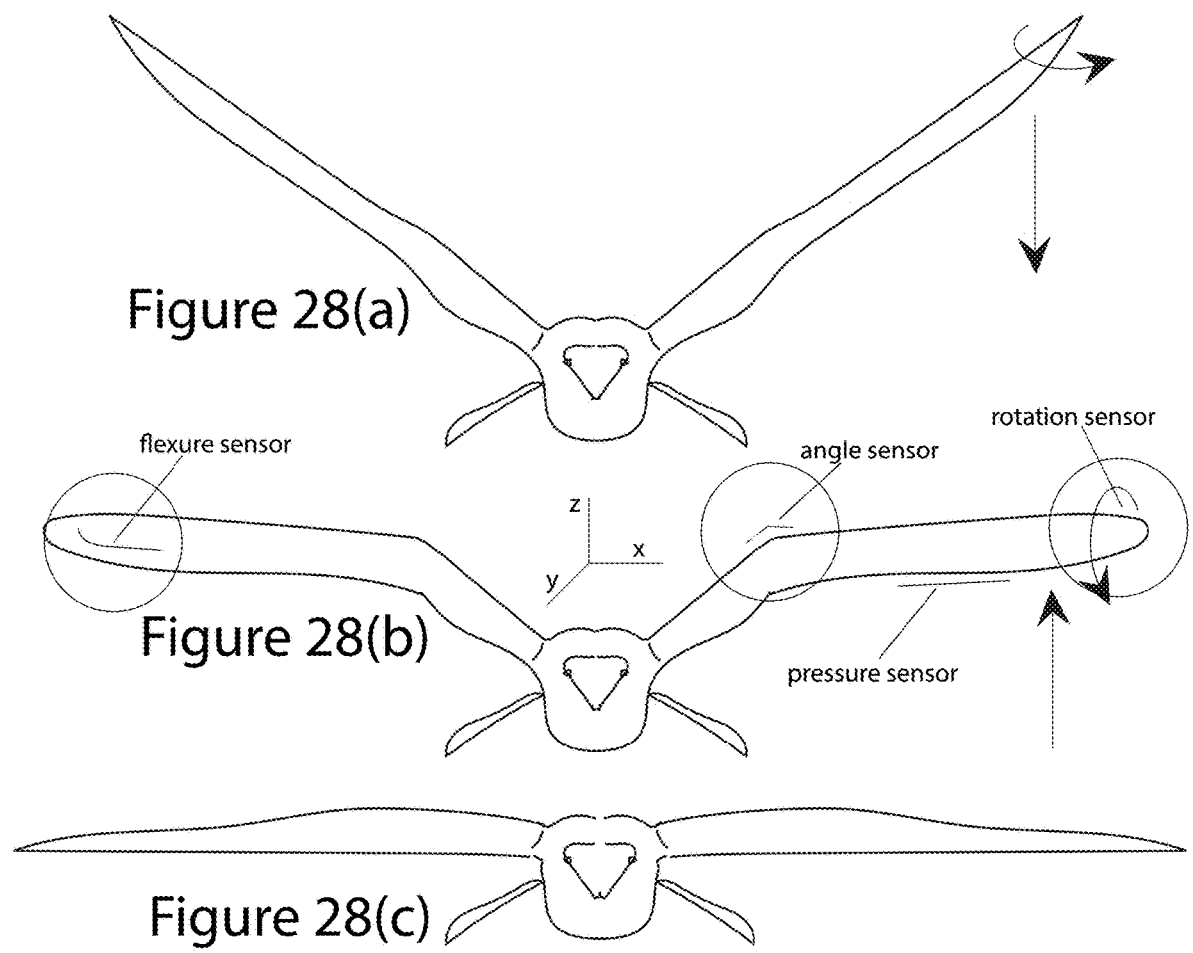
Figure 28(a)
Figure 28(b)
Figure 28(c)
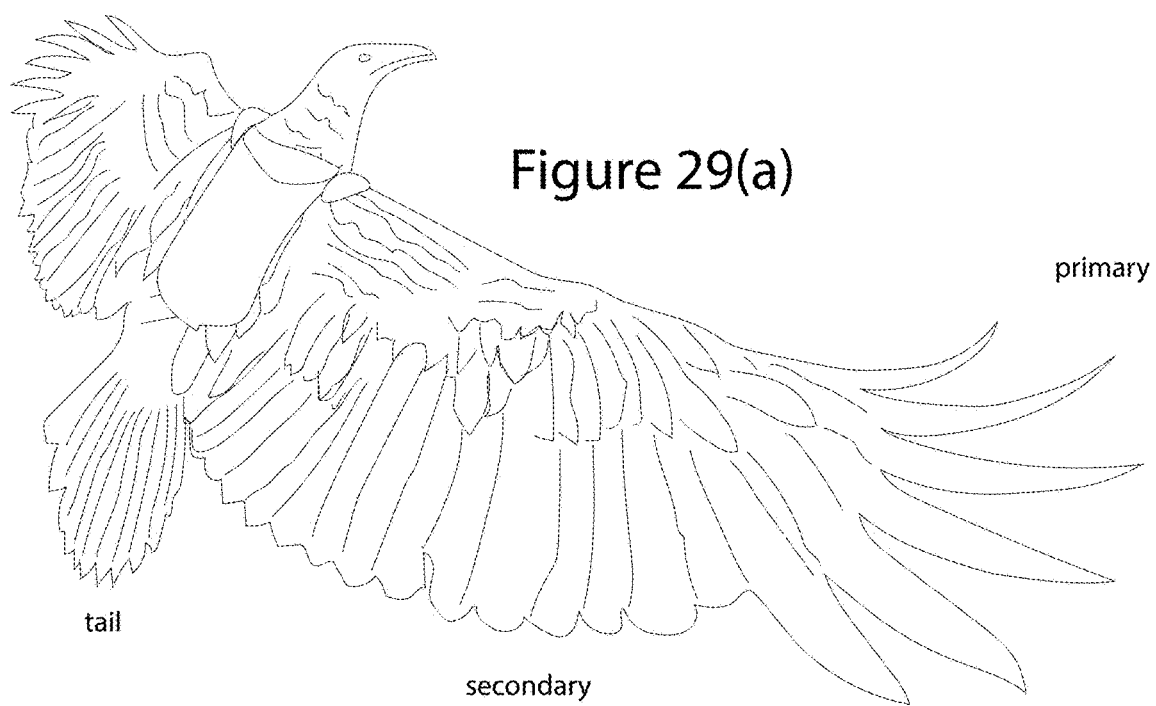
Figure 29(a)

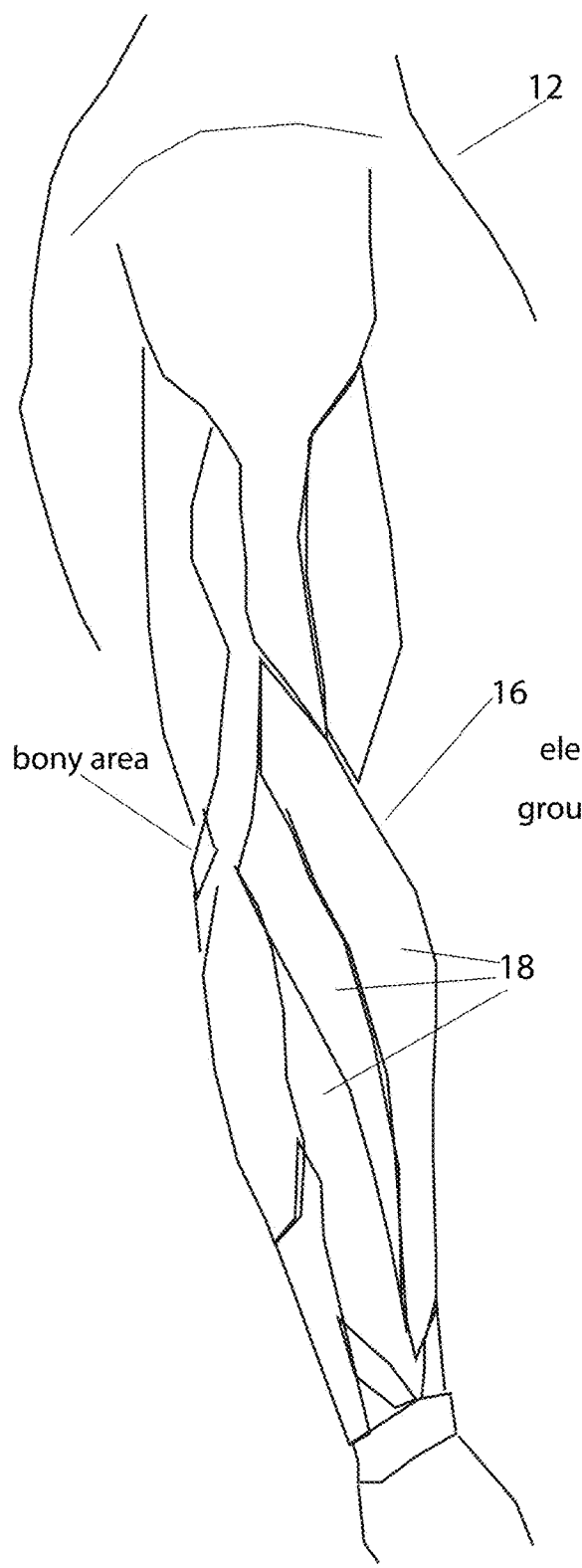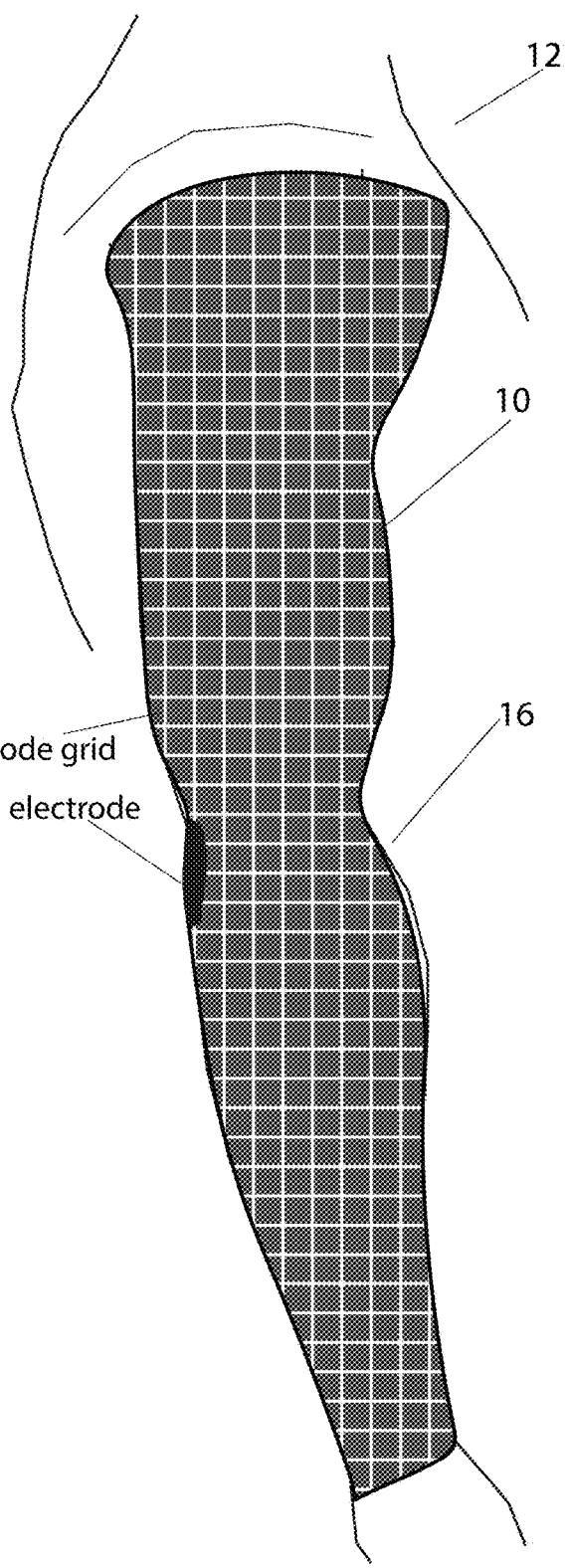
Figure 32                    Figure 33

Electrode Equivalent Circuit

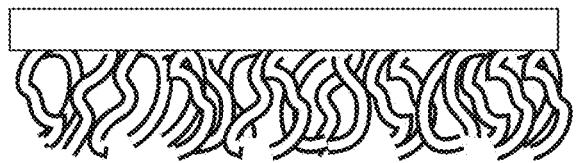
Figure 47
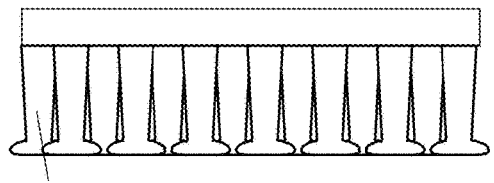
14  Figure 48
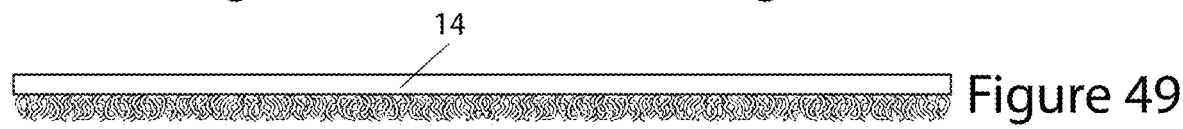
Figure 49
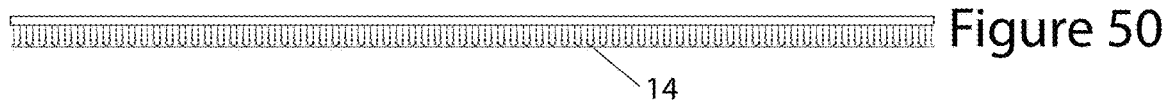
Figure 50
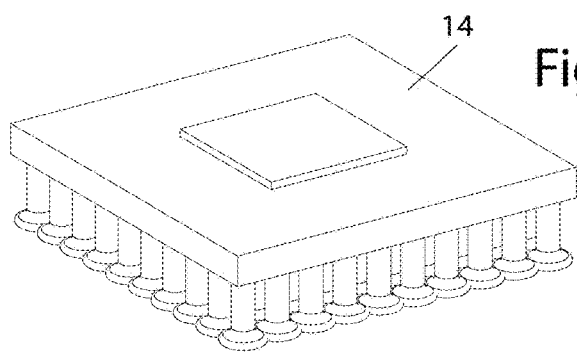
Figure 51
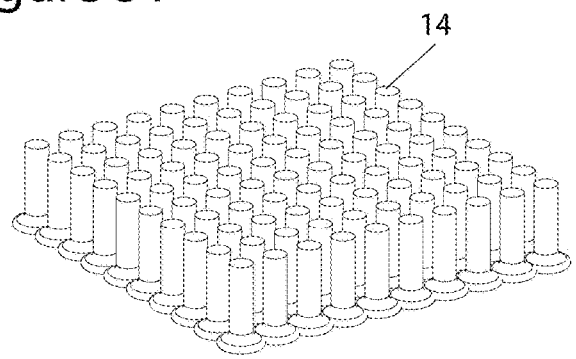
Figure 52
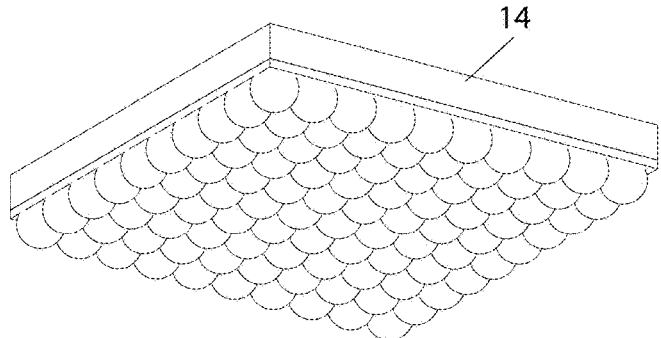
Figure 53
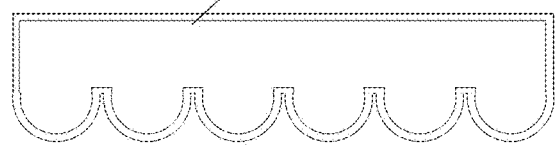
Figure 54

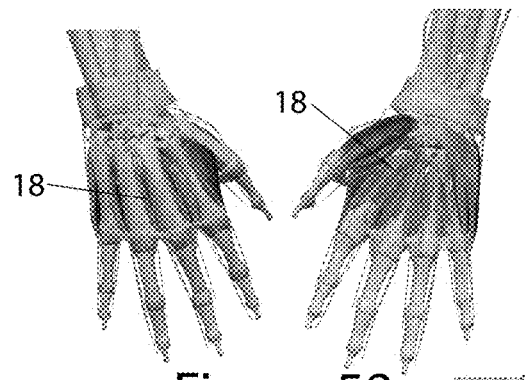
Figure 58
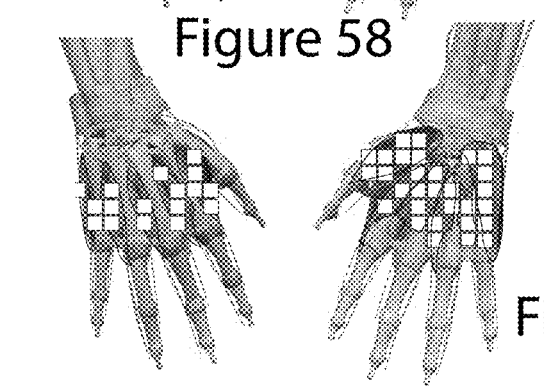
Figure 60
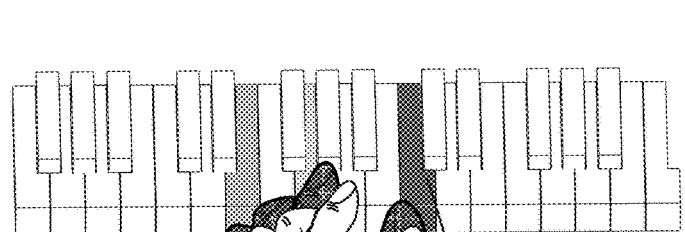
Figure 59
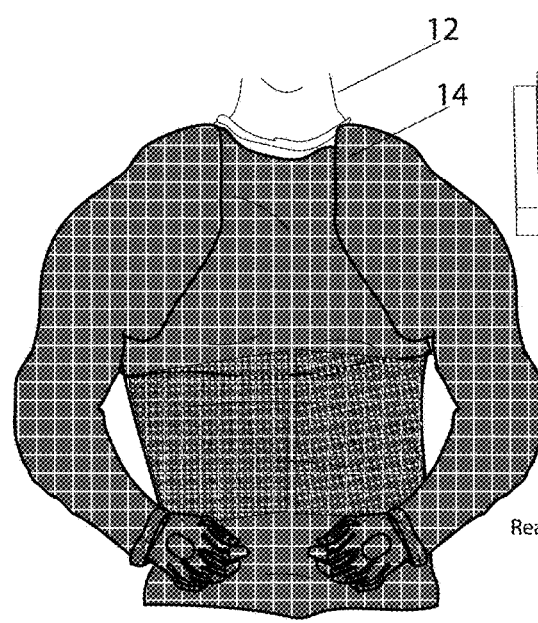
Figure 61
Figure 62 speed, distance and altitude
speed and distance resistance is dependent on angle, user weight, gps data (kinetic energy), speed

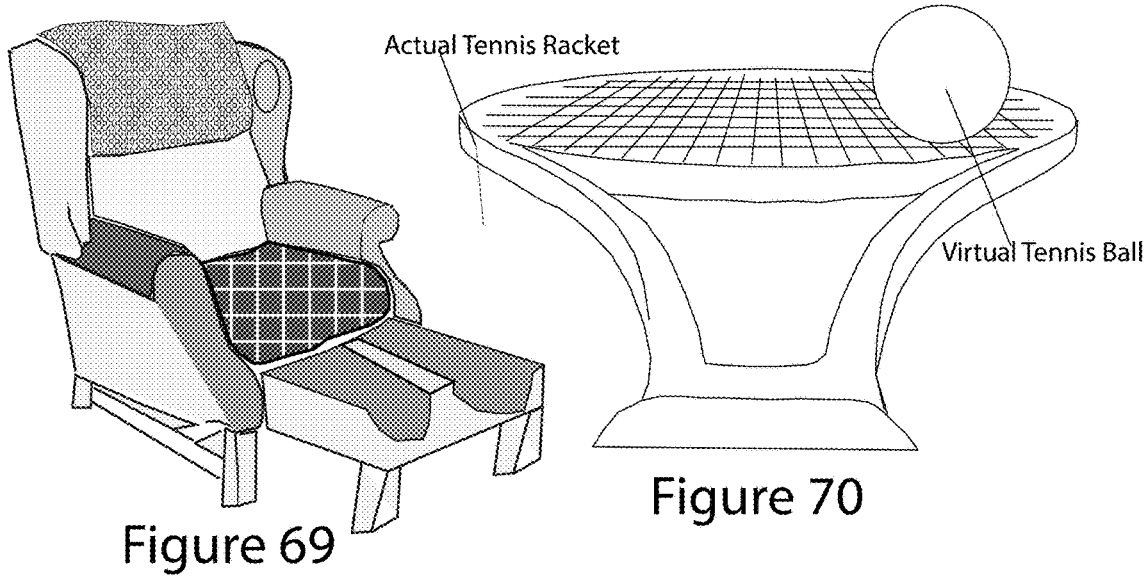
Figure 69
Figure 70
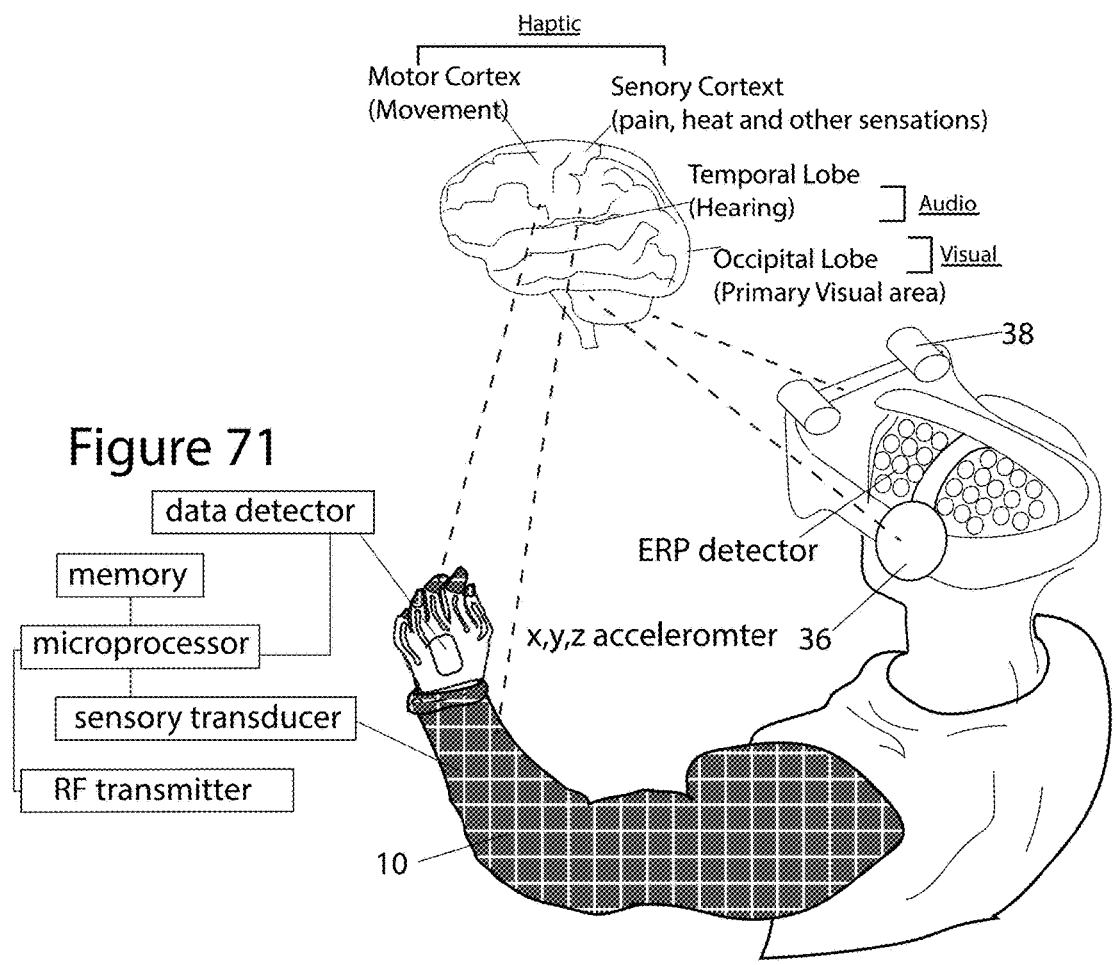
Figure 71

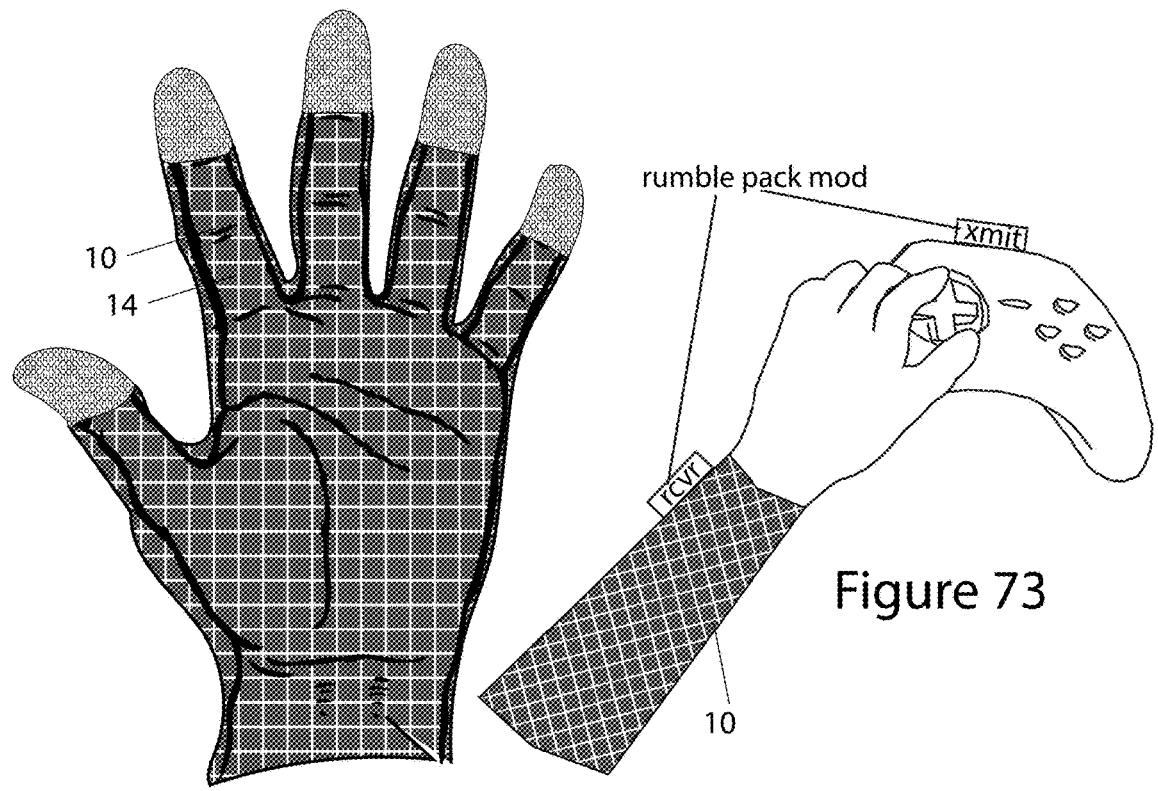
Figure 72
Figure 73
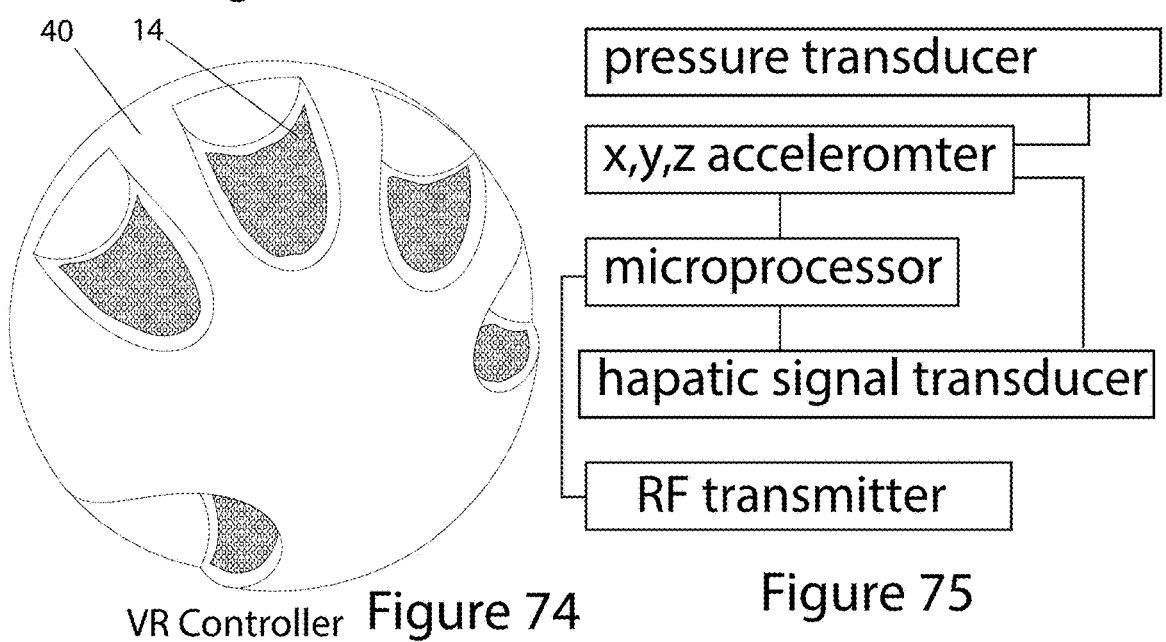
VR Controller Figure 74
Figure 75

Formation Flying

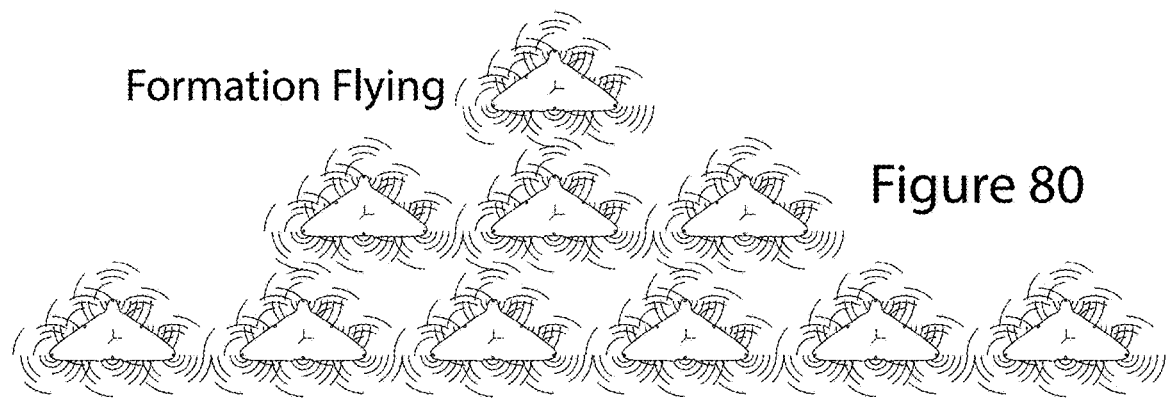

- Begin Data Collection — Step One
- Collect First Data Set of a Sequence of Sensory Activity — Step Two
- Has Event to Be Collected Ended? — Step Three
- Y
- Collect Next Data Set of a Sequence of Sensory Activity — Step Four
- N
- End Collection — Step Five

Figure 82

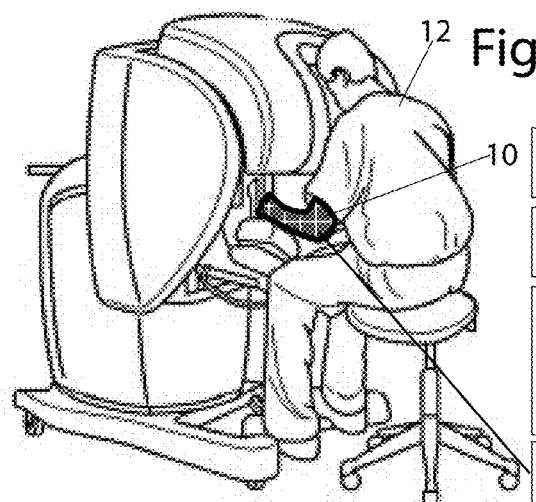

Remote surgery:

| Detect a force resulting from a robotic surgical operation |
| Generate a transmittable signal dependon on the detected force |
| Receive the transmittable signal by an appliance in physical communication with a body part of a user performing the robotic surgical procedure |
| Apply haptic cues using the HHMI dependent on the received transmittable signal to the body part of the user |

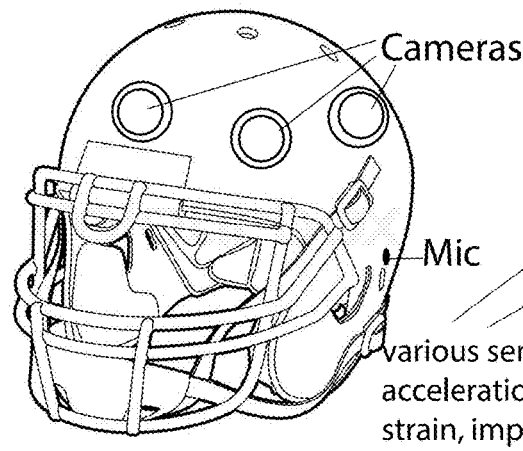
Figure 84
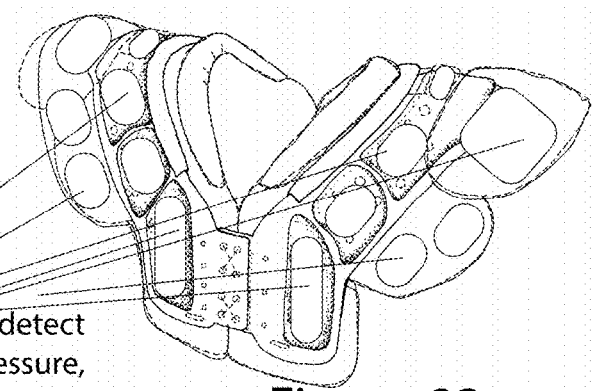
Figure 83
Figure 85
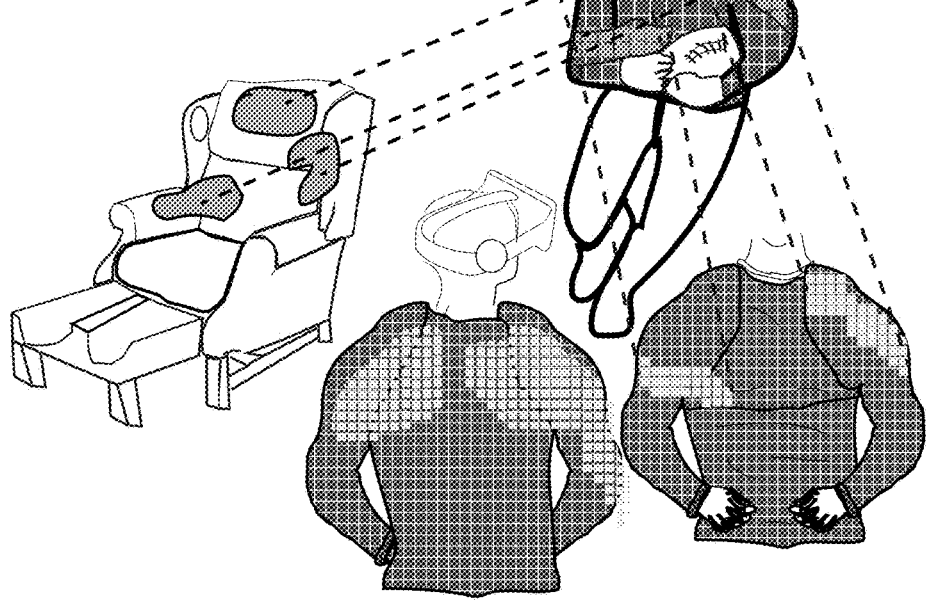

Figure 86
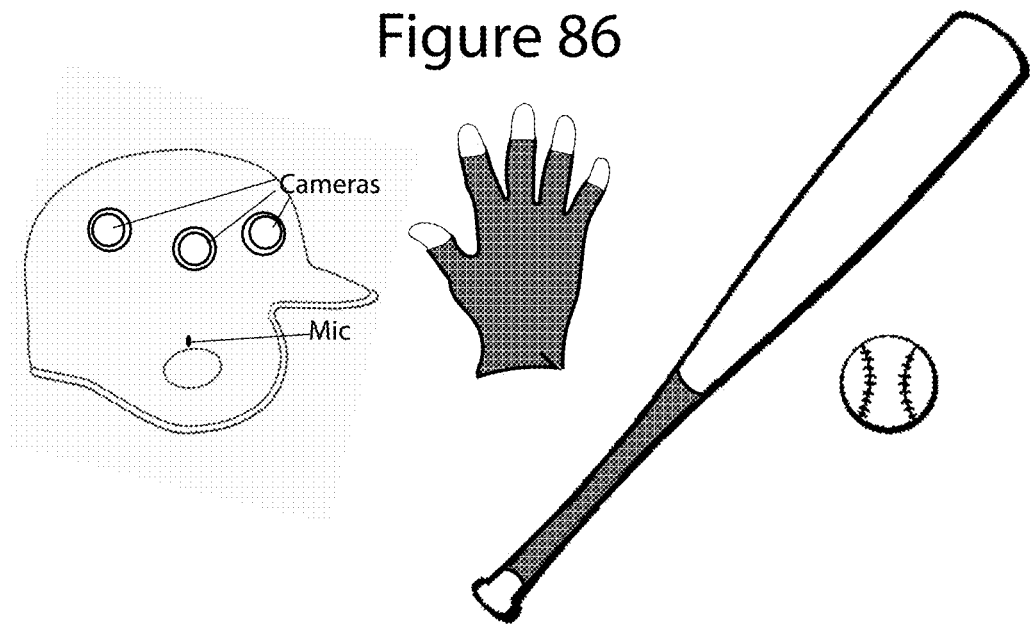
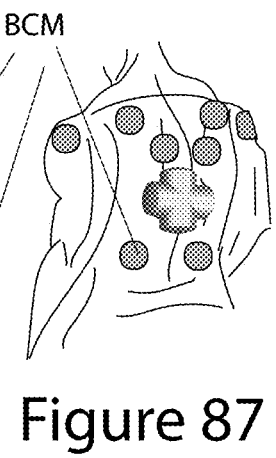
Figure 87
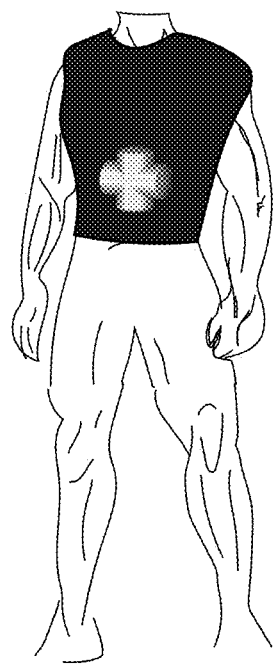
Figure 88

WEARABLE ELECTRONIC, MULTI-SENSORY, HUMAN/MACHINE, HUMAN/HUMAN INTERFACES

CROSS REFERENCE TO RELATED APPLICATIONS

This application is a Divisional Patent Application of U.S. Utility patent application Ser. No. 15/562,752 filed Sep. 28, 2017 which is the US National Stage Application of PCT Application PCT/2016/026930, filed 11 Apr. 2016 which claims priority of U.S. Provisional Patent Application No. 62/147,016, filed Apr. 14, 2015, entitled Multi-Sensory Human Machine, Human Human Interfaces and U.S. Provisional Patent Application No. 62/253,767, filed Nov. 11, 2015, entitled Wearable Electronic Human Machine Interface for Mitigating Tremor, Accelerated Learning, Cognitive Therapy, Remote Control, and Virtual and Augmented Reality; and is related to U.S. Utility patent application Ser. No. 14/269,133, filed on May 3, 2014, entitled Accelerated Learning, Entertainment and Cognitive Therapy Using Augmented Reality Comprising Haptic, Auditory, and Visual Stimulation which is the Utility application of U.S. Provisional Application No. 61/818,971, filed on May 3, 2013, entitled Accelerated Learning, Entertainment and Cognitive Therapy Using Augmented Reality Comprising Haptic, Auditory, and Visual Stimulation. These applications are all incorporated herein in their entirety.

TECHNICAL FIELD

The present invention relates to a remote reality ("remotality") interface between humans and machines, and between humans and humans. More particularly, the present invention pertains to a wearable Haptic Human Machine Interface (HHMI) for uses including, but not limited to, mitigating tremor, accelerated learning, cognitive therapy, remote robotic, drone and probe control and sensing, virtual and augmented reality, stroke, brain and spinal cord rehabilitation, gaming, education, pain relief, entertainment, remote surgery, remote participation in and/or observation of an event such as a sporting event, and biofeedback.

BACKGROUND OF THE INVENTION

This section is intended to provide a background or context to the inventions disclosed below.

The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Virtual Reality may be defined as a computer-generated simulation of a three-dimensional image or environment that can be interacted with in a seemingly real or physical way by a user using special electronic equipment, such as goggles, headphones and gloves fitted with sensory cue transducers.

Augmented reality may be defined as a live, direct or indirect, view of a physical, real-world environment whose elements are augmented by computer-generated sensory input such as sound, video, graphics or GPS data.

Electromyography (EMG) is the recording of electrical activity in the muscles, typically through a surface transducer in communication with the skin of a user. An evoked potential or evoked response is an electrical potential obtained from the nervous system following a stimulus. Spontaneous potentials may be detected by electroencephalography (EEG), electromyography (EMG), or other electrophysiological recording methods. An event-related potential (ERP) is the measured brain response that is the direct result of a specific sensory, cognitive, or motor event.

Electroencephalography (EEG) is the recording of electrical activity along the scalp. Electrocardiogram (EKG) is the recording of electrical and muscle activity of the heart. Electromyography (EMG) is the recording of electrical activity in the muscles, typically through a surface transducer in communication with the skin of a user. An evoked potential or evoked response is an electrical potential obtained from the nervous system following a stimulus. Spontaneous potentials as detected by electroencephalography (EEG), electromyography (EMG), or other electrophysiological recording methods. An event-related potential (ERP) is the measured brain response that is the direct result of a specific sensory, cognitive, or motor event.

The use of electrical stimulation for pain relief and muscular training is known, for example, as transcutaneous electrical nerve stimulation (TENS) and can be used to stimulate nerve endings to block pain. Neuromuscular electrical stimulation (NMES) has been used for causing involuntary contractions to build and tone muscles for sports, fitness and rehabilitation.

In the human body, somatic and kinesthetic sensations relate to force and touch. Somatic sensations, for example, are perceived cutaneous (at the skin) and subcutaneous (below the skin). Kinesthetic sensations are more related to mechanical body parts, such as joints and muscles. In general, these sensations can be called haptic feedback which can be used to determine things like geometry, roughness, slipperiness, temperature, weight and inertia (force).

SUMMARY OF THE INVENTION

In accordance with a non-limiting exemplary embodiment, time sequential data is received from a remote transmitter. Time sequential data is defined herein as time series data or information that is generated, recorded, transmitted and/or received as an analog signal and/or as a digital signal, where the data or information varies over time such as in the case of a video signal or audio signal of an event. A plurality of haptic sensory cues are generated capable of being perceived by a user. The haptic sensory cues are received by the user as computer controlled serially generated electrical signals. The electrical signals invoke a perception by the user related to the sense of touch. The haptic sensory cues are generated in synchronization dependent on the time sequential data.

In accordance with another non-limiting embodiment, a plurality of first sensory cues are generated that are capable of being perceived by a user. The plurality of first sensory cues are time sequentially generated and effective for stimulating at least one sense of the user. A plurality of haptic sensory cues are generated capable of being perceived by the user. The haptic sensory cues are received by the user as computer controlled time sequentially generated electrical signals. The electrical signals invoke a perception by the user related to the sense of touch. The haptic sensory cues are generated in synchronization dependent on the time sequentially generated plurality of first sensory cues.

In accordance with another non-limiting exemplary embodiment, a Human Machine interface includes a plurality of conductive patches for applying an electrical signal through the skin of a user to stimulate electrical signal receptors. A signal generator generates a plurality of haptic cues in the form of electrical signals applied to the skin of the user through the plurality of conductive patches. The plurality of haptic sensory cues are capable of being perceived by a sense of touch or muscle movement of the user.

In accordance with another non-limiting exemplary embodiment, a plurality of haptic sensory cues are generated capable of being perceived by a user. The plurality of haptic sensory cues are dependent on a determined condition of at least one movable member of a performing body performing an event. The plurality of haptic sensory cues are effective for stimulating a touch processing center of a brain of the user based on the determined condition. A plurality of visual sensory cues are generated capable of being displayed to the user on a video display device. The visual sensory cues provide a virtual visual indication to the user of a position of at least one of the at least one moveable member and the performing body. The visual sensory cues are effective for stimulating the visual processing center of the brain of the user. The visual sensory cues are synchronized with the haptic sensory cues so that the position is virtually visually indicated in synchronization with the haptic sensory cues, and so that the visual processing center is stimulated with the visual sensory cues in synchronization with the haptic sensory cues stimulating the touch processing center.

Remotality, in accordance with the inventive aspects described herein, is the perception of a reality occurring remote from the user. The reality may be remote in time, location and/or physical form. The reality may be consistent with the natural world, comprised of an alternative, fictional world or a mixture of natural and fictional constituents. In accordance with exemplary embodiments, the immersion of the user into the remotality experience may be as complete as practical, such as is the goal of some virtual reality systems, or it may be a partial immersion, such as is the goal of some augmented reality systems.

In accordance with an aspect of the invention, a plurality of haptic sensory cues are generated capable of being perceived by a user. The haptic sensory cues are received by the user as computer controlled serially generated electrical signals. The electrical signals invoke at least one of an involuntary body part movement and a perception by the user. The involuntary body part movement causing at least an urging towards at least one of a predetermined motion and a predetermined position of the body part dependent on the computer controlled serially generated electrical signals.

The perception by the user may have a predetermined somatosensory sensation dependent on the computer controlled serially generated electrical signals. The haptic sensory cues may invoke the perception by stimulating a somatosensory system of a user comprising at least one receptor including thermoreceptors, photoreceptors, mechanoreceptors and chemoreceptors to cause the user to perceive an experience of at least one of proprioception (e.g., body part position and strength of movement), mechanoreception (e.g., touch), thermoception (e.g., temperature), and nociception (e.g., pain).

In accordance with an aspect of the inventive HHMI, a method is provided for using a human/machine interface. The method includes detecting the onset of an involuntary tremor of a user using a Human Machine interface. Electrical signals are determined having electrical characteristics effective to mitigate the involuntary tremor. The electrical signals are applied to the user using the Human Machine interface.

In accordance with another aspect of the invention, an apparatus comprises at least one processor, and at least one memory including computer program code. The at least one memory and the computer program code are configured to, with the at least one processor, cause the apparatus at least to detect the onset of an involuntary tremor of a user using a Human Machine interface. The electrical signals are determined having electrical characteristics effective to mitigate the involuntary tremor, and the electrical signals are applied to the user using the Human Machine interface.

In accordance with another aspect of the invention, a non-transitory computer readable memory medium stores computer program instructions which, when executed, perform operations for detecting the onset of an involuntary tremor of a user using a Human Machine interface; determining electrical signals having electrical characteristics effective to mitigate the involuntary tremor; and applying the electrical signals to the user using the Human Machine interface.

In accordance with another aspect of the invention, a plurality of first sensory cues are generated capable of being perceived by a user. The plurality of first sensory cue are time-sequentially generated and effective for stimulating at least one sense of the user. A plurality of haptic sensory cues may be generated capable of being perceived by the user. The haptic sensory cues may be received by the user dependent on computer controlled time-sequentially generated electrical signals. The electrical signals invoke a perception by the user related to the sense of touch. The haptic sensory cues may be generated in synchronization dependent on the time-sequentially generated plurality of first sensory cues.

In accordance with another aspect of the invention, a plurality of haptic sensory cues are generated capable of being perceived by a user. The plurality of haptic sensory cues are dependent on a determined condition of at least one movable member of a performing body performing an event. The plurality of haptic sensory cues are effective for stimulating a touch processing center of a brain of the user based on the determined condition. A plurality of visual sensory cues are generated capable of being displayed to the user on a video display device. The visual sensory cues provide a virtual visual indication to the user of a position of at least one of the at least one moveable member and the performing body. The visual sensory cues are effective for stimulating the visual processing center of the brain of the user. The visual sensory cues may be synchronized with the haptic sensory cues so that the position is virtually visually indicated in synchronization with the haptic sensory cues and so that the visual processing center is stimulated with the visual sensory cues in synchronization with the haptic sensory cues stimulating the touch processing center.

In accordance with another aspect of the invention, electrical activity is received from at least one of muscles and nerves of a user. An electrical signal is determined having characteristics based on the received electrical activity. The electrical signal is generated and applied to an object to cause an action dependent on the received electrical activity. The object can be a biological component of the user, another user, or a remotely located machine.

BRIEF DESCRIPTION OF THE DRAWINGS

FIG. 5 shows a transducer connected to x-y conductors;

FIG. 6 shows the relatively smaller signal receiving transducers for sensing and relatively larger signal applying electrodes for applying feedback co-disposed in electrical communication with an x-y grid of conductive leads;

FIG. 7 shows a plurality of transducers interconnected to an x-y conductive grid with one of the transducers being energized during a signal transmission scan;

FIG. 8 illustrates a user's bare arm;

FIG. 9 illustrates the arm without skin showing a location of electrode relative to the muscle groups of the arm;

FIG. 10 illustrates the arm with a sleeve of an inventive haptic interface;

FIG. 11 illustrates the arm with gel electrodes targeting individual muscles or muscle groups;

FIG. 12 illustrates the arm with the sleeve of the inventive haptic interface including an x-y grid of relatively smaller signal receiving transducers and relatively larger signal applying electrodes targeting individual muscles or muscle groups;

FIG. 25(a) shows an artificial real-time perspective view of a UAV as displayed on a visual cue system of the inventive Human Machine interface;

FIG. 25(b) shows a 360 degree camera system for collecting video information onboard a remote machine, such as a drone;

FIG. 26 illustrates a chair configured to receive and apply haptic and audio signal;

FIG. 27 illustrates a visual sensory cue showing an actual tennis racket seen from the perspective of the user with an overlay of a virtual tennis ball generated using computer program code and displayed using an augmented reality display, such as augmented reality eyeglasses;

FIG. 28(a) shows a UVS configured as a biomimicry bird at the start of a propulsion flap;

FIG. 28(b) shows the UVS configured as the biomimicry bird on a upward stroke;

FIG. 28(c) shows the UVS configured as the biomimicry bird soaring;

FIG. 29(a) shows a bird with a control and communication circuit fixed to its back;

FIG. 32 is an illustration showing the muscles of the arm of a user;

FIG. 33 is an illustration showing an exemplary embodiment of the inventive haptic Human Machine interface configured as a sleeve disposed on the arm of the user;

FIG. 47 is a close up cross section showing an embodiment of an electrode for use with the inventive HHMI having conductive loops;

FIG. 48 is a close up cross section showing an embodiment of an electrode for use with the inventive HHMI having conductive stems;

FIG. 49 is a cross section showing the embodiment of an electrode for use with the inventive HHMI having conductive loops;

FIG. 50 is a cross section showing the embodiment of an electrode for use with the inventive HHMI having conductive stems;

FIG. 51 is a perspective view showing an individually addressable electrode for use with the inventive HHMI having conductive stems;

FIG. 52 is a perspective view showing conductive stems of the individually addressable electrode for use with the inventive HHMI;

FIG. 53 is a perspective view showing an individually addressable electrode for use with the inventive HHMI having conductive hemispheres;

FIG. 54 is a cross section showing conductive hemispheres of the individually addressable electrode for use with the inventive HHMI;

FIG. 58 shows the muscles of a hand of the user;

FIG. 59 shows the inventive HHMI configured as a pair of gloves;

FIG. 60 shows the mapping of individually addressable electrodes the muscles of the hand of the user;

FIG. 61 shows the inventive HHMI configured as an undergarment and having clusters of more denser packed electrodes and clusters of less denser packed electrodes;

FIG. 62 illustrates a use of the inventive HHMI as a component of an accelerated learning system for teaching a musical instrument;

FIG. 69 illustrates a chair configured for an exemplary entertainment application;

FIG. 70 illustrates an augmented reality visual sensory cue showing an actual tennis racket seen from the perspective of the user with an video overlay of a virtual tennis ball generated using computer pro-gram code and displayed using an augmented reality display, such as augmented reality goggles;

FIG. 71 shows a user experiencing deep immersion of a virtual reality, a block diagram showing detection and application of data, and illustrating the processing centers of the brain stimulated by the applied synchronized sensory cues;

FIG. 72 shows the inventive HHMI configured as a glove having higher density, higher resolution, smaller electrodes disposed at nerve-rich finger tips of the user;

FIG. 73 shows the inventive HHMI configured as a sleeve and applied as a retrofit modification or OEM device in signal communication with a gaming controller;

FIG. 74 illustrates a virtual reality controller having haptic pads for applying electro-tactile sensations to the finger tips of a user;

FIG. 75 is a flow chart illustrating an algorithm for detecting data including user-applied pressure, bio-generated electrical signals, bio-active electrical signals, and changes in position and accelerations of the virtual reality controller;

FIG. 80 shows the plurality of drones having proximity sensors for detecting other drones, ground, and other potential collision obstacles;

FIG. 81 is a flow chart showing an algorithm for data collection;

FIG. 82 is a configuration of the inventive HHMI configured for robotic surgery;

FIG. 83 shows a sport apparatus configured as a sensory data sensing shoulder pads worn by a football player;

FIG. 84 shows a sport apparatus configured as a sensory data sensing helmet worn by a football player;

FIG. 85 illustrates sensory data detected by an on-field player, where the data is applied as mapped sensory cues for virtual immersion by a football fan;

FIG. 86 shows sports apparatus configured as a sensory data sensing helmet, glove, baseball and bat used by a baseball player;

FIG. 87 shows the HHMI can be configured with a gyroscope showing electrodes placed on Balance Control Muscles (BCM); and FIG. 88 shows the HHMI can be configured with a Gyro-Vest that holds a core-stabilizing gyroscope adjacent to the chest of the wearer. that holds a core-stabilizing gyroscope adjacent to the chest of the wearer.

DETAILED DESCRIPTION OF THE INVENTION

Figure 1:
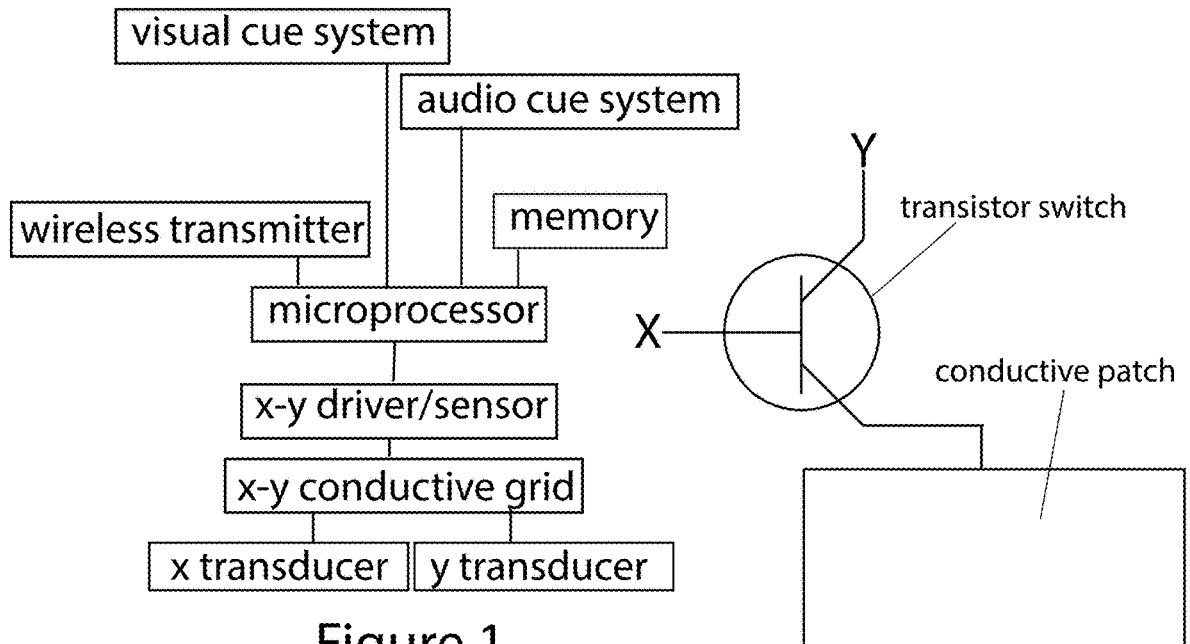
FIG. 1 shows a block diagram of an inventive Unmanned Vehicle System (UVS) interface.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The elements, construction, apparatus, methods, programs and algorithms described with reference to the various exemplary embodiments and uses described herein may be employable as appropriate to other uses and embodiments of the HHMI, some of which are also described herein, others will be apparent when the described and inherent features of the HHMI are considered.

In accordance with an embodiment of the inventive accelerated learning system, a multi-sensory, virtual reality, drone interface isolates a pilot from ambient distractions and immerses the pilot in computer-controlled and synchronized auditory, visual and haptic stimulation enabling intuitive remote controlled flight as if the pilot has become the drone. Haptic cues applied as electrical signals on the skin invoke involuntary muscle contractions perceived as though caused by an external mechanical force. Synchronizing haptic cues with real-time audio/visual cues fully immerses the pilot within the in-flight drone environment.

Many of the embodiments described herein are exemplified by a pilot (human) controlling a drone (machine). However, the inventive Human Machine or human/human (either referred to herein as the other) interface is adaptable for use in other interactions between an individual and another body. The inventive interface is applicable to a wide range of techniques and applications, including, but not limited to entertainment, sporting, military, gaming, computer control, home automation, space and deep sea probes, as well as the remote control drone or robot operation. The inventive interface can also provide an immersive way to communicate between two people remotely located from each other, or to experience an activity being performed or observed by another, in real time and from previously detected and recorded data.

The haptic sensory cue can be a vibration applied to the predetermined finger. The vibration can have an intensity corresponding to an audio volume and/or pitch, and/or to a visual color and/or intensity. The haptic sensory cue can be an electrical impulse applied to a nerve or muscle corresponding to predetermined muscles and nerves being targeted for response. The visual indication can be displayed on a display comprising at least one of a pair of reality augmentation/virtual reality eyeglasses or goggles, a computer monitor, a television, a smart phone display or a personal information device display. The visual indication may comprise at least one of a color image, light intensity or light position displayed on a display. The visual information may comprise any image viewed by the user.

Figure 2:
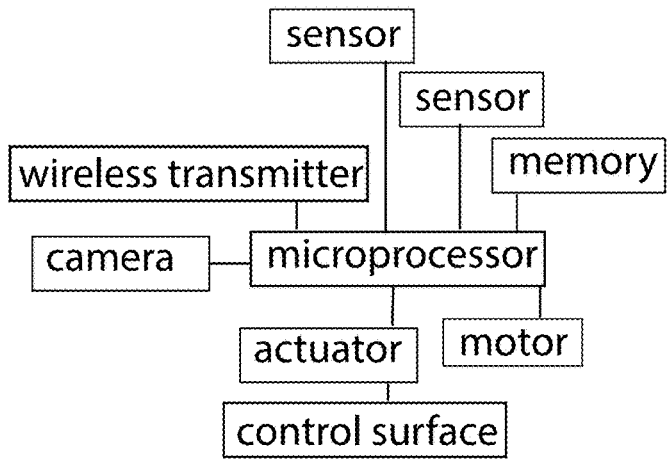
FIG. 2 shows a block diagram of onboard condition sensing and control of an inventive UVS.

FIG. 1 shows a block diagram of an inventive Human Machine interface. FIG. 2 shows a block diagram of onboard condition sensing and control of an inventive UVS. In accordance with an exemplary, non-limiting embodiment, an Unmanned Aerial System or Unmanned Robotic System (UVS) pilot interface includes computer-controlled sensory stimulation used to convey and enhance remotely sensed ambient and vehicle stresses during pilot-controlled drone flight. To go beyond conventional joystick/monitor control, a much more fully immersive experience is created through a unique multi-sensory human/machine interface.

Figure 3:
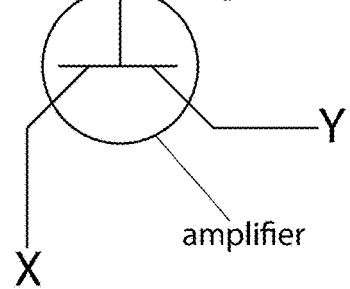
FIG. 3 shows an individual conductive patch connected through a transistor to an x-y grid.

FIG. 3 shows an individual conductive patch connected through a transistor to an x-y grid. The inventive Human Machine interface provides neuromuscular electrical stimulation (NMES) to motor and sensory nerves and muscles to produce muscular contractions that create haptic sensory cues. These "touch" cues are synchronized with one or more other sensory cue(s) (e.g., immersive 3D visual and audio). If the conductive paths provide sufficient S/N of the electrical activity from the user, the circuit can be simplified and avoid having to amplify in proximity with each conductive patch. The x and y sensor pads can detect electrical changes in the nerve fibers and muscles fibers to determine the location of an individual user's specific areas of maximum actuation for a given movement. The same x and y grid can be used to apply electrical pulses to stimulate the nerves and/or muscle fibers, or to simulate sensation felt at receptors in the skin.

The inventive Human Machine interface is a light weight, wireless, high resolution electrical signal sensing/applying mechanisms for the detection of the pilot's control intentions (to control the drone flight) and for the application of enhanced haptic cues (to experience the drone's flight conditions).

Figure 4:
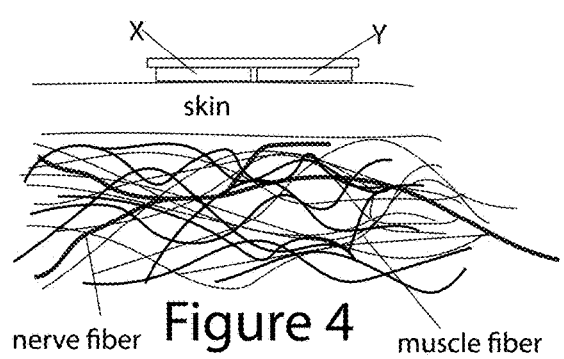
FIG. 4 shows a conductive patch applied to the skin surface of a user for applying and detecting electrical signals to receptors, muscles and/or nerves of the user.

FIG. 4 shows a conductive patch applied to the skin surface of a user for applying and detecting electrical signals to receptors, muscles and/or nerves of the user. FIG. 5 shows a transducer connected to x-y conductors. FIG. 6 shows the relatively smaller signal receiving transducers for sensing and relatively larger signal applying electrodes for applying feedback co-disposed in electrical communication with an x-y grid of conductive leads. FIG. 7 shows a plurality of transducers interconnected to an x-y conductive grid with one of the transducers being energized during a signal transmission scan.

A flexible grid of x-y conductors enable multiplexed, high resolution signals to be detected and applied. For example, the electrical activity of the body of the user (particularly, the nerves and muscle) can be detected and used to determine the user's control intentions. These control intentions can be machine-implemented actions such as moving a cursor on a display screen, selecting a button for a hyperlink in an HTML document, controlling home automation equipment, gaming, remote control of unmanned vehicles, control of deep space and deep sea probes, etc. The grid of x-y conductors form intersections. At the x-y intersections, a haptic transducer can receive and apply electrical signals. For example, as shown in FIG. 3, a conductive patch can be used to apply and to receive electrical signals to and from the body of the user. Schematically represented are transistors associated with the conductive path that control the flow of electrons (acting as a switch) and that amplify the flow of electrons (acting as an amplifier). The electric circuit shown is simplified, and in actual practice additional circuit elements, such as capacitors, resistors, other transistors and other electronic elements may be included. Each conductive patch can be individually addressable enabling, for example, high resolution signal detecting and application using electrode scan techniques similar to those used for an active matrix or non-active matrix video display.

Extremely high resolution can be achieved to precisely map the sources of electrical activity (the subcutaneous muscles and nerves). This detected electrical activity provides a determination of the best locations to detect and to apply the electrical signals for a particular user. The detected electrical activity can also be used to convey the user's control intentions in the Human Machine interface. Transistors can be used to provide selective conductive pathways through the nerve fibers and muscles using, for example, techniques, components and systems similar to a scanning x-y display, such as a OLED or LED display, or a capacitive touch sensitive display.

The inventive haptic Human Machine interface uses involuntary motor control (pilot) from a locally generated signal (interface) that is dependent on a remotely transmitted signal (drone) to create an immersive virtual reality experience. In a non-limiting exemplary embodiment, the conductive patches apply a phased DC voltage to the skin. For example, a microprocessor may vary which patches (e.g., using a conductive x-y or multiplexed grid) apply the haptic signal to the pilot's arm. The conductive patches can be placed and shaped to target the muscles/nerves that control finger/hand/forearm movement with accurate and repeatable controlled movements. The involuntary movement can be applied to feel like a varying resistance (like wind pressure) or a more active force (like a bump). Even a subtle action on the remote drone can be sensed, where the pilot feels the artificially created sensation of an applied resistance, like flying one's hand through the air out the car window. Sufficiently high resolution of the detected electrical activity can be achieved to precisely map the sources of electrical activity (and hence determine the best locations to apply the electrical stimulations and obtain precise control signals for a particular pilot).

The same conductive patches can detect and apply electrical activity, so the user's body (e.g., forearm and hand) can be mapped to calibrate the patches and signals for a particular pilot. The pilot's movements are translated to drone flight control signals. For example, the angle of a drone control surface can be changed in response to the pilot pushing back on the apparent resistance.

A chair (shown in FIG. 26) can be part of the Human Machine interface, providing a comfortable entertainment, teaching or remote control experience with immersive 3D/360 video, binaural audio and haptic-feedback. In the VR scene, the chair could appear transparent to maximize the pilot's view.

In a medical use example the haptic feedback can be in direct response to the user's movements. This is useful, for example, to counteract involuntary tremors caused by Parkinson's disease. In this case, the conductive patches (and/or mechanical sensors such as strain gauges) can be used to detect electrical and/or muscle activity of a tremor. The detected activity is analyzed by a microprocessor and a counteracting electrical signal is applied. The counteracting electrical signal can be applied to disrupt the detected activity by causing a counteracting muscle response or confusing the tremor muscles. Another medical use can be a tactile suit used to treat autism and other conditions where an applied tactile sensation can provide benefit and relief. It is known that some affected by autism benefit from a controlled tactile sensation, such as light pressure squeezing on parts of the body. It is typical to apply this pressure using a pressure or weight vest. The inventive tactile suit can be configured to provide the sensation replicating light pressure or other stimulation and thereby provide the benefit, for example, of light pressure in a custom-calibrated, mobile and convenient system.

For example, electrical activity is received from at least one of muscles and nerves of a user, for example, using the haptic interface components shown and described herein. A control signal is determined, for example, using a microprocessor, having characteristics based on the received electrical activity. The control signal is generated, for example, by an electronic circuit capable of generating a TENS or NMES electrical signal. The control signal is applied to an object, such as the user's arm, to cause an action, such as an involuntary muscle movement, dependent on the received electrical activity. As a non-limiting example, the received electrical activity may be the result of an involuntary tremor of a user having Parkinson's disease. The characteristics of the control signal are determined based on the involuntary tremor to cause involuntary muscle movement that counteracts the involuntary tremor. The control signal is generated as an electrical signal having the characteristic to cause the involuntary muscle movement that counteracts the involuntary tremor, and the control signal is applied to the user to cause the muscle movements that counteract the involuntary tremor.

FIG. 3 shows a simplified circuit and block diagram of an individual conductive patch connected through a transistor to an x-y grid for receiving electrical activity to apply to the user, and for receiving and amplifying electrical activity from the user. For example, the electrical activity can be applied to stimulate somatic and kinesthetic sensations related to force and touch. Somatic sensation, for example, are perceived cutaneous (skin) and subcutaneous (below skin). Kinesthetic sensation are more related to mechanical body parts, such as joints and muscles. In general, these sensations can be called haptic feedback which is naturally used to determine things like geometry, roughness, slipperiness and temperature, weight and inertia (force). In a non-limiting exemplary utilization of the embodiments described herein, in an "accelerated learning mode", the sensory stimulation is applied as haptic (touch), visual and audio cues applied to the senses of a student, where the sensory cues correspond to a performance being learned (e.g., piloting a drone). The sensory cues replicate and/or augment the tactile, visual and audio sensations experienced during the control of an actual drone flight. An enchanted flight simulator is obtained where the student pilot experiences the visual and audio information associated with the control of the drone, with the addition of haptic sensations that create the muscle-memory necessary for a learned action to quickly become an instinctive response. In the case of a "performance mode", such as an actual remote drone flight, the sensory cues provide real-time feedback of the ambient environment and stresses on the aircraft.

A non-limiting exemplary embodiment of an inventive haptic interface is configured as a sleeve that can be worn by a user, with the detection and application of electrical signal activity obtained through a user-calibrated grid of conductive patches or electrodes. FIG. 8 illustrates a user's bare arm. FIG. 9 illustrates the arm without skin showing a location of electrode relative to the muscle groups of the arm. FIG. 10 illustrates the arm with a sleeve of an inventive haptic interface. FIG. 11 illustrates the arm with gel electrodes targeting individual muscles or muscle groups.

Figure 13:
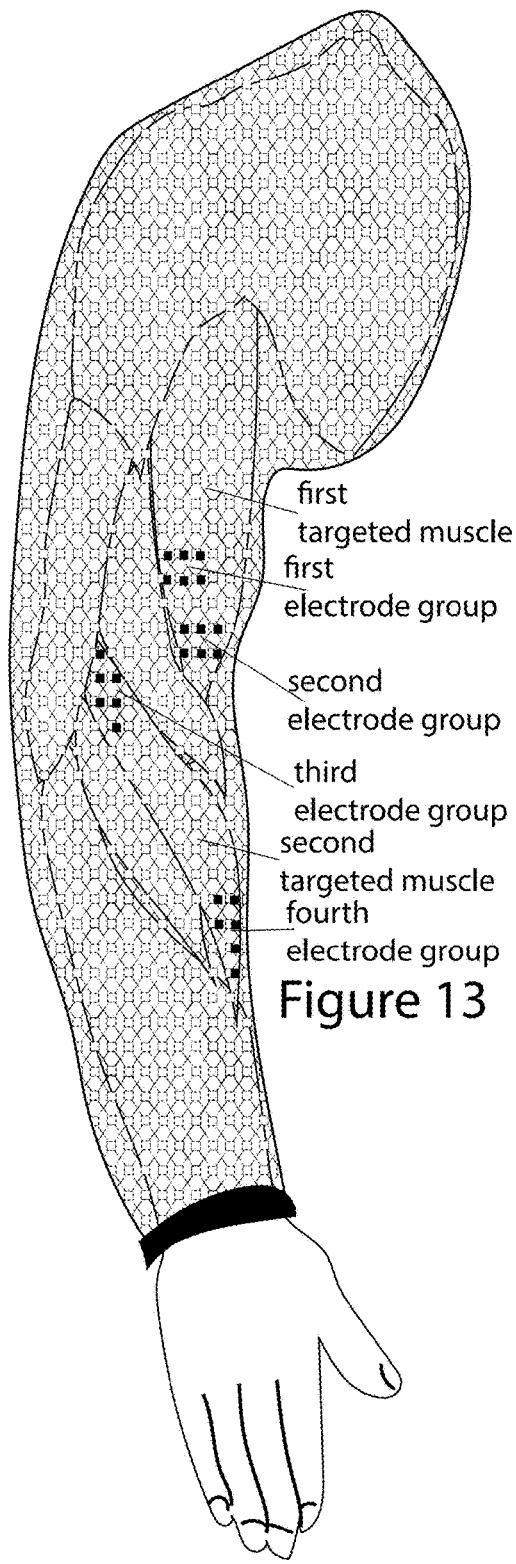
FIG. 13 shows an arm of the user wearing the inventive haptic interface targeting specific muscle groups for applied electrical stimulation.
Figure 14:
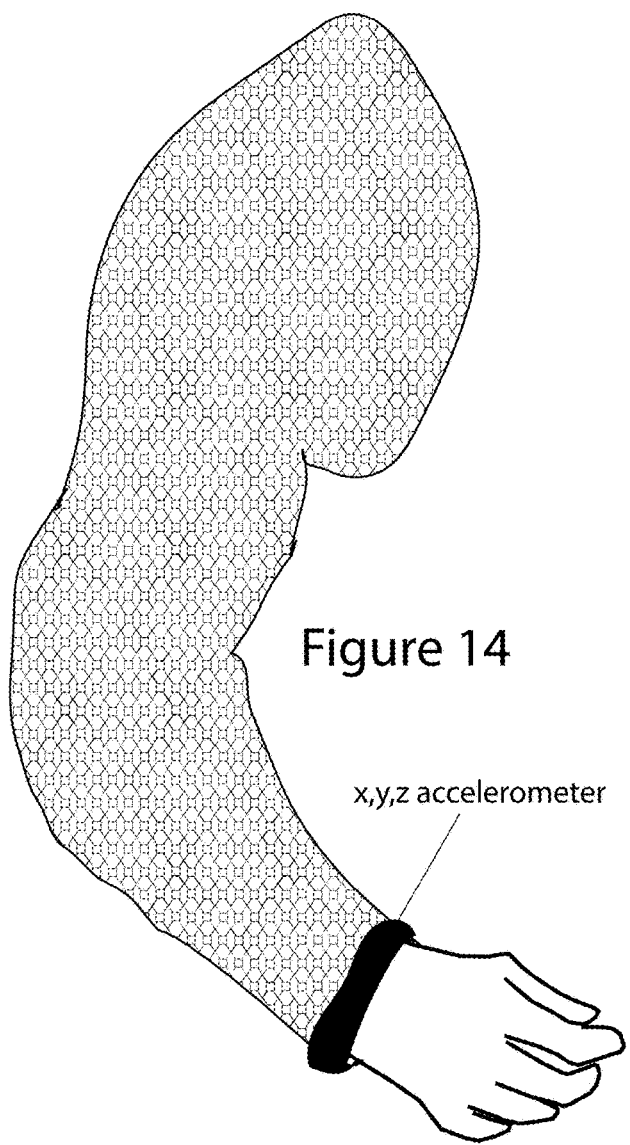
FIG. 14 shows the arm of the user wearing the inventive haptic interface with the targeted muscle groups involuntarily contracted.

FIG. 12 illustrates the arm with the sleeve of the inventive haptic interface including an x-y grid of relatively smaller signal receiving transducers and relatively larger signal applying electrodes targeting individual muscles or muscle groups. FIG. 13 shows an arm of the user wearing the inventive haptic interface targeting specific muscle groups for applied electrical stimulation. FIG. 14 shows the arm of the user wearing the inventive haptic interface with the targeted muscle groups involuntarily contracted.

The haptic interface may be in the form of a comfortable, easily worn garment that the pilot wears with little or no restriction of movement. Although a full body garment could create more full tactile immersions, the pilot interface requires direct contact with only the arm of the pilot to be effective.

A sleeve of the garment, as shown, for example, in FIGS. 10, 12 and 13-14 is constructed having a flexible grid of x-y conductors, where at the x-y intersections a haptic transducer can receive and apply electrical signals. Extremely high resolution can be achieved to precisely map the sources of electrical activity (the subcutaneous muscles and nerves) and hence determine the best locations to detect and to apply the electrical signals for a particular pilot.

Since every human body is different, in a calibration mode the pilot performs a known task that causes nerve firings and muscle contractions, such as a motion that replicates using the hand as a control surface, e.g., a flap or thruster. In this case, the known task can be a hand motion forming a flat plane with the fingers and bending at the wrist as if deflecting air. The characteristics of the body-generated electrical activity (e.g., electromyographic signals generated by the nerves and muscles as the hand is formed into a plane and bent at the wrist) are sensed by the x-y transducer grid and used to calibrate the location, relative strength, etc. of each detected electrical signal. In addition to the body-generated electrical activity, other physiological changes can be detected, such as a change in the shape of the user's arm caused by muscle contractions. These physiological changes are useful for calibrating the inventive Human Machine interface and also for determining pilot's intended control signals. The electrical and muscle activity that is detected and used for calibration, control intentions, user conditions, etc., can include EKG, EMG and EEG, as non-limiting examples.

In an auto-action mode, the calibration data is used to determine the characteristics of the computer-generated electrical activity causing a desired automatic and involuntary movement of the pilot's body parts. The result is the pilot perceives the involuntary movement as though caused by an externally applied force, in this case, as through the pilot's hand is the in-flight control surface deflecting air. Electrical stimulation is applied through the skin on at least one of the arms of the pilot dependent on a desired position to be achieved by the pilot's hand and arm. The desired body position can be related to a sensed parameter, such as flex, rotation, tilt, pitch, yaw, temperature, vibration, and other detectable stresses or conditions of a mechanical component (wing, fuselage, control surfaces, etc.) of the UVS. The sensed parameter could be air pressure experienced at a wing control surface while maneuvering. The sensed parameter is transmitted from the drone (using RF or line-of-sight optical), causing a computer-controlled NMES cue (electrical stimulation) resulting in an auto-action response in the hand of the pilot feeling pressure to assume a position directly related to the drone's control surface. The pressure to move the hand is the result of muscle movements caused by the NMES cue. The pilot experiences the sensation of resistance or pressure because of the computer controlled electrical signals applied to the pilot's own sensory/muscular physiology. In addition to pressure and resistance, the physical sensation of vibrations, knocks and even scratches can be perceived as the result of subcutaneous controlled electrical signal stimulation. The muscle movements are involuntarily and automatic. There are no mechanical force simulators involved, although there can be. Vibration, for example, can be stimulated by both the applied electrical signal and mechanical buzzers (or rumble packs, etc.) that can be applied, for example, from a "massage" chair or from a transducer associated with one or more of the x-y interfaces. In the case of music and entertainment, for example, the transducer could deliver the vibration as low end bass notes, while applied electrical signal delivers the sensation of light scratches corresponding to higher notes. Bass beats, for example, could be perceived through a knock sensation resulting from an appropriately controlled electrical signal.

The hands of a human are particularly sensitive to haptic stimulation. For example, the muscles that move the finger joints are in the palm and forearm. Muscles of the fingers can be subdivided into extrinsic and intrinsic muscles. The extrinsic muscles are the long flexors and extensors. They are called extrinsic because the muscle belly is located on the forearm. The application of haptic sensation, such as the haptic sensory cues, can be applied to various parts of the body, and the inventive accelerated learning system adapted to enable a wide range of applications, from remote control operation to Human Machine interface to teaching to entertainment to rehabilitation. By noting the sensitivity to stimulation of the body parts (e.g., the fingertips are very perceptive to tactile stimulation), the application of haptic sensory cues can be selective in accordance with a desired interface, learning or entertainment enhancement. For example, the fingers (and/or the muscles controlling the fingers and/or the nerves communication with those muscles) can receive haptic stimulation in the form of a pressure, vibration, electrical impulse or other stimulation. The inventive Human Machine interface includes a virtual reality visual system that deepens the immersion for the pilot by tying in real-time head and body movements to a three dimensional, perceived visual sphere. Camera systems onboard the drone feed real-time video from enough camera angles to create a seamless (after software cleanup) sphere of vision. As an example, if the pilot is sitting in the inventive chair shown in FIG. 26, this virtual visual sphere could give the pilot the impression that he is flying a glass chair rather than a drone.

The audio system of the inventive UVS interface may include high quality, binaural, audio provided through sound canceling headphones to replicate the actual, real-time sounds that are ambient to the remote UVS, or other sounds such as white noise, soothing or aggressive music, "spotter" updates and command instructions. The inventive Human Machine interface is intended to isolate the pilot from local ambient distractions, but the degree of this isolation can be easily controlled to maintain safe conditions. Also, although a bit more invasive than surface electrodes, the electrodes used to apply or detect the electrical signals can be of a type where the skin is pierced. However, piercing the skin is not necessary to effect benefits from the inventive Human Machine interface and much less invasive gels, gel electrodes, carbon fiber electrodes, etc., can be used.

In addition to the full immersion of visual and auditory stimulation corresponding to the remote drone as it flies, the application of auto-action and other haptic cues enable the pilot, in a sense, to intimately "feel" the flight conditions experienced by the remote UVS. With the level of immersion into the real-time conditions of the UVS created by the inventive Human Machine interface, the pilot does not just feel like he or she is flying the UVS, to the extent possible, the pilot "becomes" the UVS.

For example, the haptic cues cause the pilot to experience wind gusts as sudden jarring movements, or unbalanced stresses on the mechanical and control surfaces, such as experienced in a tight banking maneuver, as proportionally applied pressure or resistance to movement. Even subtle nuances such as the warmth of the sun shining on the top surfaces of the drone can be experienced at a corresponding location on the back of the pilot. It isn't yet known what degree of immersion and which nuances might be optimal for a given set of circumstances, the inventive Human Machine interface is designed with the intention of enabling the high quality resolution of multiple computer generated, enhanced and real-time synchronously applied, immersive sensory cues.

Thus, forces experienced, for example, by the drone, are detected and transmitted, then converted to proportional electrical signals. The pilot's body's sensation receptors such as, nocireceptors mechanoreceptors, and thermoreceptors including proprioceptors and chemical receptors, receive the computer controlled haptic cues applied as electrical stimulation to replicate, for example, natural sensations received by the human body through the skin, muscles and bones. Since the nervous system of the human body operates via electrical impulses, any nerve, nerve ending, muscle or receptor can be triggered by electrical stimulation. Signal characteristics such as; the location, timing, pulse length, frequency and amplitude of the electrical stimulation are applied under the control of the computer depending on the intended type of sensation or muscle movement to indicate to the pilot the drone's onboard and ambient conditions.

Depending on the applied NMES cue, the pilot experiences the haptic cue as pressure, as if pushing against resistance and/or being forced to move into the position related to the wing control surface, and/or a vibration or even a blow as if being jarred by an external force (e.g., being buffeted from a wind gust).

The inventive Human Machine interface has an advanced multi-sensory system that uses the physiology of the pilot to integrate the onboard and ambient conditions of a remotely flown drone into the information pool used by the pilot to control the drone's flight.

FIG. 13 shows an example where a specific muscle (bicep) is targeted for contraction by applying a TENS type transcutaneous electrical signal. The electrical signal is applied as a DC voltage between a first electrode group and a second electrode group. The appropriate electrode group to invoke a desired muscle response can be determined for example, during a calibration mode. During the calibration mode, these same first electrode group and second electrode group are used to detect the electrical activity generated when the user performs a known action, such as raising the hand to the chest (contracting the bicep muscle). Additionally or alternatively, the appropriate electrode groups to invoke a desired muscle response can be extrapolated from the calibration data because the general physiology of a human arm is well known. In this case, the calibration mode provides fine tuning of a predetermined electrode pattern, where the predetermined electrode pattern is based on human physiology and the fine tuning is based on the particular electrical activity detected for the user during the calibration mode. A strain gauge wire can be used to detect muscle movement and/or a memory metal used to contract and apply a squeezing force, acting as conductive pathways of the x/y grid or provided as separate components.

The inventive haptic interface using sensory feedback and algorithms to correctly control the characteristics of the electrical stimulation, muscle contractions can be induced that result in same movements of the body part of the user (e.g., fingers) as if performed voluntarily by the user using precisely controlled muscle movements.

Muscle contractions and changes in body part positions can be used as metrics during calibration and also to obtain feedback while the applied electrical stimulation causes an automatic and involuntary movement of the user's body parts. The sleeve may include transducers can be used to measure changes in muscle shape or body part position, or to apply a pressure, such as a squeeze or vibration. For example, a shape memory alloy (which could be formed as a sheath around or otherwise in communication with the x-y conductors) can be used under control of electrical signals from the computer, to apply haptic cues in the form of pressure or vibration.

Neuromuscular electrical stimulation is applied as a low frequency, relatively high intensity pulse. The pulse, which may be biphasic, triggers the alpha motor nerves that cause muscle movement. The higher the intensity of the electrical stimulus, the more muscle fibers will be excited, resulting in a stronger contraction. The contraction can have different speeds and duration of the contraction dependent on the characteristics of the applied electrical signal. The characteristics of the applied electrical signal can be controlled to cause isometric and/or isotonic muscle contraction, where an isometric muscle contraction leads to a tension in a muscle, without changing the length of the muscle, and isotonic muscle contraction, results in a shortening of the muscle. In accordance with the inventive haptic interface, a computer controls the characteristics of electrical signals applied to, for example, the motor neurons of the user's nervous system to cause a desired sensation and/or muscle movement. Exciting the motor neurons via the body's nervous system produces exactly the same result as when the neurons are excited through the computer controlled electrical stimulation.

In accordance with the inventive haptic interface, computer controlled electrical signals can be applied with signal characteristics effective to stimulate one or more of the tactile receptors found in the skin. The signal characteristics are controlled to selectively stimulate the receptors that have, for example, different receptive fields (1-1000 mm2) and frequency ranges (0.4-800 Hz). For example, broad receptive-field receptors like the Pacinian corpuscle produce vibration tickle sensations. Small field receptors such as the Merkel's cells, produce pressure sensations.

In a teaching scenario, in a general embodiment, the NMES is applied as the generated sensory cue to the user dependent on the position of a body part of a performer relative to a performance element of a performance object with which an event is performed. In a more specific embodiment, such as simulated flight training of manned or unmanned aerial vehicles, one or more sensory cues are computer controlled to stimulate the sense organs of the user (e.g., student pilot) effective for stimulating various processing center of a brain of the user so that user learns how to position his body member corresponding to the position of the performer of the event. Sensory cues are applied to the user and are dependent on a position of at least one body member of a performer relative to a performance element of a performance object with which an event is performed. For example, in addition to the haptic cue, audio and visual sensory cues can be applied synchronously to the user's senses. The sensory cues are effective for stimulating the various processing center of a brain of the user so that user learns how to, for example, rapidly achieve the position of a particular body member (e.g., hand on a joystick) corresponding to the position of an instructor or performer (e.g., actual pilot) performing the event (e.g., flying an actual plane or drone).

Figures 15, 16:
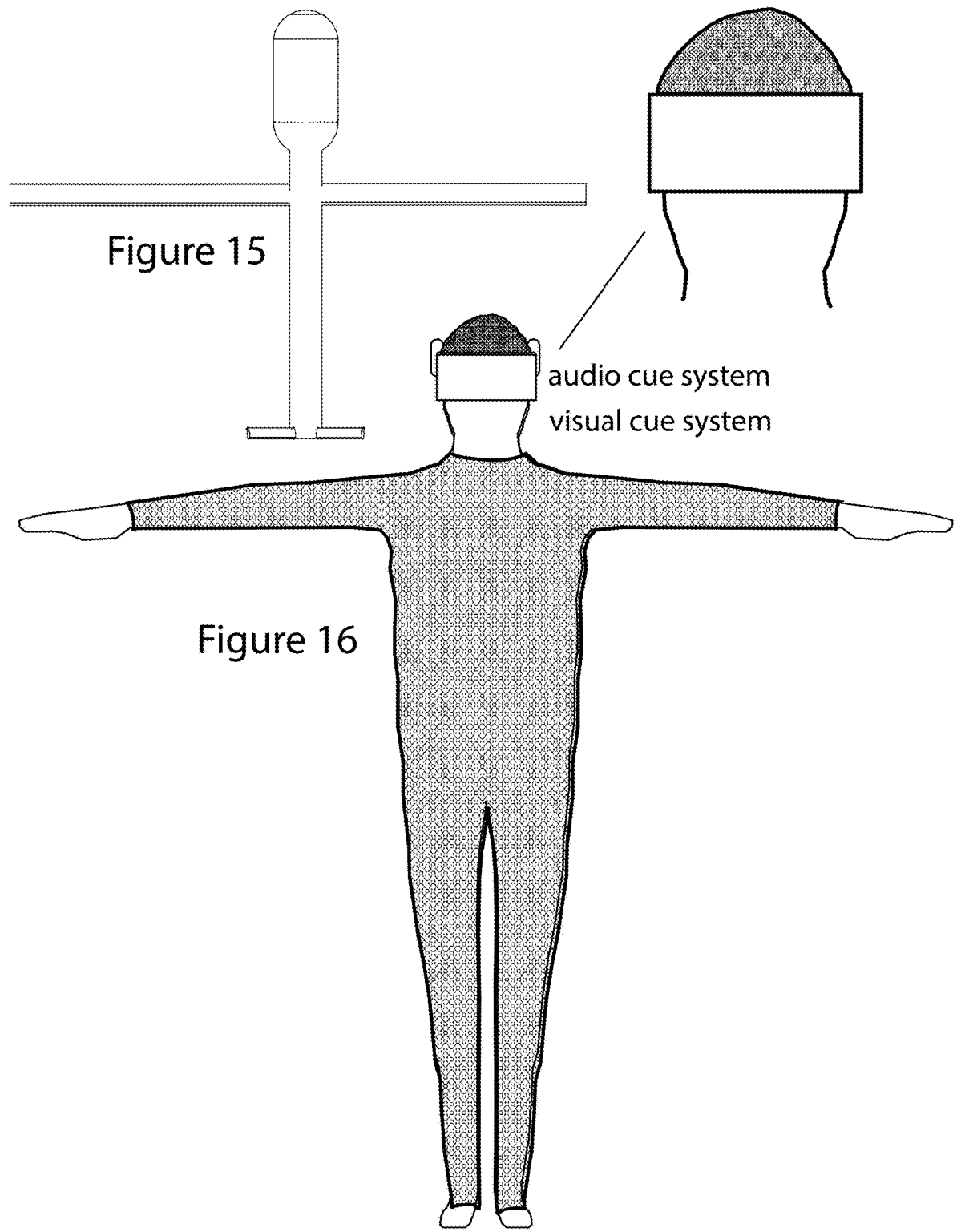
FIG. 15 shows a UVS.
FIG. 16 shows a user wearing a system for applying audio/visual/haptic cues and for receiving control intention input via electrical signals received from the user's body.

FIG. 15 shows a UVS. The inventive accelerated learning system can be used to teach and/or improve hand-eye coordination for a variety of activities, including, but not limited to, video and online gaming, as well as remote control of devices, such as military drones and the like.

In the case of military drones, it is desirable that the operators be given much time at the controls of the remote drone in order to learn the subtleties of remote controlling a drone or robot. For example, in the case of a flying drone, the operators can be provided with a flight simulation so that the cost and time involved in flying an actual drone is avoided. The operator can also be given a more immersive experience without having to fly the actual drone. In this case, the operator may use a recorded actual drone mission, and receive haptic, visual and audio cues that replicate the experience of the remote drone operator during the actual mission. The actual mission can include a predetermined course, so that the operator knows what to anticipate before the haptic audio and visual cues are applied. For example, the set course may include a series of banking and turning maneuvers and/or take off and landing.

The inventive accelerated learning system may be particularly useful for military instruction. For example, as military technology progresses, there is an increasing emphasis on the use of remote control devices, such as robots and drones to replace operators and soldiers and other military personnel in the field.

Robot and drone use is becoming increasingly advantageous for other applications, such as law enforcement. Further, it is likely that civilian entertainment and other uses will become more and more dependent on the remote control of devices. Also, remote exploration such as deep-sea and space exploration will increasingly rely heavily on remote sensing/control of robotic systems.

The drones can be equipped with sensors, so that real time telepathy of motions and other sensory cues such as vibrations caused by wind gusts or banking of the drones wings, can be translated into haptic sensory cues applied to the remote drone operator.

The sensory cues translated from sensors on board the drone can also be applied as audio and/or visual cues. Thus, the remote drone operator is able to perceive different aspects of the drone flight performance through various sensors and sensory cues. Because the different sensory cues are stimulating different parts of the operator's brain, the operator is able to process the information in a manner which may be more optimal then if the operator were to simply feel, for example, a rumble-pack type vibration simulating the buffeting of the drone caused by wind currents. That is, the onboard vibration, or banking, acceleration, etc., experienced by the drone can be sensed using onboard sensors, and the telepathy of those sensors received and used to provide sensory stimulation to the remote drone operator. The sensory stimulation may be, as just one example, audio and visual cues applied to the operator to stimulate various parts of the operator's brain as an indication of the drone's performance. Through consistent combined sensory stimulation, the operator receives enhanced learning of the subtleties of the drone's performance in relation to external factors, such as wind, altitude and air temperature, and the operator's control. For example, if the operator's control would result in a stall, an onboard tilt sensor can provide telepathy indicating that the wing of the drone has an angle of attack that will result in an imminent stall. This telepathy can be converted into an audio and visual warning to indicate to the operator that a corrective action should be taken to prevent the stall.

More than just receiving an audio and visual warning, in accordance with the inventive accelerated learning system, these sensory cues can be received in addition to haptic cues and electrical impulses applied to one or more area of the operator's body, to create a strong learned behavior/skills reinforcement in a highly immersive and convenient manner. The remote control of a flying drone is an example of a use of an embodiment of the inventive accelerated learning system. A plurality of first sensory cues are generated capable of being perceived by a user. Each first sensory cue of the plurality of first sensory cues is dependent on a position of at least one body member of a performer relative to a performance element of a performance object with which an event is performed. In this case, the performer can be an actual pilot of a drone aircraft and the actual pilot's responses and control of the remotely controllable drone can be recorded to provide the sensory cues to the user (e.g., a student pilot). Alternatively, artificial intelligence can be used to determine how a virtual pilot would react, for example, in a combat, take off, landing, or poor weather situation, and in this case the performer is a computer generated virtual performer. Whether they are dependent on an actual performer or a virtual performer, when perceived by the user, the plurality of first sensory cues are effective for stimulating a first processing center of a brain of the user. For example, in the case of the flying of a drone aircraft, the position of the hands, fingers and/or feet of the actual or virtual pilot can be determined relative to a joystick, buttons and/or other controllers of the remote controller used to perform the event of actually or virtually flying the drone. A plurality of visual sensory cues capable of being displayed to the user on a video display device are also generated. For example, the visual sensory cues can be dependent on signals from a video camera on an actual drone, or dependent on computer generated video images. The visual sensory cues provide a virtual visual indication to the user of the position of the at least one body member. For example, the virtual visual indication can be the reaction of the drone to the body member position, and/or they can be the position of the actual or virtual performers body member relative to the controls. As described elsewhere herein, two or more images can be displayed simultaneously to the user either as an overlay (one image over the other) or side by side. The visual sensory cues are effective for stimulating the visual processing center of the brain of the user. The visual sensory cues are synchronized with the first sensory cues so that the position of the at least one body member is virtually visually indicated in synchronization with the first sensory cue and so that the visual processing center is stimulated with a visual sensory cue in synchronization with a first sensory cue stimulating the first processing center. The synchronized stimulation of the first processing center and the visual processing center is effective for teaching the user to perform a version of the event. That is, the user receives the sensory cues related to the actual or virtual performed event, and these sensory cues are effective to create memory associations in the brain of the user so that the user learns how to perform a version of the event.

A second plurality of sensory cues capable of being perceived by the user can also be generated. Each second sensory cue of the plurality of sensory cues is dependent on at least one of the position of the at least one body member and an action of the event. The action dependent on the position of the at least one body member. In other words, as an example, the action in this case can be how the remotely controlled drone reacts to the position of the hand gripping the joystick that controls the drone. The second sensory cues are effective for stimulating at least a second processing center of the brain of the user. The second sensory cues are synchronized with the first sensory cues so that the second processing center is stimulated with a second sensory cue in synchronization with a first sensory cue stimulating the first processing center. The synchronized stimulation of the first processing center, the visual processing center and the second processing center is effective for teaching the user to perform a version of the event. For example, haptic or electrical stimulation can be used as the second plurality of sensory cues. In this case, the muscles and/or nerves that control the muscles are stimulated corresponding to the position of the body member(s) or the actual or virtual drone pilot. As an example, if during a real combat mission an actual pilot of a drone is forced to deploy a weapon in reaction to a visual indication provided from the drone camera, and/or an audible command indicating hostile forces are acting against friendly troops the drone is protecting, the actual pilots reaction to the visual indication and/or command can be provided along with the same visual indication/command to the student pilot so that the student pilot learns during a training exercise of the correct response against the hostile forces needed to protect the troops.

The video display device can comprise at least one of a pair of augmented and/or virtual eyeglasses, a computer monitor, a television, a smart phone display or a personal information device display. For example, in the case of the eyeglasses, a device such as google glass can be used to record the body member position of the actual pilot during the actual drone flight, providing that pilots perspective and indicating when he looks down at his hands, up at a display screen or instrument, and even what portion of the screen or instrument or what screen or instrument is viewed during the reaction to a particular flight situation. The user during the learning session is then given the same visual information in the form of the virtual visual cues. The muscles and/or nerves that control the movement of the head and even the muscles controlling the movement and focus of the eyes can be stimulated in synchronization to the visual cues so that the muscle memory is created in the association among the different brain processing centers.

As described herein, and as will be logically foreseeable to one ordinarily skilled in the art from the teachings herein, the event can be many different activities and actions, including controlling at least one of a sports related object, a musical instrument, a weapon, a video gaming controller, a remotely controllable system including a space probe, a drone aircraft, an underwater probe, a robot. Also, at least one of the first and the second plurality of sensory cues are remotely determined from corresponding to the event that is performed, the event being remote in at least one of time and location relative to the user; and wherein at least one of the first and the second plurality of sensory cues stimulates a brain processing center for at least one of the five senses of hearing, seeing, smelling, feeling and taste.

The flight controls, for example, controlling a drone can be enhanced beyond the conventional joystick operation. For example, the drone operator can be placed into a sensory deprivation tank, and an intuitive control of the drone can be accomplished using for example, the detection of the position of out-stretched arms of the user. As an example, by controlling the rotation of the hand, such as one might do when driving down the road with the hand out the window, the wing control surfaces can be remotely actuated to enable the operator to intuitively control the drone. Further, for entertainment, learning, therapeutic, military and/or other functional use, the operator can be given a highly immersive illusion of real flight. Since the drone operator is in the sensory deprivation tank, his or her brain will be more receptive to the sensory cues that are applied. Thus, for example, a widescreen, or eyeglass, display can be used to provide visual cues.

FIG. 16 shows a user wearing a system for applying audio/visual/haptic cues and for receiving control intention input via electrical signals received from the user's body. The user also wears a skullcap constructed similar to the haptic sleeve and suit shown herein to map and detect electrical signals received from the user's brain. There are applications where full body haptic stimulation combined with simultaneously applied sensory cues can be effective for learning, entertainment or rehabilitation. For example, exemplary embodiments can be used as a rehabilitation device, to induce movement in the individual fingers on a hand or invoke involuntary movement of leg muscles. The full body haptic interface shown can be segmented depending on the need, and the resolution of the applied electrical signals can be as refined or course as necessary. That is, for example, the muscles that control movement of each finger can be separately targeted.

As a non-limiting exemplary utilization, multiple sensory cues can be simultaneously received by a patient, such as a stroke victim. For example, audio (musical tones), visual (displayed hand position on a keyboard) and haptic (vibration applied to individual fingers corresponding to notes being played) can be used to "teach" a patient how to play a simple song on a piano keyboard. By providing the simultaneously applied multiple sensory cues, the goal is to strengthen the patient's brain and nervous functions that control hand movement. In addition, or as an alternative, to the vibration received by each finger, the electrical stimulation of the nerves that control the individual finger movement can also be targeted. In accordance with an embodiment, the nerve stimulation is applied in a more general way (e.g., stimulate the middle and ring finger simultaneously) while applying the haptic sensation to only the individual targeted finger (e.g., the ring finger).

Another exemplary utilization is rehabilitation of a stroke victim or other brain injury or deficiency victim enabling more rapid rerouting or rewiring of the various communication signals between areas of the brain. For example, if the portions of the brain related to auditory processing are damaged or otherwise defective, the visual and sensory cues, along with the audio cues, generated to stimulate the various processing centers of the brain of the stroke victim will help to reinforce newly learned auditory responses as the brain rewires those specific portions related to auditory processing. Another exemplary utilization can be to enhance the rehabilitation of spinal cord and/or nerve damage patients. In this case, the haptic stimulation in conjunction with the auditory and visual stimulation or sensory cues will enable a nerve and or spinal cord damaged patient to begin the association of the sense of touch with the audible and visual sensory cues, thereby strengthening the neural pathways that create either new muscle memory or help repair damaged pathways and memory associations.

The first plurality of sensory cues may comprise visual sensory cues for providing a virtual visual indication to the user of an event. The visual sensory cues may include video data mapped to at least one of color and intensity of an image of the event. The haptic sensory cues can be generated dependent on the mapped video data. In this case, the mapped video data is converted by the microprocessor to corresponding characteristics of the computer controlled serially generated electrical signals, enabling, for example, the visual sight of a firework exploding in midair being experienced as synchronistic haptic signals distributed over one or more body parts of the user, having an intensity and/or invoking a sensation dependent on the visual characteristics over time of the firework exploding in midair and fizzling out.

The sensory cues can be computer controlled using an algorithm that generates signals capable of being perceived by a user, the plurality of first sensory cue being serially generated and effective for stimulating at least one sense of the user.

The first plurality of sensory cues may comprise auditory sensory cues for providing a virtual auditory indication to the user of an event. The auditory sensory cues can include sound data mapped to stereo, multichannel and/or binaural channels. The haptic sensory cues are generated dependent on mapped sound data. In this case, the mapped sound data is converted by the microprocessor to corresponding characteristics of computer controlled serially generated electrical signals, enabling for example, the audio sensation of the doppler shift of a moving train whistle being experienced as synchronistic haptic signals sweeping over time across one or more body parts of the user, having an intensity or invoking a sensation dependent on the audio characteristics over time of the doppler shifted train whistle get-ting louder, raising in pitch then getting softer and lower in pitch as the sound fades out.

Time sequential first sensory data may be received from the remote transmitter. A plurality of first sensory cues are generated capable of being perceived by a user. The plurality of first sensory cue being serially generated in synchronization dependent on the first sensory data. The plurality of first sensory cues are effective for stimulating at least one sense of the user. The haptic sensory cues are generated in synchronization dependent on the plurality of first sensory cues.

The time sequential data may include at least one sensed condition that is sensed at a location remote from the user. The remote transmitter can be part of a remotely controlled vehicle, such as a drone, robot or remote vehicle.

In accordance with a non-limiting exemplary embodiment, a Human Machine interface includes a plurality of conductive patches for applying an electrical signal through the skin of a user to stimulate electrical signal receptors. A signal generator generates a plurality of haptic cues in the form of electrical signals applied to the skin of the user through the plurality of conductive patches. The plurality of haptic sensory cues are capable of being perceived by a sense of touch or muscle movement of the user.

The plurality of electrical signals have at least one characteristic including location, timing, pulse length, frequency and amplitude effective to cause at least one of a predetermined sensation and muscle movement in the user. The electrical signal receptors comprise at least one of muscles, nerves and touch receptors. The signal generator may also generate a plurality of first sensory cues capable of being perceived by a user. The plurality of first sensory cues are time sequentially generated and effective for stimulating at least one sense of the user. The plurality of haptic cues are time sequentially generated in synchronization dependent on the time sequentially generated plurality of first sensory cues. An x and y conductor grid provides electrical communication of the plurality of electrical signals from the signal generator to the conductive patches.

Figure 17:
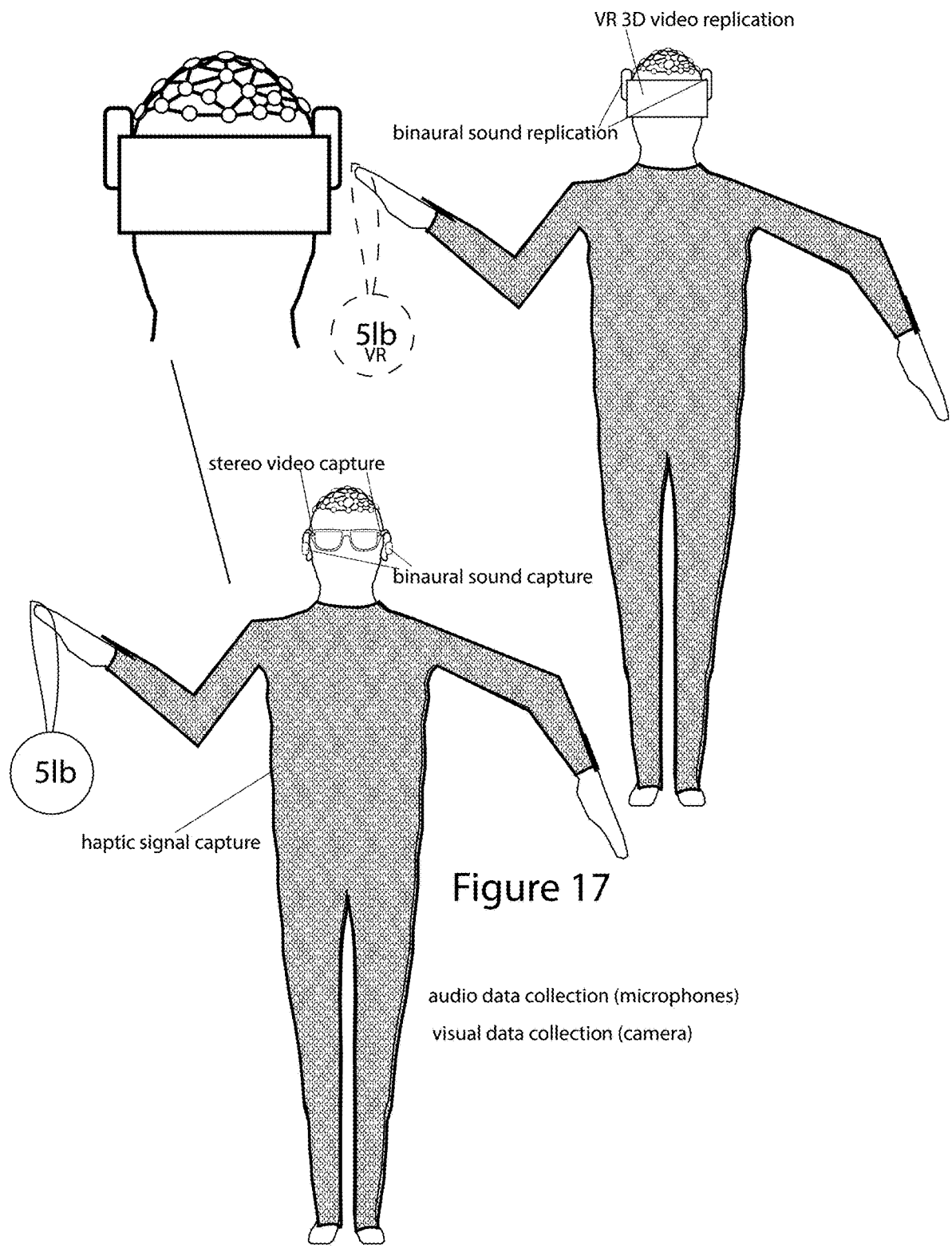
FIG. 17 shows a human/human interface where the haptic, visual and audio experiences of one user is transferred to another user.

FIG. 17 shows a human/human interface where the haptic, visual and audio experiences of one user is transferred to another user. The user also wears a skullcap constructed as an EEG hairnet and along with the haptic suit shown herein to map and detect electrical signals received from the user's brain. In accordance with an exemplary utilization, the audio, visual and haptic data of another individual can be collected and used to replicate for the user an experience perceived by the other. One user can be outfitted to capture sensory information, for example, using stereo video cameras located near the user's eyes and binaural microphones located near the user's ears. The electrical activity of the user's muscles and nerves can be collected via a haptic suit having conductive patches that amplify the received electrical signals corresponding, for example, to muscle movement. This collected time sequential data (the data may change over time), for example, resulting in muscle contractions that change the position of the user's arm. The other user receives the collected data and experiences the same audio and video information as experienced by the user. The other user also has involuntary muscle contractions caused by the collected haptic data that results from the user's muscles contracting to change arm position being applied to the other user causing similar change in the other user's arm position.

It is expected that the human/human interface can be used to simulate an interaction between a user and a computer generated avatar. That is, in this case the user is interacting with an avatar, not experiencing an event from the perspective of a remote person. The computer generated avatar is perceived by the other user as if existing within the virtual "world" created by the audio, visual and haptic systems de-scribed herein. It is well know that the sense of smell can invoke strong memory associations, particularly with loved ones. A non-limiting application for the human/human interface could be to replicate a de-ceased or remotely located relative. Artificial intelligence and stored data pertaining to the relative's personality and experiences can be used along with the applied sensory cues to construct an avatar having the appearance and mannerisms of the relative that is perceivable by the user. If the inventive system is capable of providing a strong enough experience (including, for example, a scent of a childhood home), it is conceivable that, for example, an immersive experience can be computer generated that enables a long dead grandfather to be consulted to give the user advice during a virtual "visit".

In accordance with the inventive accelerated learning system, augmented reality is provided through the use of sensory cues, such as audio, visual and touch cues. These sensory cues pertain to an event or action. A combination of sensory cues can include various points of view or perspectives, created from data collected from a time sequential data source such as sensors onboard remotely operated vehicles, or from an experience of another human, or through artificial intelligence and computer simulation.

In accordance with an exemplary non-limiting embodiment of the inventive Human Machine interface, the haptic sensory cues can be utilized along with the visual and/or audio sensory cues to create a new kind of entertainment, whereby, a song or visual piece, such as a painting or movie, can be utilized to create the pattern of sensory cues perceivable by the human through two or more senses, such as sight, hearing, touch, taste and smell. In accordance with other embodiments of the inventive Human Machine interface, the haptic sensations can be applied to one or more parts of the body, such as the legs, thighs, arms, ribs, torso, neck, head, etc.

For example, a drumbeat from a musical piece being listened to can be applied as haptic sensations to the legs of the wearer, while the piano performance (such as that recorded as the teaching cues of the piano performer) can be applied as haptic sensations to the fingertips of the use, while simultaneously displaying a visual scene with elements (colors, intensity) synchronized to the musical performance.

In accordance with an embodiment of the inventive Human Machine interface, the sensory cues can be utilized to provide rehabilitation to a victim of a brain injury or other brain damage or learning dysfunction. In this case, the various portions of the brain related to the processing of sound, touch and vision can be controllably and simultaneously stimulated so that a weakened brain sensory stimulation processing center can be strengthened or rewired through the support of stronger brain sensory stimulation processing centers. For example, a stroke victim with damage to right side of the brain may have a loss of function in the motor control of the fingers of the left hand. In this case, the haptic sensory cues applied to the fingers of the left hand provide touch sensory stimulation to the damaged portions of the brain, while the corresponding visual and audio cues reinforce the re-learning or rewiring of the damaged portions of the brain through the touch sensory stimulation.

Figure 18:
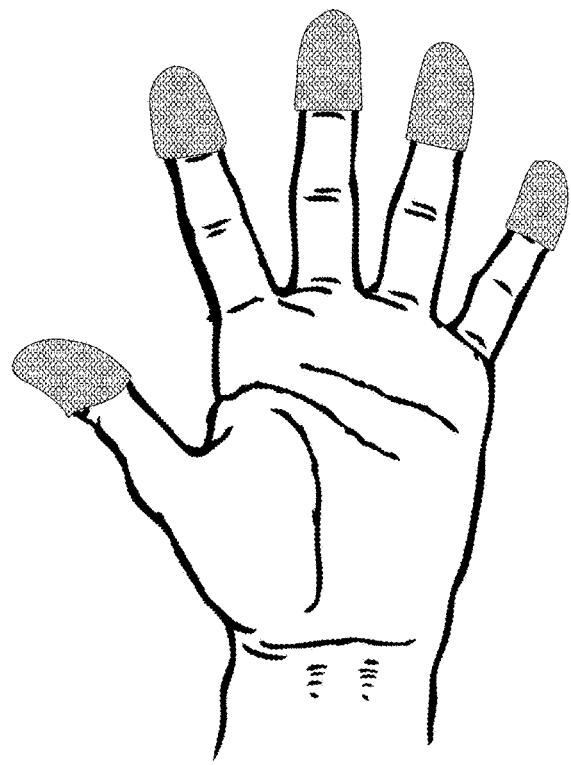
FIG. 18 shows an inventive Human Machine interface composed of tactile finger tips.
Figure 19:
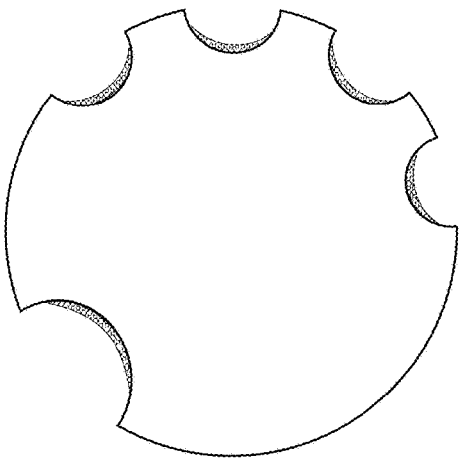
FIG. 19 shows an inventive Human Machine interface comprising an orb having haptic and pressure active finger grooves.
Figure 20:
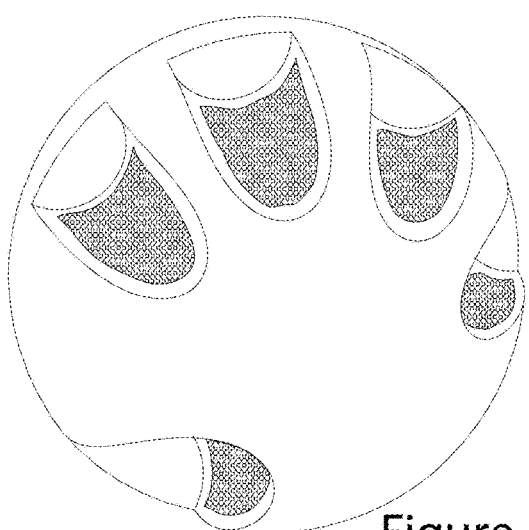
FIG. 20 shows the inventive orb with high resolution haptic and pressure active finger grooves.
Figure 21:
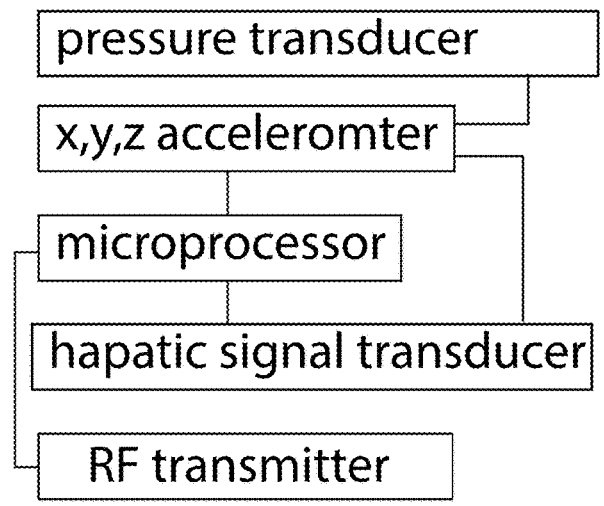
FIG. 21 shows a block diagram of circuit components of the inventive orb.
Figure 22:
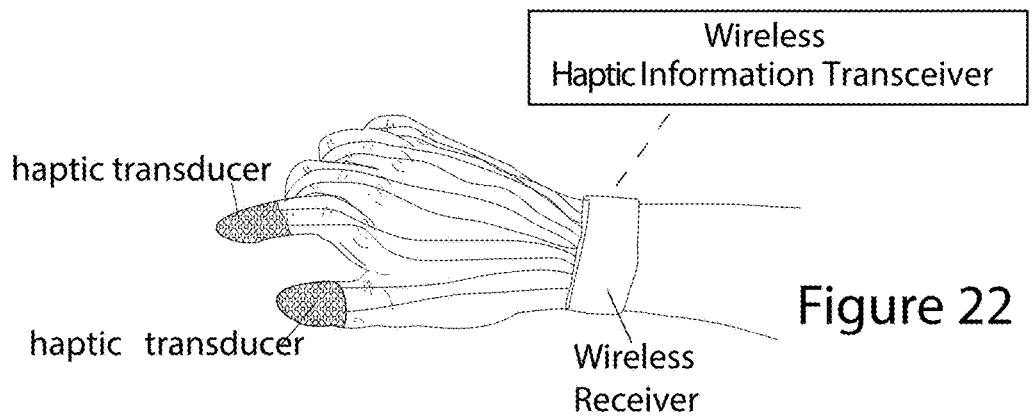
FIG. 22 shows elements of a hand applied wireless haptic information transducer of the inventive human/machine interface.

FIG. 18 shows an inventive Human Machine interface composed of tactile finger tips. The tactile finger tips can be constructed similar to the haptic sleeve and suit shown herein to map, detect and apply electrical activity at the user's fingers. FIG. 19 shows an inventive Human Machine interface comprising an orb having haptic and pressure active finger grooves. FIG. 20 shows the inventive orb with high resolution haptic and pressure active finger grooves. FIG. 21 shows a block diagram of circuit components of the inventive orb. FIG. 22 shows elements of a hand applied wireless haptic information transducer of the inventive Human Machine interface. In accordance with this non-limiting exemplary embodiment, transducers are provided for detecting and applying electrical signals to the fingers of the user. A hand operated orb can include finger grooves that receive each finger and are lined with the transducers for applying and receiving electrical energy and other tactile stimulation (e.g., vibrations or pressure). The orb comprises a housing that holds transducers, accelerometers, microprocessors, vibrators, gyros, and transmitters, etc., enabling the use of the orb as a Human Machine interface such as a wireless three dimensional mouse or wireless joystick-like controller for gaming, entertainment, military, business, remote control and many other uses.

Figure 23:
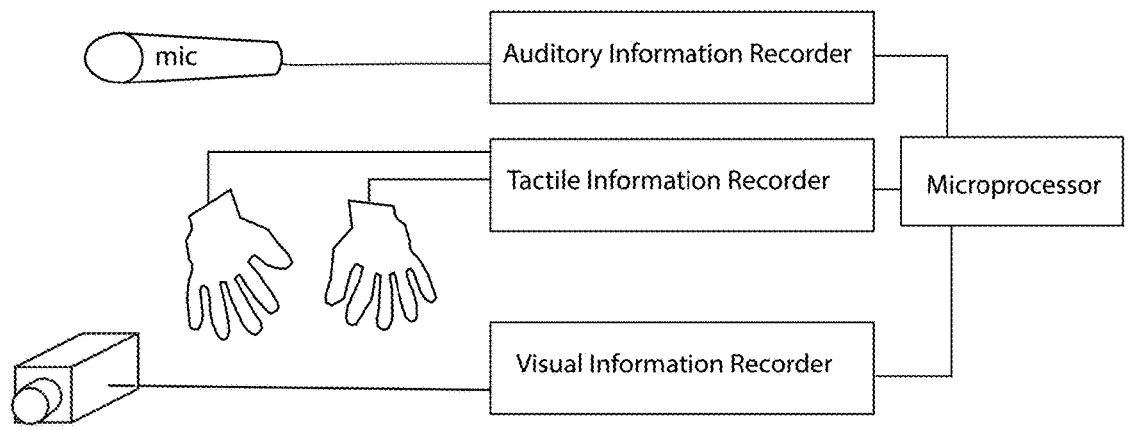
FIG. 23 illustrates an audio/visual/haptic signal collecting system.
Figure 24:
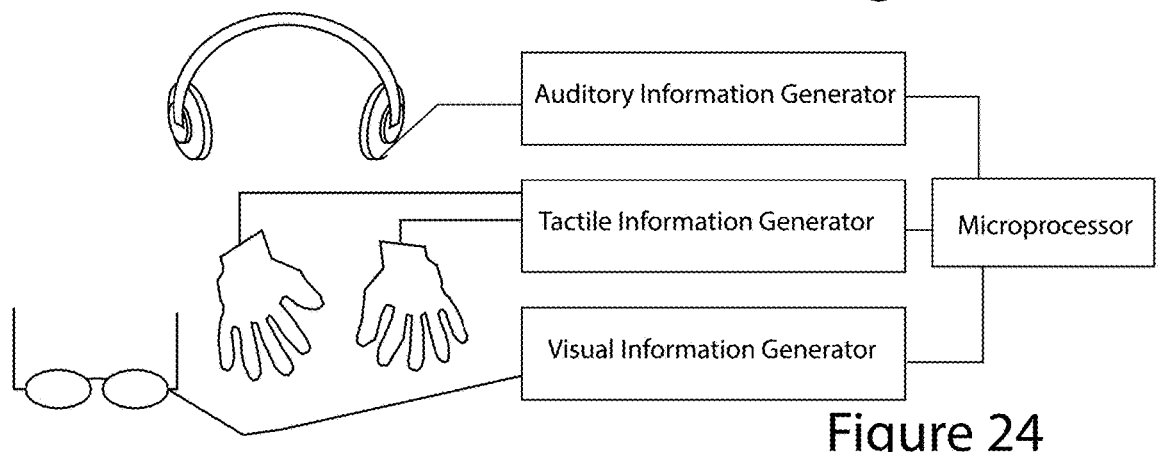
FIG. 24 illustrates an audio/visual/haptic signal applying system.

FIG. 23 illustrates an audio/visual/haptic signal collecting system. FIG. 24 illustrates an audio/visual/haptic signal applying system. FIG. 23 schematically shows a system for collecting (recording, transmitting) haptic, auditory and visual information in accordance with the inventive Human Machine interface. To record the audio, haptic and visual information during, for example, a non-limiting utilization of the inventive system during a piano session, finger position sensing gloves can be used with a digit/key detecting keyboard. The microphone is used to record the notes played on the piano, the recording can be done binaurally to enable more accurate immersion of the collected sensory information. The user (performer) wears haptic signal detecting gloves so that the piano keys that are played, can be determined. The microphone simultaneously records the sounds generated by the piano when the piano keys are played. Further, a visual information recorder, such as a video camera or specially constructed eyeglasses that include a camera, are used to record from the performers perspective, the hand and finger positions of the performer while playing the piano. By this system, the experience of the piano player is collected from the perspective of three sensing cues: audio, visual, and haptic.

FIG. 24 schematically shows a system for applying the collected audio, visual and haptic information to a remote user (remote in time and or location). In accordance with the remote experience is achieved by simultaneously stimulating the auditory, visual and haptic senses of a user, to simulate and/or augment an actual performance of an event, such as the playing of a song on a musical instrument, for example, at a piano. Collected or artificially generated sensory cues are provided to the user through an auditory information transducer, haptic information transducer and visual information transducer. The respective transducers are connected to and activate a corresponding interface device, such as head-phones, gloves and displays (for example, enabling the human/human interface shown in FIG. 17).

The inventive human/human interface can be used for accelerated learning, entertainment and other human sensory and cognitive interactions. For example, in the case of a haptic information transducer, a vibration buzzer (such as a piezo or motor driven mechanical vibrator) and/or electrical signals can be applied to the individual fingers and arm muscles and nerves of the user, for example, a student during a lesson learning session. In the case of the display, it may be, for example, specially constructed eyeglasses that display visual information that has been collected or artificially created corresponding to the learned event or entertainment session. Specially constructed VR goggles or eyeglasses may display visual information as an overlay, picture in a picture, or other simultaneously displayed video information while the user also sees the real world imagery. For example, when learning to play the piano, the student may be sitting at the piano and able to see a sheet of music and also see the piano keys with his hand and finger positions in real time, while also seeing visual sensory cues that is being generated and supplied to the specially constructed eyeglasses. Also, the inventive human/human interface can be used for accelerated learning that takes place remote in time and/or location from the instrument or teacher, so that the student feels, hears and sees sensory cues corresponding to the learning of the event at any time and place remote from the instrument. This accelerated learning system is designed to create associative memory in the user corresponding to muscle memory (haptic information), auditory memory (auditory information), and visual memory (visually display information).

To record from the performers visual perspective, video recording glasses such as Google glass, can be used. Visual and audio playback when in lesson mode can be done using video glasses that include headphones. Haptic gloves are worn that include a buzzer or vibrator and/or electrical signal conductors for triggering sensation in each finger or selected muscles and nerves of the user. An LED can also be located on each finger or located near each finger tip. For example, the student receives the visual cues as received during a remote learning session at the instrument to create a learned visual memory of what the student visually experiences when seated at the piano. The inventive accelerated learning system obtains and reinforces the memory associations of the sensory cue whether at the piano or remote from the instrument. Plus, the user is more able to reinforce the associate to memories of the sensory cues that make up the performance of an event, such as the playing of a piece of music. In accordance with this non-limiting utilization of the inventive embodiments, the user wears haptic stimulators on the tips of their fingers. The haptic stimulators can be, for example, small buzzers, the haptic stimulator can be a mechanism that applies an electrical pulse directly or indirectly to the muscle or muscle groups of the user to cause a sensation or contraction in that muscle group that corresponds to a particular finger that is to be used to play, for example, a key on the piano during the learning session. For example, the memories associated with the playing of a piece of music, in accordance with an embodiment of the invention, will include audio, visual, and tactile (haptic or other stimulation) cues that are generated and that can be repeated over and over to instill the associative memory that is built up during the course of conventional music practice at an instrument.

In accordance with non-limiting exemplary utilizations of the inventive embodiments, to further enhance the entertainment, remote control and/or learning experience, chemicals released by the brain systems can be detected from a user that is controlling a remote vehicle or learning a piece of music at a practice session at the instrument. As another example, the brain activity of a student can be sensed using well-known brain scan techniques (such as those described in the background) and the applied sensory cues can be the focus of the different brain activities related to auditory, visual, and haptic sensory cue processing to further reinforce and enhance the learning experience. The brain activity (e.g., the human/human interface shown in FIG. 17) can also be detected as part of the collected data shared between the humans. This data that is specific to the human physiology of the individual can be used to enhance the experience of the user and as part of a collected data base to further refine the contraction and utilization of the embodiments described herein. The inventive embodiments, such as the human/human interface and accelerated learning system can be applied to other activities, including but not limited to sports, school work, performing arts, military exercises, video gaming, etc. As is also described herein, aspects of the non-limiting, exemplary embodiments can be utilized for a number of different fields, including entertainment, military, sports, video gaming, remote controlled robots, drones and vehicles, other musical instruments, etc.

FIG. 25(a) shows an artificial real-time perspective view of a UAV as displayed on a visual cue system of the inventive Human Machine interface. Data from onboard cameras plus onboard accelerometers, GPS, etc., plus stored image data of the drone are used to create real-time artificial perspective of drone in flight that is received as the visual sensory cues. As illustrated, the pilot can perceive the visual image of the drone as if flying along side the drone (e.g., in formation with the drone). Alternatively, the drone and the scene around the drone can appear to the pilot from any other visual perspective.

FIG. 25(b) shows a 360 degree camera system for collecting video information onboard a remote machine, such as a drone. In accordance with this non-limiting, exemplary embodiment the inventive Human Machine interface (i.e., at the pilot's location) may be physically located relatively nearby to the drone and receive the time sequential data from a remote transmitter on the drone using line of sight wireless transmission. In this case, the collected time sequential data (e.g., audio, video and haptic signals) transmitted from the drone to the pilot and the flight control signals transmitted from the pilot to the drone are received at the pilot and the drone essentially in real-time due to the light of sight wireless transmission. Alternatively (or additionally), the inventive Human Machine interface (i.e., at the pilot's location) may be located relatively far from the drone and receive the time sequential data from the remote transmitter on the drone using relayed wireless transmission, such as via a satellite link. The collected time sequential data (e.g., audio, video and haptic signals) transmitted from the drone to the pilot and the flight control signals transmitted from the pilot to the drone are received at the pilot and the drone with a delay caused the relayed wireless transmission.

At the location of the pilot, a plurality of haptic sensory cues are generated capable of being perceived by the pilot. The haptic sensory cues are received by the pilot as computer controlled serially generated electrical signals. The electrical signals invoke a perception by the pilot related to the sense of touch. These received haptic sensory cues can be applied as computer controlled electrical signals that are mapped to the body of the pilot so that different body parts receive different sensory stimulation. For example, the hands and arms of the pilot may be considered the human embodiment of the control surfaces, such as flaps of a drone plane. The feet and legs of the pilot may be considered the human embodiment of propulsion components, such as the engines of the drone plane. In this example, the flexing of one or both feet of the pilot can be detected and converted to flight control signals to control the engine speed (and thereby control the speed of the drone). Engine speed time sequential data received from the drone can be converted into a haptic sensory cue that is displayed along with visual speed data, such as GPS determined speed relative to ground, so that the pilot has an intuitive sense of the drone engine speed (for example, intensity of a sensed vibration can be correlated with the RPM of the engine) and along with the visual confirmation of the drone speed relative to ground. In accordance with the inventive human/machine interface, the pilot receives multiple sensory cues that are inter-related and synchronized to indicate the flight conditions of the remote drone.

The haptic sensory cues are generated and applied to the pilot in synchronization dependent on the time sequential data that is received from the remote drone. In addition to the time sequential data that pertains to the haptic cues, time sequential first sensory data is also received from the remote transmitter. This time sequential first sensory data may be, for example, video or audio data that is collected by appropriate components on the drone. A plurality of first sensory cues are generated capable of being perceived by a pilot. The plurality of first sensory cues are serially generated in synchronization dependent on the first sensory data. That is, for example, the sequential frames of a video displayed to the pilot replicate the visual information collected by cameras on the drone in time sequence. The plurality of first sensory cues are effective for stimulating at least one additional sense of the user, including vision, hearing, smell and taste (in this example, vision). The haptic sensory cues are generated in synchronization dependent on the plurality of first sensory cues. That is, the haptic sensory cues represent the flight conditions (e.g., control surface orientation and air pressure, etc.) experienced by the drone synchronized to the visual information from one or more cameras on the drone. One or both of the time sequential data and the time sequential first sensory data may include at least one sensed condition that is sensed at a location remote from the user. The remote transmitter can be part of a remotely controlled vehicle, such as a drone, robot or remote vehicle. This enables, for example, the pilot to intuitively "feel" the forces on the drone while visually seeing the results of a flight maneuver of the drone, such as a banking turn. This sensory feedback to the pilot's control of the flight enables the pilot to have an intimate and immersive perception of the drone's flight.

The 360 degree camera system collects video information onboard the drone. The placement and number of cameras is effective to enable a full sphere of views available to a pilot wearing, for example, a head tracking virtual reality headset, such as the Oculus Rift. Well known software and camera lens configurations can be used, for example, to stitch together the video feeds from the cameras so that a seamless or nearly seamless video presentation is available to the pilot. As the pilot looks right, left, up, down, for example, the movement of the pilot's head is tracked and an appropriate video scene can be generated in 3D on the virtual reality video headset. Fewer cameras and the placement of the cameras can be at convenient locations onboard the drone as determined, for example, by the weight and cost constraints. For example, forward looking cameras can be disposed at the front of the drone and rearward looking cameras disposed at the rear. The perspective and zoom of the camera image data can be controlled via software so that the pilot may experience the visual cues as if the pilot is physically located anywhere on the drone (cockpit, tail, wingtips, etc.). Also, the collected video data can be combined with computer generated images so that the perspective viewed by the pilot can be from outside the drone. For example, the pilot can view the drone he or she is remotely controlling as if flying along side or behind the drone (e.g., the perspective shown in FIG. 25(a)).

Although this non-limiting exemplary embodiment describes haptic sensory cues combined with auditory and/or visual sensory cues, the combination of sensory cues could be any combination of the senses perceivable by a human, including smell, taste, hearing, sight and touch.

FIG. 26 illustrates a chair configured to receive and apply haptic and audio cues. The human/machine interface can be configured as a comfortable chair, for example, to allow a drone pilot to maintain a long duration mission. The sensory cues can be generated by components that are integral to many user-friendly structures. For example, the haptic sensory cues can be mapped to a chair, bed, clothing or apparatus that can be worn by the user. FIG. 26 illustrates a massage chair having zones (shown as different shades of grey) corresponding to various body parts of user, with significant contact with large portions of the skin of the user and the weight of the user facilitating contact with the conductive patches (e.g. electrodes) used for applying and detecting electrical activity. In addition, or alternatively, the zones can apply vibrations and other perceivable haptic sensations (such as from moving components under the fabric or covering of the chair) to the body parts of the user. These chair haptic sensations can be used to provide relatively larger sensory perceptions (e.g., over larger surface areas of the body) while, for example, the x-y grid and conductive patches apply electrical signals to smaller, more targeted areas. The x-y grid and conductive patches can apply the electrical signals using an electrode scan technique that is similar to the driving of an active matrix display. The haptic signals can be applied to create sensations perceivable by the user. The sensations can be created through electrical stimulation, and/or through vibrations, related to entertainment, learning, physical therapy, etc. For example, in the case of a massage chair, a soothing massage can be applied wherein the massage to various parts of the body are mapped to the different frequencies of a piece of music. The sensory cues can also include other senses, such as taste and smell. In this case, the senses of taste and/or smell can be utilized to provide positive and negative reinforcement of a learned activity. For example, in the case of a drone operator learning to determine how to recognize friend or foe, during a training exercise a visual sighting that challenges the operator with making a correct snap determination of friend or foe can be reinforced by providing a pleasant smell when a correct determination is made and an unpleasant smell when an incorrect determination is made. By this application of additional sensory cues as reinforcement to learned behavior or responses, another processing center of the brain is brought into the combined sensory processing learning experience. The different ranges of music frequency can also be mapped to visual stimulation, applied for example, using a 3D VR headset, in the form of light colors. The light colors can correspond, for example, to the sensitivity of the human eye to color stimulation. Thus, for example, the color can be generated by LED lights that match the peak wavelength sensitivity of the cones of the human eye. The three types of cones have peak wave-lengths near 564-580 nm, 534-545 nm, and 420-440 nm, respectively.

FIG. 27 illustrates a visual sensory cue showing an actual tennis racket seen from the perspective of the user with an overlay of a virtual tennis ball generated using computer program code and displayed using an augmented reality display, such as augmented reality eyeglasses. This represents another non-limiting exemplary application of the inventive Human Machine interface. In this case, a body member of a user receives haptic information pertaining to a virtual event that uses a performance object controlled by the user. The body member can be part of the user's body, such as the arms and shoulders, and the event can be a sporting activity, such as tennis. The performance object in this case would be a tennis racket and the position of the performance object can be detected by appropriate proximity sensor, motion detectors, tilt detectors, a laser positioning system, and other mechanisms used to detect the position of an object in three-dimensional space. The performance element in this case may be the handle of the tennis racket, and its position relative to an arm of the user as a tennis ball approaches and is struck by the racket can be determined. The tennis ball can be an actual tennis ball, or a computer generated tennis ball that the user sees and reacts to during the collection of the sensory cues data that will be used to teach the performance. This mechanism and method for detecting and recording (data collection) of the position of body parts and performance objects/performance elements is used to collect the sensory cues that are used to teach the event and build up memory associations of the event in the various processing centers of the student's brain. The body member that is detected during the recording of the event performance and then stimulated during the learning lesson or entertainment session can be at least one of a finger, toe, hand, foot arm, leg, shoulder, head, ears and eyes of the user. This technique of using the inventive accelerated learning system can be used, for example, to create a virtual sport video game. Similar alternatives can be constructed for other events, such as controlling a remotely controllable system, for example, the flying of a drone airship, a space exploration probe, the playing of a guitar, the assembly of a weapon, entertainment or brain rehabilitation to help "rewire" the brain of a stroke victim or brain damaged patient, other cognitive therapy including enhanced learning, or any other event where a user can benefit from recorded sensory cues that stimulate the various processing centers of the brain. The non-limiting embodiments can also be utilized, for example, to provide muscle memory association and/or entertainment and rehabilitation using full body activities, such as martial arts, skiing, diving, etc.

FIG. 27 illustrates a visual sensory cue showing an actual tennis racket seen from the perspective of the user with an overlay of a virtual tennis ball generated using computer program code and displayed using an augmented reality display, such as augmented reality eyeglasses. Eye-hand coordination for playing tennis can be taught using an embodiment of the inventive accelerated learning system. In this case, the visual sensory cue can be the tennis ball coming towards the user, and the head movement to bring the ball into the racket. The haptic sensory cues can be electrical impulses applied to the muscles of the arm to strike the ball with the racket. Also, impulses can't be provided to the muscles controlling head movement. Also, shoulder and back movement, and various other muscles that are major factors in positioning the racket to strike the ball.

FIG. 28(a) shows a UVS configured as a biomimicry bird at the start of a propulsion flap. FIG. 28(b) shows the UVS configured as the biomimicry bird on a upward stroke. FIG. 28(c) shows the UVS configured as the biomimicry bird soaring. Biomimicry can be usefully applied both in the creation of a highly responsive remote controlled drone, and to provide guidance to determine what type of and where to locate sensors that provide a haptic feedback experience to the user controlling the drone. For example, in the case of a drone constructed based on the biomimicry of a bird, flexure, rotation, angle and pressure sensors can be disposed at the general locations where on an actual birds body the detection of these forces are used by the bird in controlling flight. The pilot can receive haptic information that is based on sensing the change in angles, flexure, rotation and pressures experienced at the joints and surfaces of the UAV. Drones can be constructed using biomicicry, with sensors located at pressure and motion change (e.g., flexing, hinging) locations of the drone. The telemetry of the transducers/sensors can be used to provide haptic feed back to the pilot.

Figure 29B:
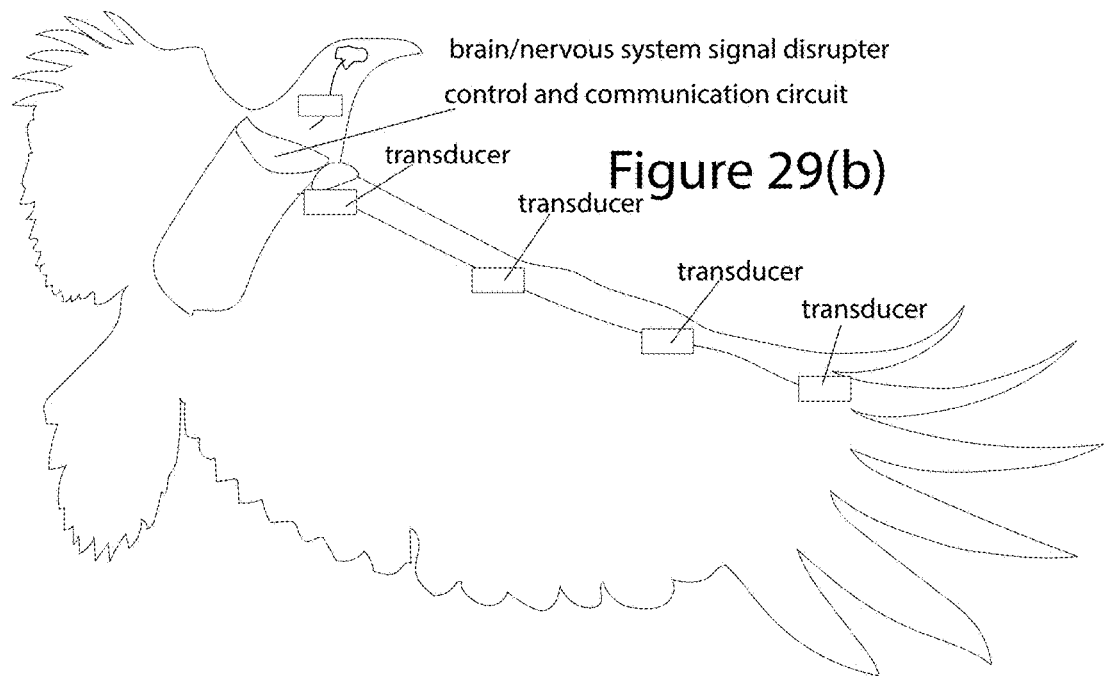
FIG. 29(b) shows a bird with the control and communication circuit blocking muscle signals from the brain of the bird and applying computer controlled muscle signals to the flight muscles of the bird.
Figure 29C:
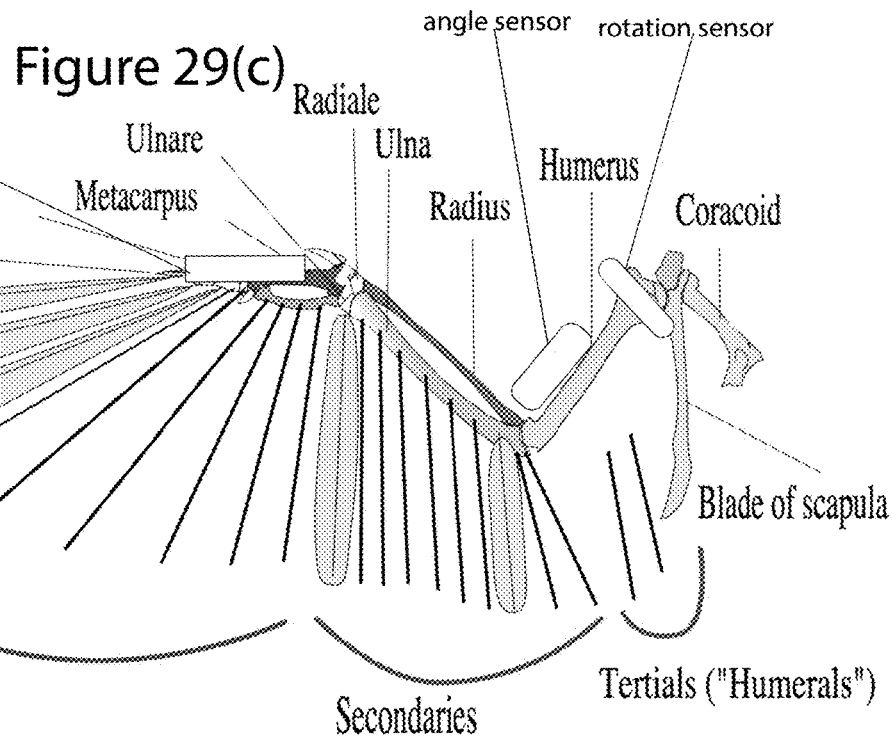
FIG. 29(c) illustrates the skeleton and feathers of a wing of a bird having sensors and transducers for remote computer-controlled flight.

FIG. 29(a) shows a bird with a control and communication circuit fixed to its back. FIG. 29(b) shows a bird with the control and communication circuit blocking muscle signals from the brain of the bird and applying computer controlled muscle signals to the flight muscles of the bird. FIG. 29(c) illustrates the skeleton and feathers of a wing of a bird having sensors and transducers for remote computer-controlled flight. The sensors can be placed at the location where the bird feels the flight conditions, such as at the fixation point of the feathers (particularly those used to sense and control flight). The electrical activity generated at these fixations points can be detected and that data used by AI and/or computer manipulation to create an overall "fly by wire" type of control so that the human pilot does not necessarily need to know every detail of the data but rather is given, for example, the trends determined from the data that are needed to adequately provide through the Human Machine interface meaningful perceptions in the pilot and control intentions from the pilot of the remote controlled flight of the bird.

In accordance with a non-limiting exemplary embodiment, a plurality of haptic sensory cues are generated capable of being perceived by a user. The plurality of haptic sensory cues are dependent on a determined condition of at least one movable member of a performing body performing an event. The plurality of haptic sensory cues are effective for stimulating a touch processing center of a brain of the user based on the determined condition. A plurality of visual sensory cues are generated capable of being displayed to the user on a video display device. The visual sensory cues provide a virtual visual indication to the user of a position of at least one of the at least one moveable member and the performing body. The visual sensory cues are effective for stimulating the visual processing center of the brain of the user. The visual sensory cues are synchronized with the haptic sensory cues so that the position is virtually visually indicated in synchronization with the haptic sensory cues, and so that the visual processing center is stimulated with the visual sensory cues in synchronization with the haptic sensory cues stimulating the touch processing center.

The synchronized stimulation of the touch processing center and the visual processing center can be used for teaching the user to perform a version of the event. The synchronized stimulation of the touch processing center and the visual processing center can be used for enabling the user to remotely control the performing body performing the event. The performing body may comprise a human, and the movable member may comprise a body part of the human. The performing body may comprise an animal, and the moveable member may comprise a body part of the animal. The performing body may comprise a remotely controlled moving object, and the moveable member comprises a mechanical component of the remotely controlled moving object The movable member can be a finger, the performing body can be a human, and the event can be playing a piece of music. The movable member can a control surface, the performing body can be a drone, and the event can be flying the drone. The movable member can be a wing, the performing body can be a bird, and the event can be the bird flying.

For example, by selectively disrupting signals from and to the brain of the bird, and instead applying computer generated electrical signals, the flight of a bird can be controlled as if flying a drone. Telemetry collected from the bird, including an onboard camera and conditions sensors (e.g., a rotation transducer detecting the rotation of the bird's wing) can be used to indicate the flight characteristics of the bird to the pilot. The flight characteristics could be applied as a sensed involuntary urging of the pilot's own arms replicating the bird's wing position, and/or the telemetry can be utilized by a computer processor to enable the pilot's acquisition of useful flight information without overwhelming detail (similar to the fly-by-wire techniques of a modern jet fighter). A control and communication circuit carried by the bird can include a GPS system to enable, for example, an automatic homing feature that returns the bird safely to base or navigates to a mission target autonomously and/or under pilot control.

Figure 30A:
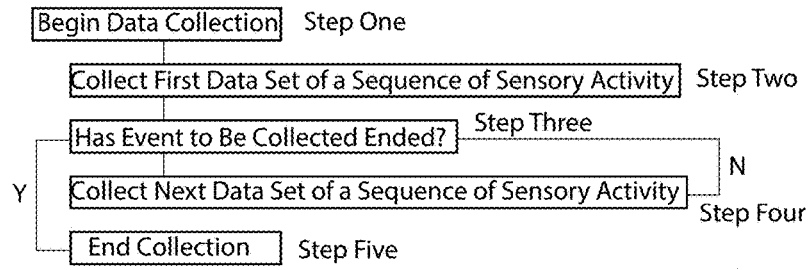
FIG. 30(a) is a flow chart illustrating the steps for collecting data sets of a sequence of sensory activity of an event to be replicated, transmitted and/or recorded.
Figure 30B:
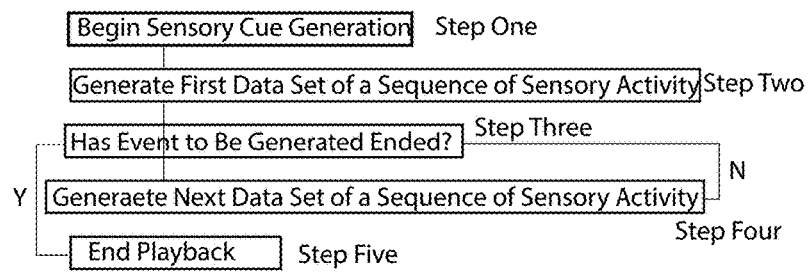
FIG. 30(b) is a flow chart illustrating the steps for generating data sets of a sequence of sensory activity of an event that has been collected.

FIG. 30(a) is a flow chart illustrating the steps for collecting data sets of a sequence of sensory activity of an event to be replicated, transmitted and/or recorded. FIG. 30(b) is a flow chart illustrating the steps for generating data sets of a sequence of sensory activity of an event that has been collected. FIG. 30(a) is a flow chart illustrating the steps for collecting data sets of a sequence of sensory activity of an event to be replicated, transmitted and/or recorded. The collected data can be from an actual events made from a real world action, such as for controlling a drone flight or for human/human interaction, or the collected data can be determined from a computer program code, or a combination of real world collected data and computer generated data, so that data sets of a sequence of sensory activity can be generated during a remote control activity, entertainment experience, and/or a learning session. FIG. 30(b) is a flow chart illustrating the steps for generating data sets of a sequence of sensory activity of an event that has been collected. The generated data can be from the collected data of actual events made from a real world action, such as a piano key being played, or the generated data can be determined from a computer program code so that data sets of a sequence of sensory activity can be generated.

Figure 31A:
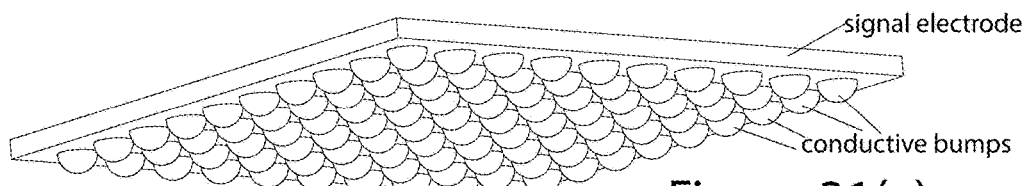
FIG. 31(a) is a perspective view showing an embodiment of a signal electrode having conductive bumps.
Figure 31B:
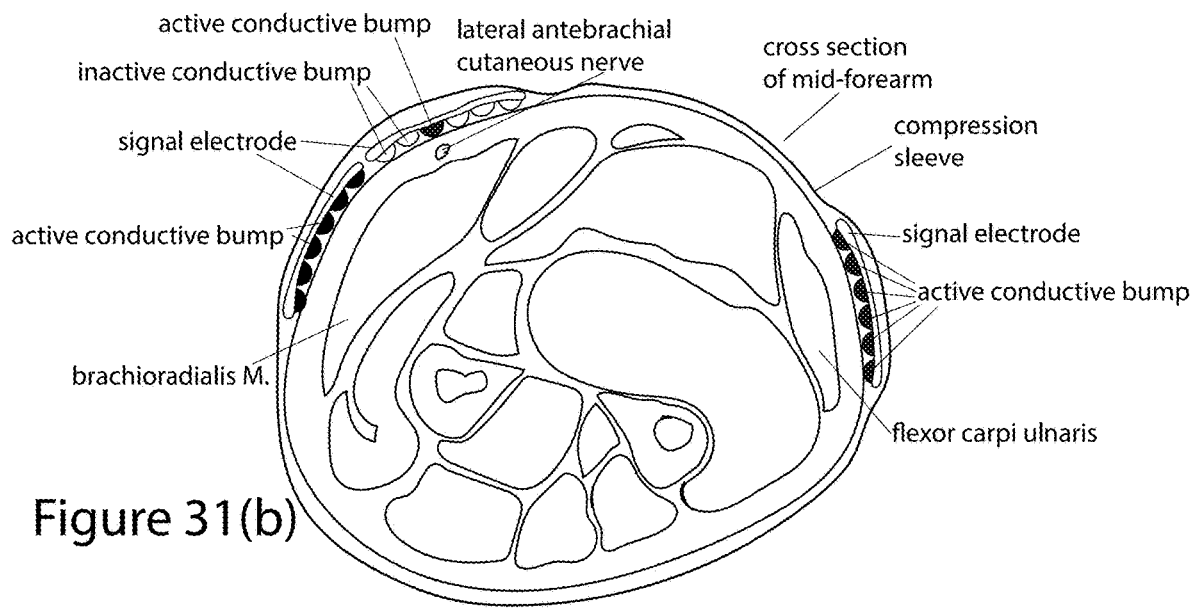
FIG. 31(b) is a cross section of mid-forearm showing conductive bump signal electrodes selectively applying and detecting electrical activity to muscles and nerves.

FIG. 31(a) is a perspective view showing an embodiment of a signal electrode having conductive bumps. FIG. 31(b) is a cross section of mid-forearm showing conductive bump signal electrodes selectively applying and detecting electrical activity to muscles and nerves. In accordance with an exemplary non-limiting embodiment, the electrical signals applied and received from the user can be applied/received via signal electrodes constructed having conductive bumps.

The conductive bumps enable the electrical activity to be transmitted through the direct contact with the skin. Conventionally, for example, disposable gel electrodes are used to apply and/or receive electrical activity for example, in EMG applications. However, the application of gel electrodes is time consuming and inconvenient, especially if there is hair on the user's body part on which the electrode is being applied. In accordance with a non-limiting embodiment, addressable conductive bumps can be used to apply and receive the electrical activity targeted at specific muscles and nerves of the user. To maintain good electrical communication with the skin, a compression sleeve can be used to urge the conductive bumps towards the skin of the user. Similar to the conductive patch Human Machine interface described here, the conductive bumps can be individually addressable via a suitable conductive pathway from a signal generator (e.g., microprocessor signal control circuit). This enables, for example, specific targeting of physiological features, such as individual nerves, or larger areas of electrical stimulation, such as portions of muscles. A plurality of conductive patches or conductive bumps apply an electrical signal through the skin of a user to stimulate electrical signal receptors. A signal generator generates a plurality of haptic cues in the form of electrical signals applied to the skin of the user through the plurality of conductive patches. The plurality of haptic sensory cues are capable of being perceived by a sense of touch or muscle movement of the user. The plurality of electrical signals may have at least one characteristic including location, timing, pulse length, frequency and amplitude effective to cause at least one of a predetermined sensation and muscle movement in the user. The electrical signal receptors comprise at least one of muscles, nerves and touch receptors. The signal generator further generates a plurality of first sensory cues capable of being perceived by a user, the plurality of first sensory cue being time sequentially generated and effective for stimulating at least one sense of the user. The plurality of haptic cues are time sequentially generated in synchronization dependent on the time sequentially generated plurality of first sensory cues. An x and y conductor grid can provide electrical communication of the plurality of electrical signals from the signal generator to the conductive patches.

The somatosensory system of the human body is a complex sensory system. It is made up of a number of different receptors, including thermoreceptors, photoreceptors, mechanoreceptors and chemoreceptors. It also comprises essential processing centers, or sensory modalities, such as proprioception, mechanoreception (touch), thermoception (temperature), and nociception (pain). The sensory receptors cover the skin and epithelial tissues, skeletal muscles 18, bones and joints, internal organs, and the cardiovascular system.

In accordance with an aspect of the invention, a plurality of haptic sensory cues are generated capable of being perceived by a user 12. The haptic sensory cues are received by the user 12 as computer controlled serially generated electrical signals. The electrical signals invoke at least one of a involuntary body part movement and a perception by the user 12. The involuntary body part movement causing at least an urging towards at least one of a predetermined motion and a predetermined position of the body part dependent on the computer controlled serially generated electrical signals. The perception by the user 12 having a predetermined somatosensory sensation dependent on the computer controlled serially generated electrical signals.

The haptic sensory cues may invoke the perception by stimulating a somatosensory system of a user 12 comprising at least one receptor including thermoreceptors, photoreceptors, mechanoreceptors and chemoreceptors to cause the user 12 to perceive an experience of at least one of proprioception (e.g., body part position and strength of movement), mechanoreception (e.g., touch), thermoception (e.g., temperature), and nociception (e.g., pain).

The HHMI opens new avenues in human-automation interaction and control, including impacting the areas of accelerated learning, physical training and rehabilitation. The ability to identify muscle groups 18 at a sufficient level of definition, and the ability to apply electrical signals at a similar level, results in a system in which previously-known actions and muscle movements could be developed for improved physical training and correction of physical motion. Muscle memory associated with nearly all kinds of human activities can be more quickly developed to learn, for example, a musical instrument or sport technique. For military applications, rapid muscle memory build up could enhance the training of soldiers in basic and advanced weapons. Additionally, new forms of safety restraints could be provided in which the human user 12 is prevented through the HHMI-applied electrical signals from taking an action that may result in injury or undesired action.

Medical use examples include non-invasive, non-chemical means to counteract involuntary tremors caused by Parkinson's disease; stroke injury and other brain damage rehabilitation through rewiring of the damaged brain by the synchronized application of computer-controlled haptic, audio and visual cues; and, the treatment of autism by providing a sensation replicating light pressure thereby providing therapeutic benefits using a custom-calibrated, mobile and convenient system.

As shown in FIGS. 32 and 33, a non-limiting exemplary embodiment of an inventive haptic Human Machine interface (HHMI) is configured as a sleeve that can be worn by a user 12, with the detection and application of electrical signal activity obtained through a user-calibrated grid of conductive patches or electrodes 14. FIG. 32 illustrates a user's arm 16 without skin showing the relative locations of the muscle groups 18 of the arm 16. FIG. 33 illustrates the arm 16 with the HHMI sleeve having electrodes 14 targeting individual muscles 18 or muscle groups 18. The HHMI sleeve may include an x-y grid of relatively smaller signal receiving transducers or electrodes 14 and relatively larger signal applying electrodes 14 targeting individual muscles 18 or muscle groups 18 (see, for example, FIG. 72), or as shown I FIG. 33 the electrodes 14 may be uniform in size and distribution. The HHMI may be in the form of a comfortable, easily worn garment that is worn with little restriction of movement.

Electrical signals are applied to the user 12 via the plurality of electrodes 14. Each electrode is disposable in electrical communication with one or more biological components of the user 12. At least one electrode is individually addressable to be selectively in an on-state or an off-state. In the on-state the electrical signals flow through the electrode to at least one biological component of the user 12. In the off-state the electrical signals do not flow through the electrode to the biological component. Each electrode is individually addressable to detect electrical activity of the biological component during a signal detecting operation and apply the electrical signals to the biological component during a signal applying operation.

The HHMI may be configured as a sleeve that is part of a garment, or a self-contained wearable electronic that maps the sources of electrical activity (the subcutaneous muscles 18 and nerves) and hence determines the best locations to detect and to apply the electrical signals for a particular user 12. Neuromuscular electrical stimulation is applied as a low frequency, relatively high intensity pulse. The pulse, which may be biphasic, triggers the alpha motor nerves that cause muscle movement. The higher the intensity of the electrical stimulus, the more muscle fibers will be excited, resulting in a stronger contraction. The contraction can have different speeds and duration of the contraction dependent on the characteristics of the applied electrical signal. The characteristics of the applied electrical signal can be controlled to cause isometric and/or isotonic muscle contraction, where an isometric muscle contraction leads to a tension in a muscle, without changing the length of the muscle, and isotonic muscle contraction, results in a shortening of the muscle. In accordance with the inventive haptic interface, a computer controls the characteristics of electrical signals applied to, for example, the motor neurons of the user's nervous system to cause a desired sensation and/or muscle movement. Exciting the motor neurons via the body's nervous system produces a similar result as when the neurons are excited through the computer controlled electrical stimulation.

In accordance with the inventive haptic interface, computer controlled electrical signals can be applied with signal characteristics effective to stimulate one or more of the tactile receptors found in the skin. The signal characteristics are controlled to selectively stimulate the receptors that have, for example, different receptive fields (1-1000 mm2) and frequency ranges (0.4-800 Hz). For example, broad receptive-field receptors like the Pacinian corpuscle produce vibration tickle sensations. Small field receptors such as the Merkel's cells, produce pressure sensations.

The HHMI may be used for applications including accelerated learning, brain damage rehabilitation, military and sports training and drone/robotic remote control and sensing. In some configurations, the HHMI includes a thin, flexible sleeve that is unobtrusively worn by a patient. The sleeve has many small electrodes 14 in contact with the skin surface, connected in a matrix and addressed, for example, using electronic techniques borrowed from active and passive matrix video displays. A lightweight, comfortable, haptic sleeve can be configured having electrode size and density enabling automatic calibration to the unique physiology of the patient. The haptic sleeve provides precise electrical activity detection (for example, to detect the muscles 18 and nerves involved in even subtle arm movement indicating the onset of a persistent Parkinsonian tremor) and nearly instantaneous electrical signal application (to cause involuntary and accurate muscle and nerve impulses that counteract and negate the undesirable arm trembling that would have otherwise occurred). The applied electrical signal and resultant muscle contraction is perceived as a massage sensation by the patient. In this case, the use of the HHMI provides a wearable electronic device used as a non-invasive, non-chemical means to effectively mitigate tremors caused. for example by stroke, accident or by Parkinson's disease.

In another Human Machine interface example, a drone (or robot) is interfaced with an operator via the HHMI and AR or VR components to create a remotality (a remote reality) for a pilot or operator, in a sense making him feel as if he actually becomes the drone, having the sensation (sights, sounds, skin sensations) of flying like superman while piloting a real-world flying drone.

In accordance with another aspect of the invention, a plurality of haptic sensory cues are generated capable of being perceived by a user 12. The haptic sensory cues are received by the user 12 as computer controlled serially generated electrical signals. The electrical signals invoke an involuntary body part movement causing at least an urging towards at least one of a predetermined motion. Alternatively, or additionally, the signals invoke a perception by the user 12 having a predetermined somatosensory sensation dependent on the computer controlled serially generated electrical signals.

Figure 34:
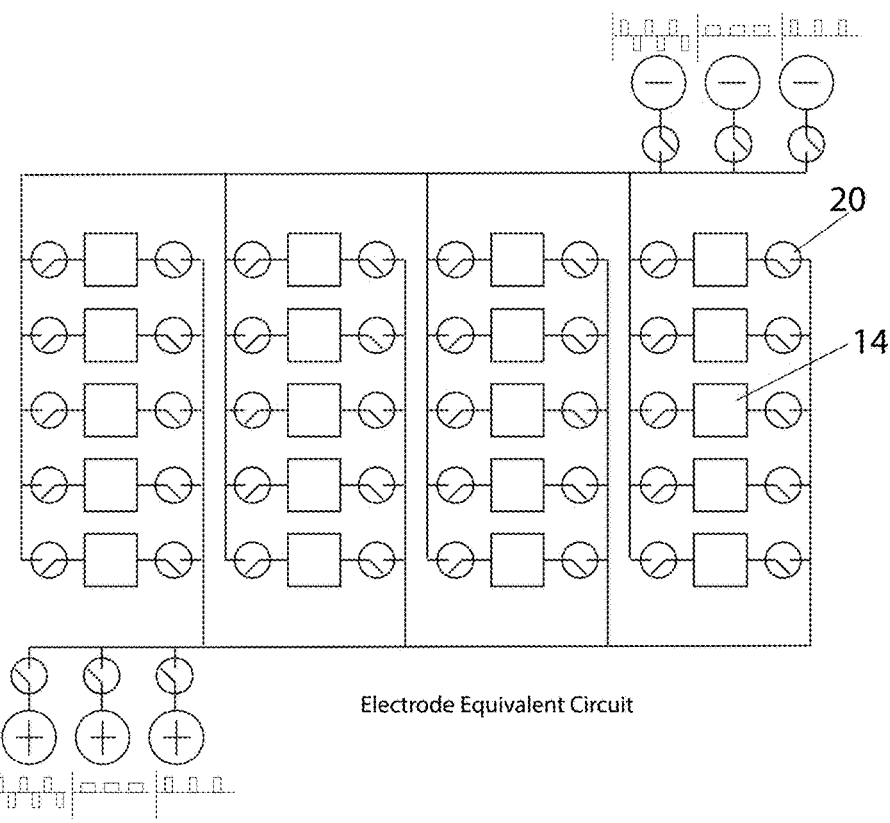
FIG. 34 schematically illustrates an electrode equivalent electronic circuit for applying and detecting electrical signals.

FIG. 34 schematically illustrates an electrode equivalent electronic circuit for applying and detected electrical signals. In an example use of the inventive HHMI, the exemplary embodiments include electrical circuits, such as those shown here or equivalents, that are used to detect the onset of an involuntary tremor of a user 12. Electrical signals are determined by a microprocessor to have electrical characteristics effective to mitigate the involuntary tremor. The electrical signals are applied to the user 12. The electrical signals may be applied to the user 12 via a plurality of electrodes 14 where each electrode is disposable, for example, using the haptic sleeve, garment or body suit shown herein. Each electrode is in electrical communication with one or more biological components of the user 12, such as the skin of the user 12 and through the skin the nerves and muscles 18. As an alternative, or in addition to skin surface contact, one or more of the electrodes 14 may be disposed subcutaneously, for example, to apply or detect electrical signal at muscles 18 or nerves that are deep beneath the skin layer. These subcutaneous electrodes 14 may be permanently or semipermanently left in place, or they may be, for example, acupuncture-type needles that are applied and then removed when not in use.

At least one electrode may be individually addressable to be selectively in an on-state or an off-state. In the electrical equivalent electronic circuit switches 20 are symbolically shown. In an actual circuit, the on/off state can be controlled through electronic switch mechanisms that include, but are not limited to transistors 22, reed switches 20, relays, optoisolators, and the like. A combination of known electrical circuit components and microprocessor controlled devices can be used. In the on-state the electrical signals flow through the at least one electrode to at least one biological component of the user 12 and in the off-state the electrical signals do not flow through the at least one electrode to the at least one biological component of the user 12.

Figure 35:
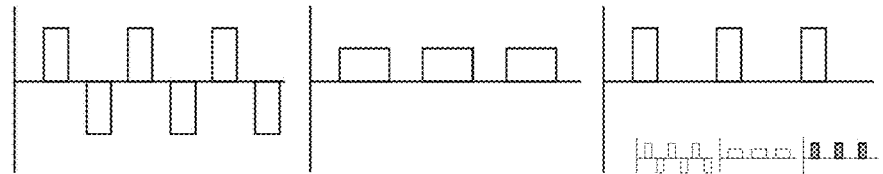
FIG. 35 illustrates pulse square waves depicting computer generated electrical signals that can be selectively applied via the electrode equivalent electronic circuit.
Figure 36:
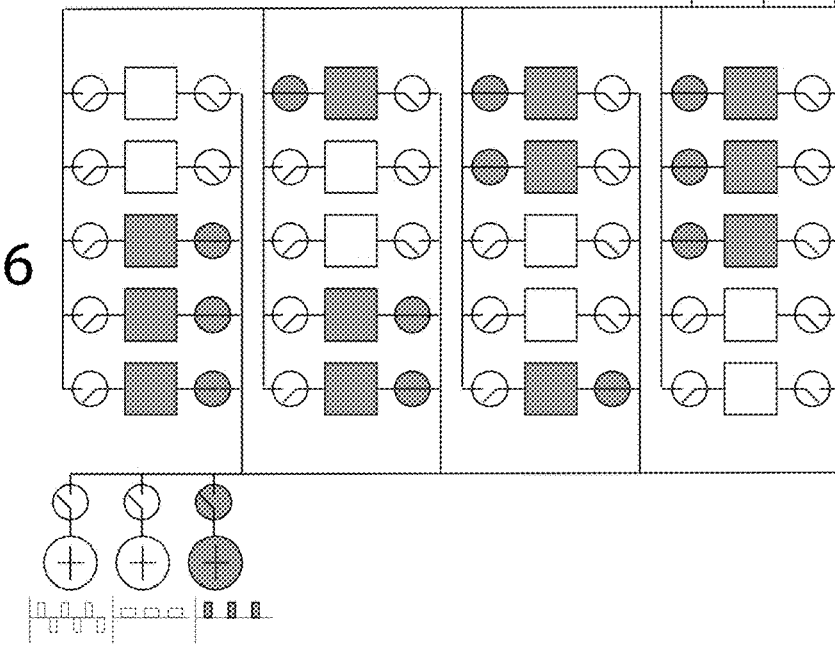
FIG. 36 shows the electrode equivalent electronic circuit applying a selected electrical signal applied to selected electrodes.

FIG. 35 illustrates pulse square waves depicting computer generated electrical signals that can be selectively applied via the electrode equivalent electronic circuit. The electrical signal (e.g., a haptic electrical signal) may have characteristics that depend on a pulse wave, although the application of any electrical signal that results in a desired movement, urging, sensation, etc., may be applied. FIG. 36 shows the electrode equivalent electronic circuit applying a selected electrical signal applied to selected electrodes 14. The HHMI can be configured to allow biphasic, multiphasic or monophasic action potential, with the electrodes 14 each individually addressable to be selectively on/off and allow positive or negative current flow through the individual electrode. This provides great flexibility to the electrical signal application. The plurality of electrodes 14 are individually addressable or can be addressed in clusters, and can be selectively grouped to form an electrode pattern that conforms to a preferred area shape, for example, to match the shape of the targeted muscle or biological feature. The duration and frequency of each applied signal can vary among two or more signal choices. The applied signals can be as complex as necessary and the applied location on the user's body can be as precise are required, to create involuntary fine motor control to enable, for example, the finger patterns for actuating musical instrument keys 34 to be achieved either totally involuntarily or aided and guided.

The electrode may be individually addressable so that when in the on-state a direction of current flow of the applied electrical signals can be selectively at least one of positive or negative. The biological component may comprises a component of at least one of a muscle, nervous, lymphatic, organ, skin, sensory and other biological system of the user 12. The electrode may be individually addressable in accordance with pulse width modulation so that the effective electrical energy of the applied electrical signals flowing through the at least one electrode to the biological component can be independently reduced relative to the applied electrical signals without pulse width modulation. The response of the muscle and nerves will tend to integrate an applied pulse electrical signal.

Another electrode of the plurality of electrodes 14 may be individually addressable in accordance with pulse width modulation so that the effective electrical energy of the applied electrical signals flowing through the other electrode to the biological component is different than the effective electrical energy of the applied electrical signals flowing through the first electrode to the biological component. This enables different areas of the biological component to receive different effective electrical energies of the same applied electrical signals. A portion of the plurality of electrodes 14 may be selectively driven as groups forming an electrode pattern conforming to a target area of the biological component.

Figure 37:
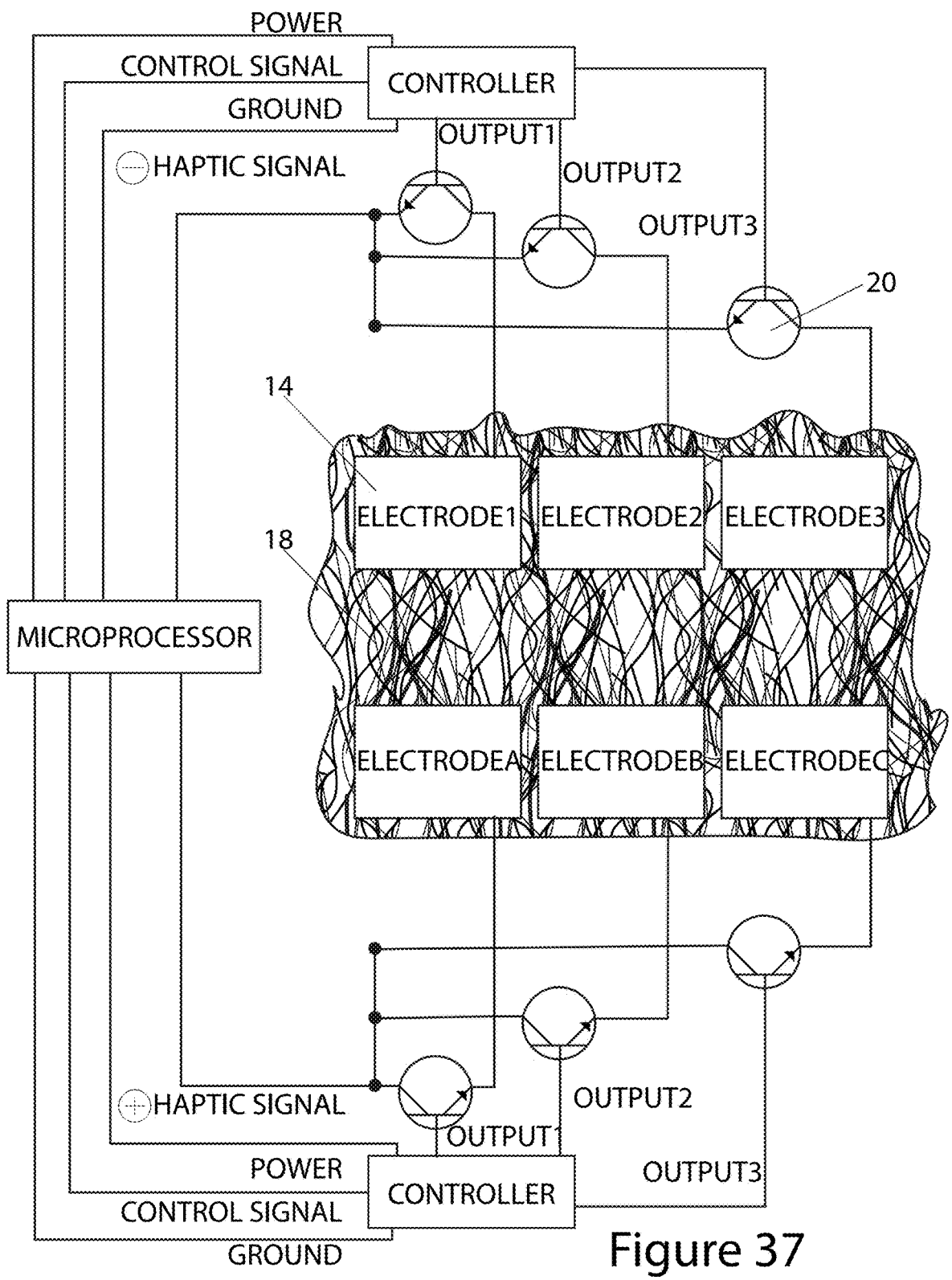
FIG. 37 illustrates an electronic circuit including a plurality of addressable electrodes for applying and/or detecting electrical signals to muscle fibers and nerves.

FIG. 37 illustrates an electronic circuit including a plurality of addressable electrodes 14 for applying and/or detecting electrical signals to muscle fibers and nerves. Transistors can be used to switch a haptic signal under the control of a controller. The controller is in turn controlled by a microprocessor. The control and microprocessor can be integrated together, or separated elements. For example, the microprocessor can be a smart phone or other readily available electronic device, or it can be a dedicated device. The controller may be a small integrated circuit device that is associated with an electrode or group of electrodes 14 and disposed within flexible circuit layers of the HHMI. The electrical signals may be applied as haptic sensory cues received by the user 12 as computer controlled serially generated electrical signals. The electrical signals invoke may invoke at least one of an involuntary body part movement having a predetermined motion dependent on the computer controlled serially generated electrical signals and a perception having a predetermined touch sensation dependent on the computer controlled serially generated electrical signals.

Exemplary schematic wiring diagrams of a driving circuit is shown in FIGS. 37-41. There are a variety of electronic circuits that can be employed to create some or all of the features shown in the schematic wiring diagram. As the wiring diagrams illustrate, each electrode may be selectively addressed to be in an on or off state. The HHMI includes a plurality of electrodes 14 wherein each electrode is disposable in electrical communication with one or more biological components of the user 12, at least one electrode being individually addressable to be in an on or off state, wherein in the on state the electrode allows the haptic electrical signal to flow to the biological component and the off state does not allow the electrical signal to flow to the biological component, the at least one electrode being individually addressable so that when in the on state a direction of current flow of the haptic signal can be either positive or negative through the at least one electrode. The biological component can comprises a component of at least one of a muscle, nervous, lymphatic, organ, skin, sensory and other biological system of the user 12. That is, the biological component is a system of the user's body that is reactive to the applied electrical signal. For example, in the case of the muscle and nervous systems, the applied electrical signal can invoke one or both of a perceived sensation and an involuntary movement. The perceived sensation and/or involuntary movement can be felt by the user 12 as a guiding force, for example, to urge the user 12 hands and fingers towards a position of a pattern of a musical chord being played on a piano, with a selected individual finger sensation of striking a key of the piano indicating the finger pattern and keys 34 that a struck by the fingers to achieve the desired musical chord.

Figure 38:
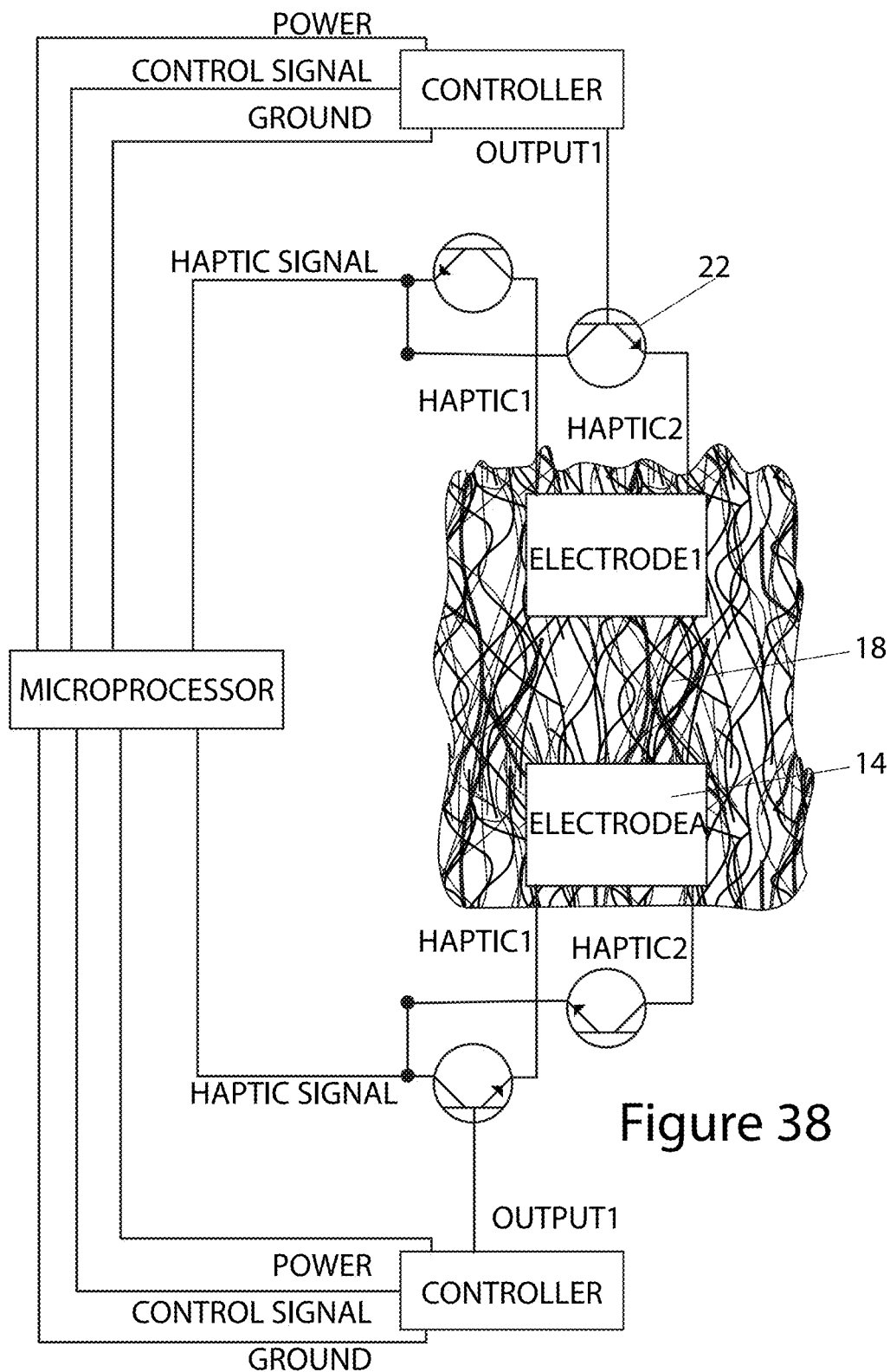
FIG. 38 illustrates another electronic circuit including a plurality of addressable electrodes for applying and/or detecting electrical signals to muscle fibers and nerves.

FIG. 38 illustrates another electronic circuit including a plurality of addressable electrodes 14 for applying and/or detecting electrical signals to muscle fibers and nerves. In this exemplary embodiment, a transistor 22 associated with an electrode can be used to allow current flow in one direction and another transistor 22 can be used to allow current flow in the other direction. At least one electrode is individually addressable so that when in the on-state a direction of current flow of the applied electrical signals can be selectively either positive or negative. In a medical use example, the onset of an involuntary tremor motion is detected in a body part (e.g., a Parkinsonian arm/hand tremor) by amplifying the electrical activity in the muscles 18 and nerves. This detected electrical activity is then used to determine the characteristics of an electrical signal that is then applied back to the muscles 18 and nerves to mitigate the tremor motion. The electrical signals are detected and transmitted through surface contact with the skin, the product is a wireless, wearable electronic, with no chemicals or invasive and dangerous procedures.

Figure 39:
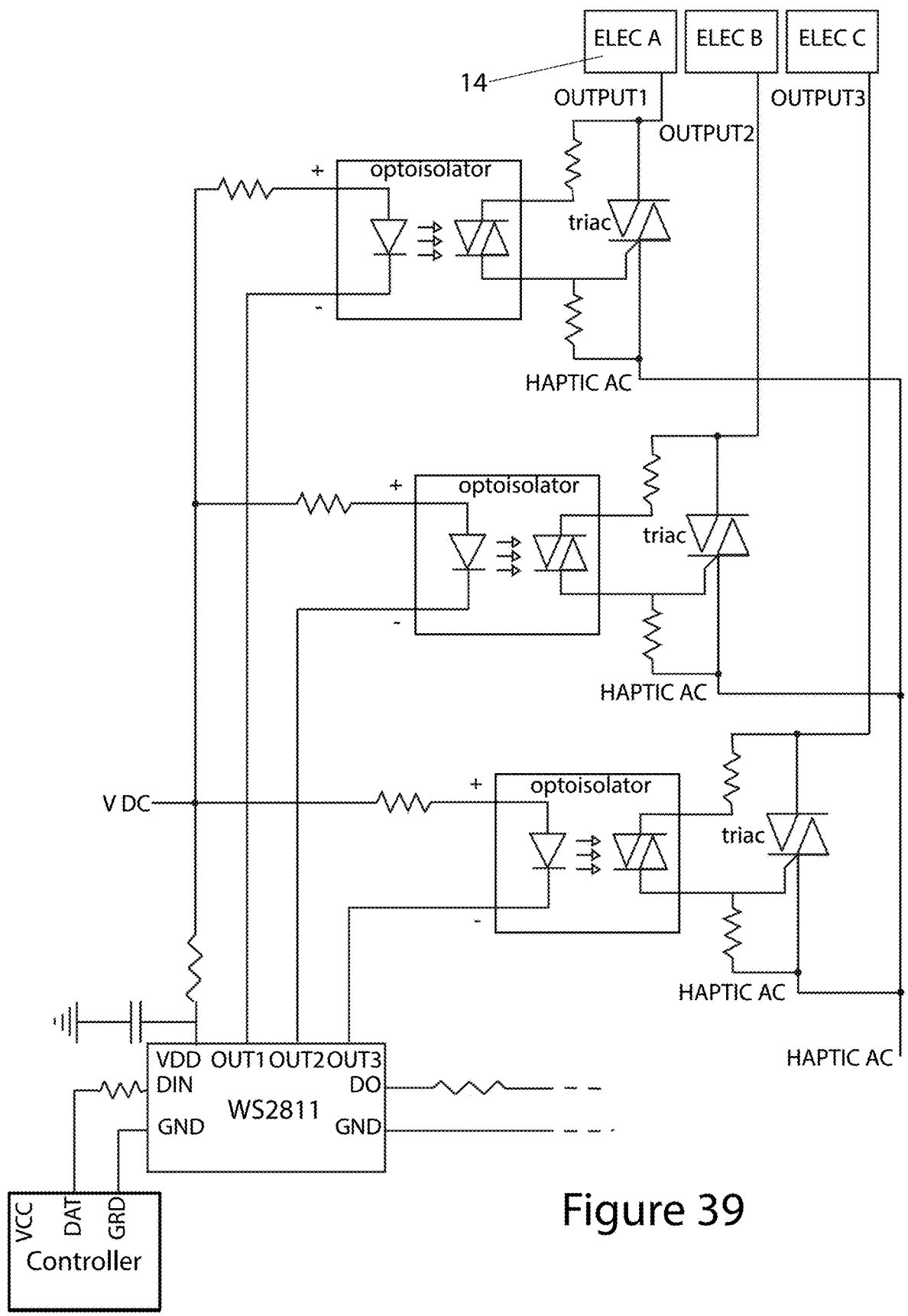
FIG. 39 is a schematic of another electronic circuit example having a PWM driver for selectively applying a pulse width modulated AC or DC haptic electrical signal to selected addressable electrodes.

FIG. 39 is a schematic of another electronic circuit example having a PWM driver for selectively applying a pulse width modulated AC and/or DC haptic electrical signal to selected addressable electrodes 14. Optoisolators can be used to separate, for example, a low voltage DC control circuit from, for example, a high voltage AC haptic signal. The circuit may be constructed similar to the use of an integrated driver known as WS2812 available from World Semi, China, for driving an RGB LED array, but adapted so that each electrode pair or selected grouping of electrodes 14 (e.g., ELECTRODE A and ELECTRODE 1 pair shown in FIG. 7, or electrode grouping comprising any two or more electrodes) can be activated in a pulse width manner to selectively apply the haptic electrical signal wherein an electrical circuit that includes the electrode pair also includes a biological component such as the skin, nerves and muscles 18 of the user 12. Using a driver, such as WS2812 also provides an advantage in that soft-ware and circuit devices, such as the Arduino, can be readily adapted for the HHMI use speeding the development and providing the potential for open source advancements. The electrical circuits may include regulators to ensure that the electrical signal applied is always within a safety constraint. As another similar example driver, the WS2811 8-bit PWM driver controls three LED (RGB) channels (total of 24 bits) and provides a potential integrated circuit that has a construction and functionality useful for illustrating some of the inventive concepts of the electrical circuits shown herein. The use of these example drivers is for illustrative purposes, there being other discrete electronic and integrated solutions that could be used.

Like persistence of vision, the detected and applied signals can be samples that are representative of muscle activity/detection and pulses that are effective to cause precise involuntary muscle pulses that appear smooth. The applied signal can be as complex as necessary so that, for example, a varying PWM pulse can be applied at varying effective strengths to nearly instantaneously varying locations and surface areas of the user's skin.

The haptic sensory cues may stimulate a somatosensory system of a user 12 comprising at least one receptor including thermoreceptors, photoreceptors, mechanoreceptors and chemoreceptors to cause the user 12 to perceive an experience of at least one of proprioception, mechanoreception, thermoception, and nociception. The haptic sensory cues may be generated in synchronization dependent on time sequential data. The electrical signals simultaneously stimulate both the involuntary body part movement and the perception by the user 12 related to the sense of touch.

Figure 40:
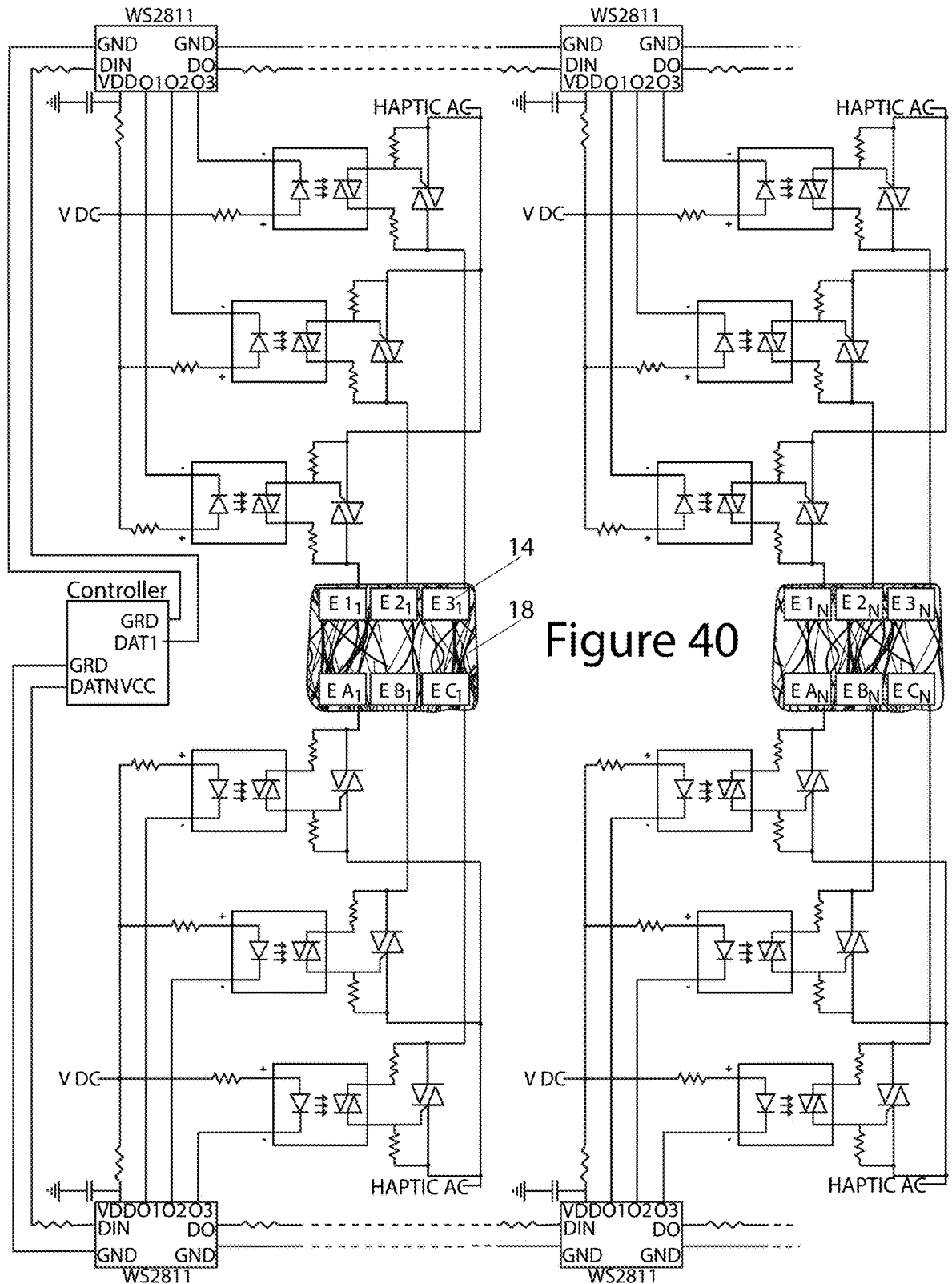
FIG. 40 is a schematic showing the electronic circuit example for applying the electrical signal through muscle and nerve fibers through a plurality of individually addressable electrodes.

FIG. 40 is a schematic showing the electronic circuit example for applying the electrical signal through muscle and nerve fibers through a plurality of individually addressable electrodes 14. In this circuit, the circuit module shown in FIG. 39 is reproduced for multiple electrodes 14. The number of electrodes 14 can be significant, in particular for a whole body HHMI or HHMI shirt. The driver and electronic circuitry used to control a large number electrodes 14 may borrow from, for example, known electronic circuit for driving passive or active matrix displays, multiplexers, etc., but adapted as necessary to apply the haptic electrical signal.

Figure 41:
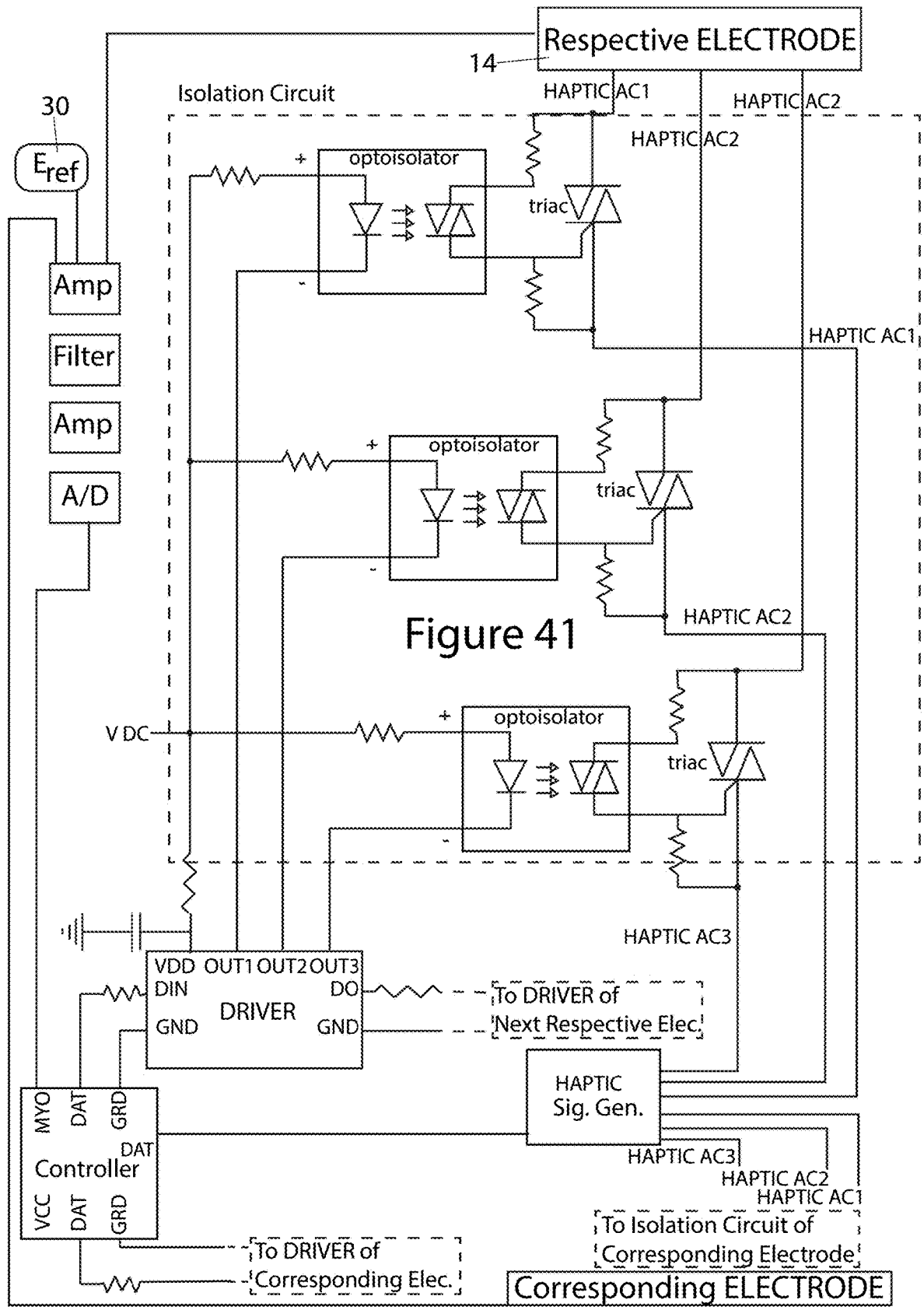
FIG. 41 is a schematic showing a repeatable circuit element for individually addressing a respective electrode and a corresponding electrode of a plurality of electrodes to selectively apply, detect or switch off signals to the addressable electrodes.

FIG. 41 is a schematic showing a repeatable circuit element for individually addressing a respective electrode and a corresponding electrode of a plurality of electrodes 14 to selectively apply, detect or switch off signals to the addressable electrodes 14. Further, the least one electrode can be individually addressable to provide a relative strength and/or duration of the applied signals that flow through the biological component through the corresponding electrode. For example, the electrodes 14 can be individually addressable in accordance with pulse width modulation so that the effective electrical energy of the applied electrical signals flowing through the at least one electrode to the biological component can be independently reduced relative to the applied electrical signals without pulse width modulation. Using this driving technique, haptic electrical signals can be applied having a complex electrical characteristic having varying effective electrical energy applied as pulses at specific electrodes 14 to cause precise movements and perceived sensations. The same electrodes 14 can be used to apply the electrical signal generated by the controller or microprocessor and to detect the myographic data. The microprocessor controls the electronic circuit so that the haptic signals are selectively applied to the electrodes 14, and the myographic data are selectively detected from the same electrodes 14.

Figure 42:
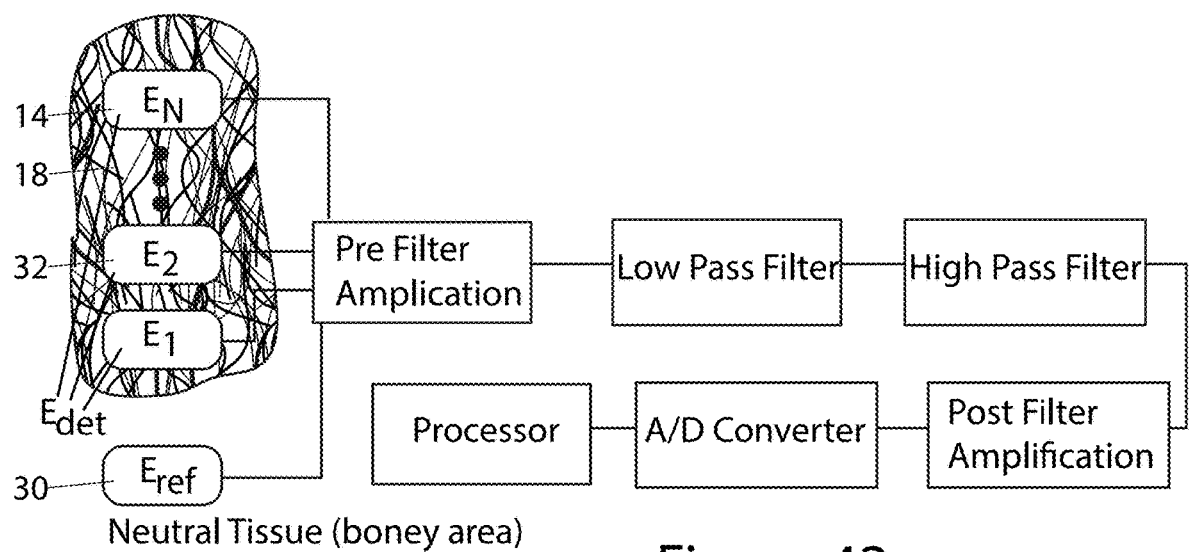
FIG. 42 illustrate an exemplary embodiment including an electronic circuit for detecting electrical activity of muscles and nerves from a plurality of electrodes.

FIG. 42 illustrate an exemplary embodiment including an electronic circuit for detecting electrical activity of muscles 18 and nerves from a plurality of electrodes 14. In accordance with another aspect of the invention, electrical activity is received from at least one of muscles 18 and nerves of a user 12. An electrical signal is determined having characteristics based on the received electrical activity. The electrical signal is generated and applied to the user 12 to cause an action dependent on the received electrical activity.

For example, in a medical use application, the received electrical activity may be the result of an involuntary tremor of the user 12. The characteristics of the electrical signal can be determined based on the involuntary tremor to cause involuntary muscle movement that counteracts the involuntary tremor.

The electrical signal can be generated as an electrical signal having the characteristic to cause the involuntary muscle movement that counteracts the involuntary tremor. The electrical signal may be selectively applied to the user 12 using the addressable electrodes 14 to cause the muscle movements that counteract the involuntary tremor. The electrical signal may be applied through a plurality of conductive patches (electrodes 14) for applying an electrical signal through the skin of a user 12 to stimulate electrical signal receptors. The applied electrical signal may comprise a plurality of different electrical signals applied to different locations of the user 12 via the circuit construction described herein so that the different electrical signals have at least one varying characteristic including location, timing, pulse length, frequency and amplitude effective to cause at least one of a predetermined sensation and muscle movement in the user 12. The applied electrical signal can thus be received by electrical signal receptors of the user 12 comprising at least one of muscles 18, nerves and touch receptors, causing an involuntary movement and/or a perceived perception of a somatic and/or kinesthetic sensation.

As discussed in more detail herein, in addition to the haptic sensory cues applied using the HHMI, a plurality of first sensory cues (e.g., visual and/or auditory) can be generated capable of being perceived by a user 12. The plurality of first sensory cues are time-sequentially generated and effective for stimulating at least one sense of the user 12. The electrical signal may comprise a plurality of haptic cues time-sequentially generated in synchronization dependent on the time-sequentially generated plurality of first sensory cues. The electrical signal may be applied to the user 12 using a conductor grid for electrical communication of the electrical signal to the conductive patches.

The HHMI has many small electrodes 14 that are individually addressable to form localized groups conforming to the correct location and size of the patient's body to optimally apply precisely targeted electrical signals and control subtle movement, such as finger, arm and hand movements. As shown the same electrodes 14 that apply the computer generated signal, using a different addressing scheme that may include ground electrodes 14 positioned at bony parts of the arm 16, are locally group by the driving circuitry and software to form detection regions at isolated muscles 18 and nerves.

In accordance with an exemplary embodiment, the HHMI is configured as a therapeutic wearable electronic device that interfaces the user 12 with a small, mobile microprocessor, portable communication device, smart phone, tablet or the like. The HHMI includes electrodes 14 in contact with the skin surface of the user 12, connected via conductive leads and individually addressable. In accordance with exemplary embodiments, the same electrodes 14 are used to detect and apply electrical signals from/to the muscles 18 and nerves.

For example, the HHMI can be configured as a wearable electronic device that mitigates the effects of Parkinson's tremors without drugs or invasive surgery. As described in more detail herein, there are also several notable other medical uses that start with this wearable electronic device as an enabling technology for stroke and brain damage rehabilitation through the simultaneous controlled application of sensory cues (for "re-wiring" a damaged brain).

In accordance with this exemplary use, the patient wears a comfortable garment, like a long underwear sleeve, that creates a feedback loop from the involuntary tremor movement just as the body part (e.g., arm/hand) begins to move (that is, the Parkinsonian shaking action caused by involuntary muscle contractions/relaxations). The feedback is in the form of the applied electrical signal that causes an opposing muscle contraction/relaxation (or that disrupts the nerve signals causing the involuntary muscle movement) that steadies the shaking arm 16 and hand. The patient wears this wireless, comfortable, haptic sleeve and feels this feedback as a gentle massaging action that pulses in sync with the involuntary tremor. But, the pulses are timed so as to prevent the tremor movement, and the undesirable shaking action is mitigated.

By selecting the appropriate individually addressable electrodes 14, the pattern of the electrodes 14 is shaped to match the underlying muscles 18 and nerves. The HHMI may include registration indications, such as a seam that runs lengthwise, IR reflectors, or other indicia, and is oriented to the elbow and wrist of the user 12. The HHMI starts with a close approximation because of alignment and generally consistent human physiology, after the calibration process the HHMI ends up with user-specific and accurate mapping of electrodes 14 to the tremor causing muscles 18 and nerves (activity detection) and the tremor counter-acting muscles 18 and nerves (signal application).

Electrical signals from oscillatory body movement are detected to determine the onset of tremor and to detect the muscles 18 that are involuntarily contracting/flexing to cause unwanted movement. Counter-tremor muscles 18 are determined that when stimulated will resist the unwanted movement. The strength and other characteristics of an applied electrical signal are determined to counteract tremor and hold the body part substantially steady or at least mitigate the tremor motion.

Figures 43, 44, 45, 46:
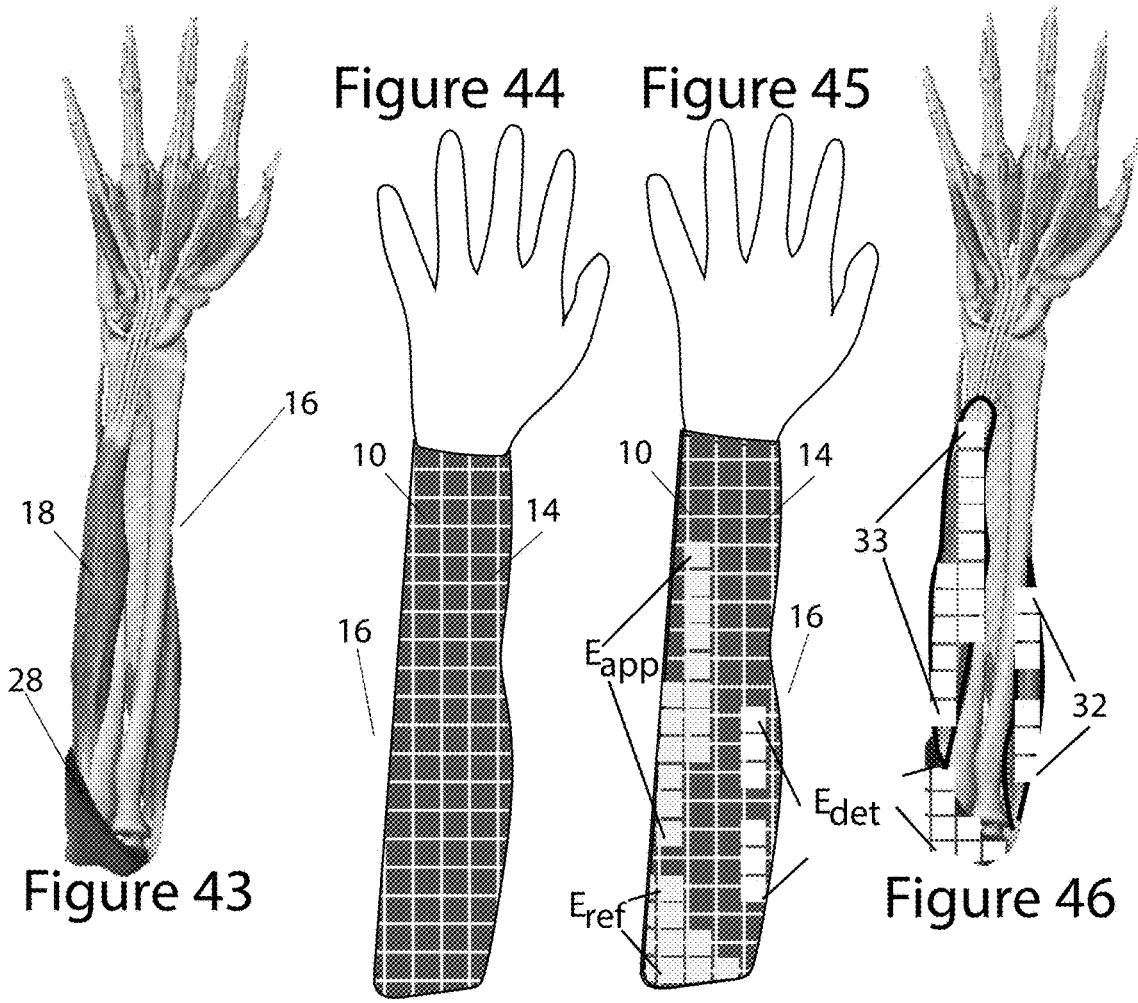
FIG. 43 shows the muscles and bones of the forearm and hand of a user.
FIG. 44 shows the forearm and hand of the user illustrating an exemplary embodiment of the inventive HHMI.
FIG. 45 illustrates detected electrical signals indicating the onset of a tremor and the application of electrical signals applied to tremor mitigation muscles.
FIG. 46 shows the locations of the muscles having the detected and applied electrical signals.

FIG. 43 shows the muscles 18 and bones of the forearm 16 and hand of a user 12 that are used in hand/digits extension. The flexor digitorum profundus 24 is used to bring the fingers in towards the palm and the extensor digitorum 26 is used to bring the fingers back away from the palm. The ulna 28 is the bone that terminates at the elbow. In this example, a flexion-extension tremor causes an involuntary shaking of the hand. FIG. 44 shows the forearm 16 and hand of the user 12 illustrating an exemplary embodiment of the inventive HHMI, the electrodes 14 are shown without the housing or covering, flexible electronics, insulators, etc. so that the locations of the individually addressable electrodes 14 with relation to the user's body anatomy can be more clearly understood. In actual construction, the HHMI is a multilayered structure that has self-contained flexible materials and electronics. FIG. 45 illustrates—detected electrical signals indicating the onset of an extension portion of the tremor. The electrical activity causing the contraction of the extensor digitorum 26 is detected using the individually addressable electrodes 14 that are in best electrical communication with the extensor digitorum 26. FIG. 46 shows the locations of the muscles 18 having the detected and applied electrical signals. MRI or other imaging can be used to get graphical starting point for electrode placement, the sleeve can include markers that align with indicators that naturally occurring such as elbow bone, and/or artificial and applied to the skin surface, such as disks that are opaque to the imaging process and adhered to the skin. Once the imaging indicates where the muscles 18 are, the location of the electrodes 14 can be biased for these areas as the starting point of calibration or in lieu of calibration.

As an example, each of the individually addressable electrodes 14 can be scanned to see if electrical activity is occurring at the area of the scanned electrode. A reference electrode (or group of electrodes 14) Eref 30 may be located at the elbow joint, where the bone located close to the skin surface acts as a neutral tissue for the detection of electrical activity using the electrodes 14 located in proximity to the extensor digitorum 26. The detected electrical activity at the grouping of detection electrodes Edet 32 is processed by the microprocessor to determine if the activity is the result of a voluntary or involuntary muscle and/or nerve action. For example, if the patient is known to have a flexion-extention tremor causing the involuntary shaking of the hand, then the microprocessor may be programmed to look for electrical activity consistent with the tremor. If the detected electrical activity is indicative of the onset of a tremor motion, then the muscles 18 (in this case, including the flexor digitorum profundus 24) that mitigate the tremor motion can be determined and the appropriate counteracting electrical signal can also be determined. The timing of the counteracting electrical signals and other signal characteristics are determined by the microprocessor, for example, from data stored in look up tables or using calculations based on measured responses of a population of humans to similar electrical stimulation and than extrapolating from this data, for example using calibration data and the detected activity, the electrical signals that will best mitigate the tremor. The individually addressable electrodes 14 that correspond to the flexor digitorum profundus 24 may be determined, for example, from a stored mapping of the electrodes 14 that is obtained during the calibration and/or refinement procedures. The microprocessor controls the application of the counteracting electrical signals to tremor mitigation muscles 18 using the electronic circuits de-scribed herein, or other appropriate electronic circuit (for example, a scanning or non-scanning multiplexed circuit). The electrical signals that are applied may be complex and different signal wave forms, effective signal strengths, and the like may be used to apply multiple signals through the application electrodes Eapp 33 in proximity to the flexor digitorum profundus 24. A kill switch (not shown) may be provided on the HHMI so that the user 12 can easily stop the application of a computer-generated electrical signal.

The HHMI uses sensory feedback and algorithms to correctly control the characteristics of the electrical stimulation so that involuntary muscle contractions are induced that result in the movement or urging of the body part of the user 12 (e.g., fingers) as if performed voluntarily by the user 12 using precisely controlled muscle movements. An example detection and application of electrical signals is described herein, electrical signals can be detected and applied to other biological systems of the user 12 using the inventive HHMI. The biological system may include at least one of the musculatory, nervous, lymphatic, respiratory, circulatory, digestive systems, and other body systems that is reactive to electrical stimulation.

In some uses, such as accelerated learning or sports training, the HHMI can be a component for detecting and applying haptic sensory data in an AR or VR system where a time sequential first sensory data may be received from a transmitter. A plurality of first sensory cues may be generated dependent on the first sensory data and capable of being perceived by the user 12. The plurality of first sensory cues may be effective for stimulating at least one sense of the user 12. The haptic sensory cues can be generated in synchronization dependent on the plurality of first sensory cues. At least one of the first and the haptic sensory data may include at least one sensed condition sensed at a location remote from the user 12. At least one of the first and the haptic sensory data may include at least one prerecorded sensed condition.

The sensed condition may be recorded as an audio signal, a video signal, and/or data representing at least one of a position of a body part, a smell, a somatic sensation, a kinematic sensation, a movement, a pressure, a temperature, a time duration, an emotion, a taste, and a resistance.

In accordance with an aspect of the invention, a thin, flexible, conformable electrode is provided that provides face-to-face electrical contact with the skin of the user 12, while being particularly adaptable for use in the HHMI.

The HHMI may be provided as a wearable housing supporting the apparatus to provide a user-wearable electronic device. The wearable housing may comprise a multilayered flexible electronic circuit including an electrode layer comprised of a plurality of electrodes 14 having a conductive face disposed for making electrical contact with a biological system of the user 12 and at least one additional layer including at least one of an electrical circuit layer, an electrical insulating layer, an electrical conducting layer, and a flexible covering.

FIG. 47 is a close up cross section showing an embodiment of an electrode for use with the inventive HHMI having conductive loops. FIG. 49 is a cross section showing the embodiment of an electrode for use with the inventive HHMI having conductive loops. The electrode includes a plurality of conductive elements such as conductive loops that may be or may resemble, for example, a conductive hook and loop fastener such as Velcro.

FIG. 48 is a close up cross section showing an embodiment of an electrode for use with the inventive HHMI having conductive stems. FIG. 50 is a cross section showing the embodiment of an electrode for use with the inventive HHMI having the plurality of conductive elements as conductive stems. The stems may be formed, for example, from an expanded metal, laser cutting, or stamping manufacturing process. The electrode may comprise the individual stems formed as a thin, flexible hanging chads fixed at one end to a common sheet from which they are stamped.

FIG. 51 is a perspective view showing an individually addressable electrode for use with the inventive HHMI having conductive stems. FIG. 52 is a perspective view showing conductive stems of the individually addressable electrode for use with the inventive HHMI.

FIG. 53 is a perspective view showing an individually addressable electrode for use with the inventive HHMI having the plurality of conductive elements as conductive hemispheres. FIG. 54 is a cross section showing conductive hemispheres of the individually addressable electrode for use with the inventive HHMI. The electrodes 14 may be formed, for example, by injection molding, stamped, cast or vacuum drawn to form an elastomer, metal or plastic textured substrate. If non-conductive, the substrate can be plated or coated with a conductive material. Various electrode shapes are possible that enhance the face-to-face electrical connection to the user's skin, even if hair is present. For example, the plurality of conductive elements are configured and dimensioned to provide effective face-to-face electrical contact between the individually addressable electrode and the skin of the user 12. The various geometries and dimensions shown herein are examples of the shapes and sizes for individual electrodes 14 that can be readily formed from materials and processes that enable mass production of a thin, lightweight, flexible wearable electronic that can be disposed comfortably in direct contact with large surface areas of the user's skin.

As shown, for example, in FIG. 24, the HHMI includes electrodes 14 in contact with the skin surface of the operator, connected via electrical leads, such as an x-y grid of conductive leads (although the x-y arrangement of conductive leads is just an example), and addressed using techniques borrowed from passive or active matrix video displays (at a lower resolution), and various other known electronic circuits. The electrodes 14 are addressed so as to become an active electrical element for applying the electrical signals or for detecting the electrical signals as described herein so that the HHMI can provide precise electrical activity detection (to detect the muscles 18 and nerves employed in even subtle arm movement) and electrical signal application (to cause involuntary and accurate arm movement).

Figure 55:
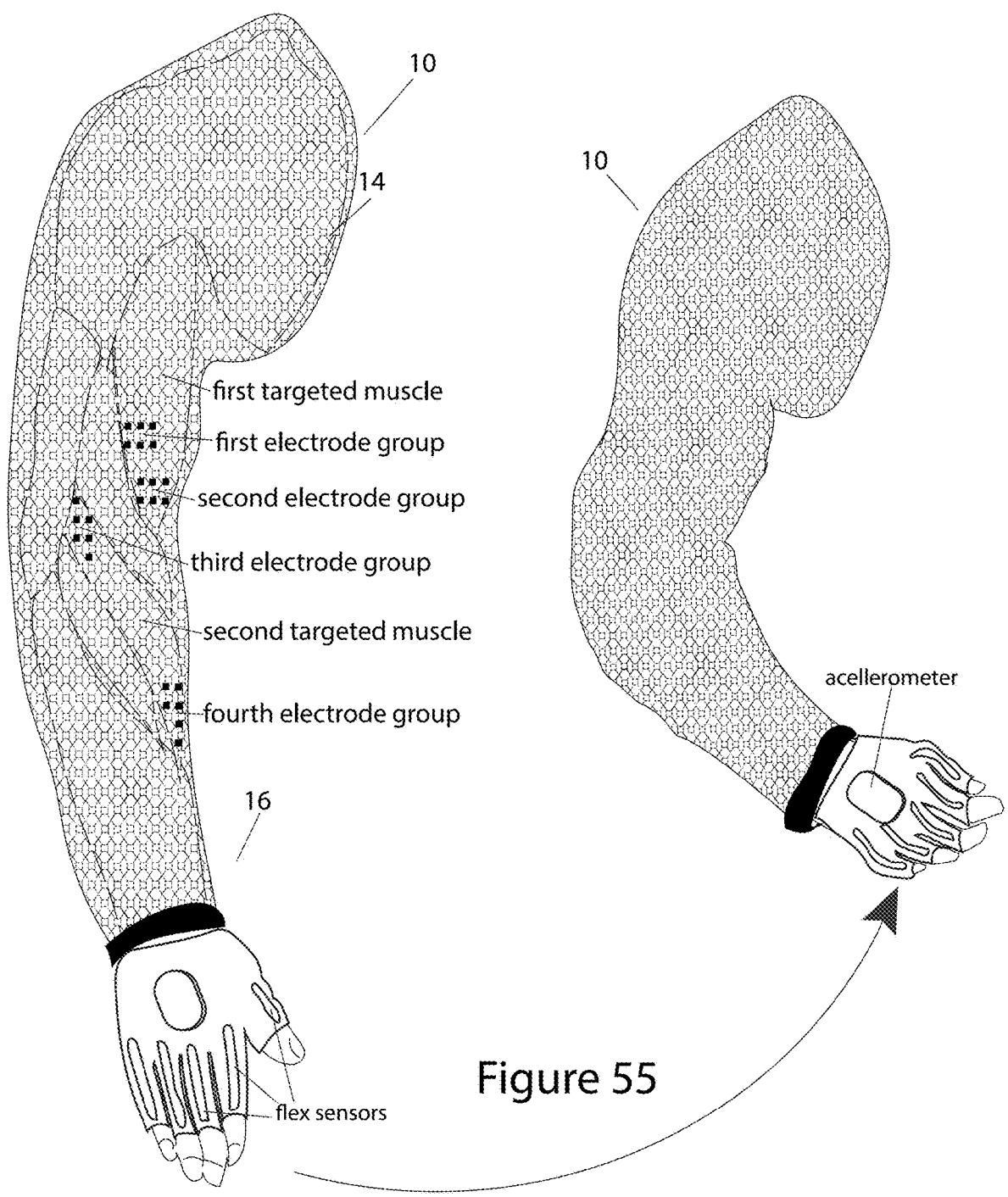
FIG. 55 illustrates an embodiment of the inventive HHMI configured as a sleeve having addressable electrodes connected via a grid of x and y electrodes.

FIG. 55 shows an example where a specific muscle (bicep) is targeted for contraction by applying a transcutaneous electrical signal. The electrical signal is applied as a DC voltage between a first electrode group and a second electrode group. As shown in other circuits the circuit can be modified to include circuit elements so that the appropriate electrode group to invoke a desired muscle response can be determined for example, during a calibration mode. During a calibration mode (described in more detail below), these same first electrode group and second electrode group are used to detect the electrical activity generated when the user 12 performs a known action, such as raising the hand to the chest (contracting the bicep muscle). Additionally or alternatively, the appropriate electrode groups to invoke a desired muscle response can be extrapolated from the calibration data because the general physiology of a human arm 16 is well know. In this case, the calibration mode and/or refinement mode provides fine tuning of a predetermined electrode pattern, where the predetermined electrode pattern is based on human physiology and the fine tuning is based on the particular electrical activity detected for the user 12 during the calibration mode. A strain gauge wire or the like can also be used to detect muscle movement and/or a memory metal used to contract and apply a squeezing force, acting as conductive pathways to the electrodes 14 or provided as separate components.

The inventive haptic interface uses sensory feedback and algorithms to correctly control the characteristics of the electrical stimulation. Muscle contractions can be induced that result in the same movements of the body part of the user 12 (e.g., fingers) as if performed voluntarily by the user 12 using precisely controlled muscle movements.

Muscle contractions and changes in body part positions can be used as metrics during calibration and also to obtain feedback while the applied electrical stimulation causes an automatic and involuntary movement of the user's body parts. The sleeve may include transducers used to measure changes in muscle shape or body part position, or to apply a pressure, such as a squeeze or vibration. For example, a shape memory alloy (which could be formed as a sheath around or otherwise in communication with the electrode lead conductors) or piezo-electric or mechanical vibrators, can be used under control of electrical signals from the computer or microprocessor, to apply haptic cues in the form of pressure or vibration.

The HHMI is constructed of layers of thin flexible materials, such as conductive stretchable fabrics, flexible insulators, flexible circuit boards, and the like. The materials may be woven, spun, closed cell, open cell, thin film, or other suitable structure.

Layers, bonded layers, and constituent elements of the HHMI may be printed using a 3D printer, or formed by a batch or roll-to-roll manufacturing process including lamination, screen printing, ink jet printing, self-assembly, vapor deposited, sprayed.

The HHMI can be fabricated as a sleeve, glove, legging, shirt, full body suit, etc., and has a flexible and comfortable snug fit that urges the electrodes 14 into face-to-face surface contact with the skin of the user 12. Gel electrodes 14 can be used, but have some drawbacks. Dry electrodes 14 are typically made from rigid materials. The electrode construction described herein provides thin, flexible structures designed specifically for compression face-to-face contact. Whatever the case, the transference of the electrical signal between the electrically conductive surface of the electrode and the skin of the user 12 has to be effectively accommodated.

Using a drone pilot or remote operator as an example (there is more detail on this exemplary use described herein), as shown, in FIG. 25, since every human body is different, at the beginning (step one) of a calibration mode a user 12 is asked to perform a first calibration motion (step two). The user 12 performs a known motion (step three) that causes nerve firings and muscle contractions, such as a motion that replicates using the hand as a control surface, e.g., a flap or thruster. In this case, the known motion can be a hand motion forming a flat plane with the fingers and bending at the wrist as if deflecting air. The electrical activity of the first motion is detected (step four) and the characteristics of the body-generated electrical activity (e.g., electromyographic signals generated by the nerves and muscles 18 as the hand is formed into a plane and bent at the wrist) are sensed and stored (step five). In addition to the body-generated electrical activity, other physiological changes can be detected, such as a change in the shape of the user's arm 16 caused by muscle contractions. These physiological changes are useful for calibrating the inventive Human Machine interface and also for determining pilot's intended electrical signals. The electrical and muscle activity that is detected and used for calibration, control intentions, user 12 conditions, etc., can include EKG, EMG and EEG, as non-limiting examples.

A next calibration motion is indicated to the user 12 (step six), the user 12 performs the motion (step seven) the electrical activity is detected (step eight) and the characteristics of the detected electrical activity is stored (step nine). If the calibration routine is not complete (step nine), then another next calibration motion is indicated (flow goes back to step six). If the calibration routine is complete (step nine) then a mapping is made of the detected electrical activity characteristics for the calibration motions (step eleven). By this process, the electrical signals and the source of the electrical signals (muscles 18 and nerves) associated with known motions are calibrated for the individual user 12 and a map of the signal characteristics associated with corresponding muscles 18 and nerves for each respective calibration motion is stored for the user 12.

In an auto-action mode, the calibration data is used to determine the characteristics of the computer-generated electrical activity causing a desired automatic and involuntary movement of the pilot's body parts. The result is the pilot perceives the involuntary movement as though caused by an externally applied force. For example, the pilot's hand can be calibrated as a control surface to remotely control the flaps of a drone, and the perceived externally applied force can be felt by the pilot as though the pilot's hand is the in-flight control surface deflecting air.

Figures 56, 57:
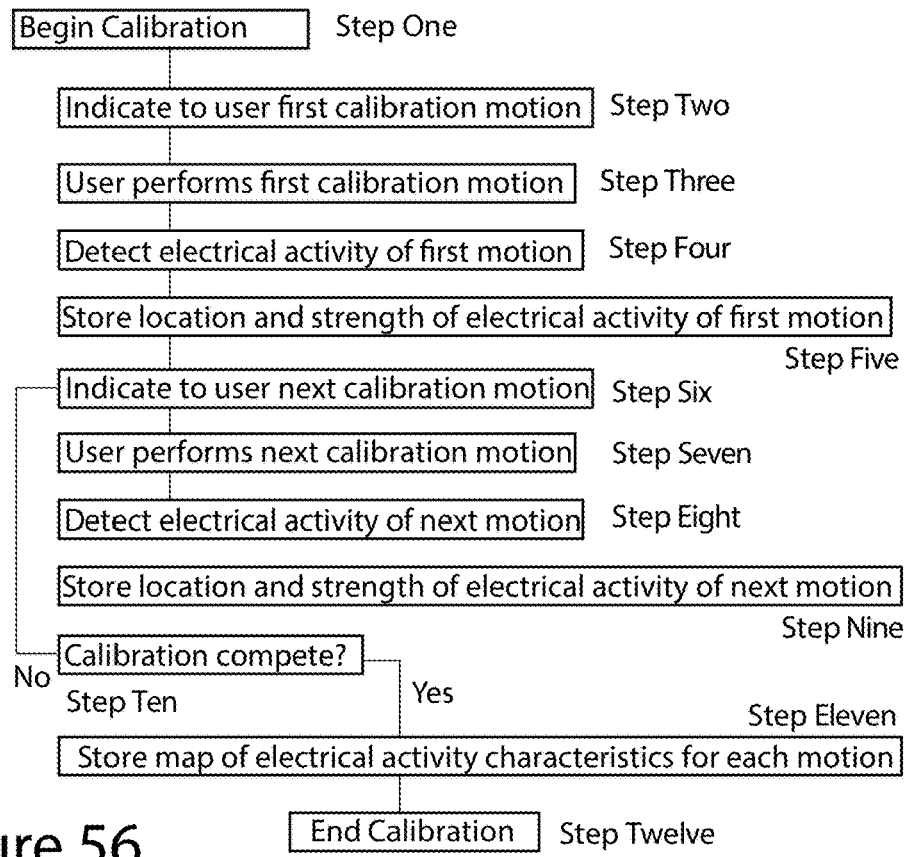
FIG. 56 is a flow chart showing a calibration algorithm for calibrating the HHMI to an individual user's body.
FIG. 57 is a flow chart showing a refinement algorithm for refining the calibration of the HHMI.

FIG. 57 is a flowchart showing an algorithm for refinement of the calibrated HHMI using measured movement of the user 12. This exemplary algorithm provides for further customizing the HHMI to interface with a particular user 12. Since every human body is different, in the calibration mode the operator performs a known task that causes nerve firings and muscle contractions, such as a motion that replicates using the hand as a control surface, e.g., a flap or thruster. In this case, the known task can be a hand motion forming a flat plane with the fingers and bending at the wrist as if deflecting air. The characteristics of the body-generated electrical activity (e.g., electromyographic signals generated by the nerves and muscles 18 as the hand is formed into a plane and bent at the wrist, or when the user's leg pushes down on a bicycle pedal) are sensed by the sensory transducers (i.e., the electrodes 14 shown herein throughout or shown, for example, in in block diagram FIG. 65). The sensory transducers are used to calibrate the location, relative strength, etc. of each detected electrical signal. To refine the calibrated HHMI, a refinement process may be started (step one). A start position of a body part, such as the hand of the user 12, is determined using for example, a known position taken consciously by the user 12, or the detection of the body part, such as a hand, using gyroscopes, accelerometers, IR detectors (e.g., Leap Motion discussed herein), or others (step two). The electrical activity resulting in the change in body part position is detected (step three) as the body part moves from the start position to a determined end position (step four). For example, the hand of user 12 can be voluntarily brought from a position where the arm 16 is relaxed and the hand is dropped down to where the hand is brought to touch the shoulder of the user 12. This motion is easily made consistent by the user 12 and allows for the determination of the start position (step two) with the hand dropped down at the user 12 side, the detection of electrical activity that results in the change in body part position (step three) and the determination of the end position (step four) when the hand touches the shoulder. The detected electrical activity is then compared to a stored map of electrical activity obtained, for example, using the calibration algorithm shown in FIG. 25. The detected electrical activity and the stored map are compared to predicted the expected change in position. The stored map is then confirmed or adjusted if necessary depending on the comparison (step six). If the refinement is complete (step seven), the algorithm ends (step eight). If it is not complete, the refinement continues again at step two.

FIG. 58 shows the muscles 18 of a hand of the user 12. The human hand includes a complex arrangement of muscles, bones, nerves, tendons, and skin. There are more than 30 individual muscles 18 in the hand and forearm 16 that have to work together to obtain highly precise movements. The hand muscles 18 provide great flexibility, very precise control, and gripping strength allowing humans to type, write, play musical instruments, grip a tennis racket, throw a ball, etc. FIG. 59 shows the inventive HHMI configured as a pair of gloves. The fingertips are among the most sensitive parts of the human body with thousands of densely packed nerve endings producing complex patterns of nervous impulses to convey information about the size, shape and texture of objects. The nerve endings in the fingertips contain different types of touch receptor organs, including Meissner corpuscles and Merkel discs.

As shown, for example, in FIG. 72 and described below, a higher density of smaller electrodes 14 can be provided at the nerve-rich tips of the HHMI gloves. Electrical stimulation can be applied specifically to cause a reaction to the fingertip receptors, so that a variety of sensations can be perceived by the user 12 including textures, pressures, heat, cold, movement, etc.

FIG. 60 shows the mapping of individually addressable electrodes 14 to the muscles 18 of the hand of the user 12. By targeting the respective muscles 18 of the hand that work with corresponding muscles 18 of the forearm 16, very subtle involuntary movements can be achieved. In the case of tremor mitigation, these movements may act to further steady a trembling hand. In the case of an accelerated learning application, these movements may bring the fingers into position, or at least urge and guide the fingers towards the correct position, to facilitate the learning of a desired chord played on the keys 34 of a piano.

Specific Use Examples

The uses of exemplary embodiments of the HHMI will be described herein with reference to specific applications. However, it is to be understood that these specific applications are to provide examples of many uses of the HHMI that includes the detection of electrical activity, movement and position of a body part, and/or the involuntary movement or guidance into position, virtual sensation, proprioception through an applied electrical signal.

The haptic Human Machine interface (HHMI) is applicable to a wide range of techniques and applications, including, military, civilian, accelerated learning, medical, entertainment, sporting, gaming, home automation, space and deep sea probes, as well as the remote controlled drone and robotic operation. The HHMI can also provide an immersive way to communicate between two people remotely located from each other, or to experience an activity being performed or observed by another, in real time and from previously detected and recorded data.

Military Undergarment:

FIG. 61 shows the inventive HHMI configured as an undergarment and having clusters of smaller, more densely packed electrodes 14 at the solar plexus and clusters of larger, less densely packed electrodes 14 located elsewhere. The solar plexus is a complex of ganglia and radiating nerves of the sympathetic nervous system at the pit of the stomach, and core functions of the body can be detected by monitoring these structures and/or the muscles 18 in this region such as the diaphragm. The sympathetic nervous system's primary process is to stimulate the body's fight-or-flight response. In accordance with a military use, the HHMI undergarment can be worn by a soldier for adding a new layer of perception during, for example, a combat situation. Typically, the visual and auditory senses of a soldier are saturated during the high intensity of a combat situation. The HHMI undergarment can add a new way to convey information to the soldier using tactile information that can be a supplement to the audio and visual information being received. The tactile information may be, for example, an indication of the location of a rallying point or where the soldier's comrades are located. Sensors and transmitters or other data links can be used as well to convey details about the soldier's physical condition including heart rate, blood pressure, body temperature and other vital signs and health related conditions.

The HHMI is made from a multilayered, flexible and light weight structure. The layers of the HHMI include compression layers that bias inward when formed in a shape that wraps around an object, such as an arm 16 when configured as a sleeve, or the user 12 back, shoulders, stomach and torso when configured as a shirt. The HHMI is a wearable electronic with the individually addressable electrodes 14 urged into effective face-to-face electrical contact with the skin of the user 12.

The HHMI is a light weight, wireless, high resolution electrical signal sensing/applying wearable electronic for the detection of the user control intentions (for example, to control the robot flight) and for the application of enhanced haptic cues (for example, to experience the robot's flight conditions). The interface is in the form of a comfortable, easily worn garment that the operator wears with little or no restriction of movement.

The HHMI is constructed as a conformable, comfortable, but fairly tight fitting garment to hold the electrodes 14 in direct face-to-face electrical contact with the skin. The HHMI is used to apply electrical stimulation through the skin to provide haptic cues.

For example, the haptic cues may be a desired body position related to a sensed parameter, such as flex, rotation, tilt, pitch, yaw, temperature, vibration, and other detectable stresses or conditions of a mechanical component (wing, fuselage, control surfaces, etc.) of the UVS.

The sensed parameter could be air pressure experienced at a wing control surface while maneuvering. The sensed parameter is transmitted from the drone (using RF or line-of-sight optical), causing a computer-controlled NMES cue (electrical stimulation) resulting in an auto-action response in the hand of the pilot feeling pressure to assume a position directly related to the drone's control surface.

The pressure to move the hand is the result of muscle movements caused by the NMES cue. The pilot experiences the sensation of resistance or pressure because of the computer controlled electrical signals applied to the pilot's own sensory/muscular physiology. In addition to pressure and resistance, the physical sensation of vibrations, knocks and even scratches can be perceived as the result of subcutaneous controlled electrical signal stimulation.

The muscle movements are involuntarily and automatic. There may not be any mechanical force simulators involved in creating the involuntary movements and perceived sensations caused by the applied electrical signals, although there can be, and mechanical force simulators may provided in addition to the applied electrical signals.

Mitigation of Tremor and Other Movement Disorders:

The HHMI, for example, can be configured as a wearable electronic for non-pharmacological, non-invasive therapeutic medical use to treat disease or illness, such as Parkinson's Disease (Parkinson's disease), essential tremor, and other neurological ailments.

In accordance with this exemplary aspect of the invention, the HHMI is configured to mitigate the physical and emotional difficulties of a patient suffering from a movement disorder, exemplified by, but not limited to, Parkinsonian tremor. Parkinsonian tremor is typically asymmetric, occurs at rest, and becomes less prominent with voluntary movement. The inventive HHMI offers a mechanism to conveniently apply a feedback-regulated, computer controlled, electrical signal only when needed to automatically counter the changing characteristics of a Parkinsonian tremor.

As an example, to counteract an involuntary tremor, a microprocessor may be programmed to detect and respond to variations in tremor onset, duration and characteristics. The exemplary circuit schematics, block diagrams and flowcharts shown herein illustrate possible components of the inventive system that includes the HHMI and its constituent parts. Additional circuitry and components may be employed, as necessary, to achieve a specific utilization. For example, the signal generation may occur though the microprocessor and related circuitry or the microprocessor may control an external signal generators capable of creating an appropriate mono or bi-phasic electrical signal that is effective to cause at least an urging towards a predetermined motion and/or a predetermined position of a body part a known in the art. An example of such a signal generator, known as a TENS unit, is commercially available from companies such as Amrex, BioMedical Life Systems, Prizm Medical, and others.

An exemplary embodiment of the HHMI is constructed as a thin, flexible sleeve unobtrusively worn by the user 12, and the connection between the sleeve and microprocessor can be direct or via wireless networking, such as optical, or RF (e.g., Bluetooth, WiFi, etc.). The HHMI may be embodied in a lightweight, comfortable, haptic sleeve having electrode size and density enabling automatic calibration to the unique physiology of a user 12.

The haptic sleeve provides precise electrical activity detection to detect the muscles 18 and nerves involved in, for example, arm movement. Additional detection of body part movement can be made using IR reflectors, emitters incorporated in the HHMI or worn on the body part, and a CCD or other detector located remotely from the moving body part. Accelerometers, proximity sensors (Hall effect, sonar, etc.), gyroscopes and other motion and location sensors can also be used to detect body part movement. For example, in an accelerated learning example, using the HHMI, subtle hand movements of a pianist can be determined by the HHMI detecting electrical activity of the pianist and computer processing of a video signal of the pianist's hands while playing the piano. These two sources of data can be used to determine the locations of the instrument relative to the performer, as well as to obtain a good indication of the fingers and hand movements so that the appropriate electrical signals can be determined and applied, via the HHMI to a student. Motion controllers, such as commercially available products from companies such as Leap Motion of San Francisco, Calif., can be used to determine, without requiring the wearing of any reflectors or emitters, the finger and hand position of the pianist nearly instantaneously. Similar systems can be used for detecting the movement, location and positions of other body parts as necessary to effect the various embodiments described herein. A MIDI keyboard can be used to provide data on the actual keys 34 struck by the fingers of the pianist.

In this medical use example, rhythmic motions can be detected, the characteristics stored and analyzed, so that the slight movements indicating the onset and oscillation of a tremor or other undesired (or desired) body part movement can be determined. In an exemplary medical use case, in response to the detected tremor, the HHMI sleeve applies a nearly instantaneous electrical signal to cause selective involuntary muscle and nerve impulses that counteract and negate the undesirable arm/hand trembling that would have otherwise occurred.

Because the applied signal oscillates in response to the tremor, the applied electrical signal results in muscle contraction perceived as a rhythmic, massage sensation by the user 12. Among the advantages of this approach is immediate and automatic relief without drugs or surgery. The tremor is only counter-acted when the patient wears the wearable electronic device.

Usually, one of the most noticeable outward signs of Parkinson's disease is involuntary movement of the limbs. The disability caused by tremor can be anything from embarrassment to a total lack of independence. The drugs used to treat tremor are numerous. (e.g., xanax, topamax, neurontin, propranolol, topiramate, primidone, mysoline) and most have undesired side effects, which may not be tolerated by a particular patient. The surgical solution is the implantation of a deep brain stimulator in a highly invasive procedure, which is usually only resorted to if the tremor is extremely severe.

An exemplary embodiment of the HHMI can be used in conjunction with traditional therapeutic choices, and may reduce the dosage or aggressiveness of the drugs conventionally used to treat tremor, and may obviate or at least delay the need for invasive deep brain surgery. The contractions and flexing caused by the applied electrical signal may also provide relief to stiff and aching muscles 18 which usually accompany Parkinson's disease illness, and/or the HHMI can have a specific "stretching and massage" mode where the applied electrical signal is intended to create a rhythmic massaging action by contracting and relaxing the user 12 muscles 18.

In addition to the mitigation of tremor, the HHMI may also be useful to provide drug-free, non-invasive relief to gait disturbance and disequilibrium. In this case, the HHMI can be scaled up and worn as a legging or body suit that steadies the patient from involuntary movements of the legs or other body parts.

In the case of tremor mitigation, the target of the HHMI is the muscles 18 and nerves involved in involuntary oscillatory motion. The HHMI can be utilize for electromyography as a simple and quick method to characterize muscle and nerve electrical signals, such as those caused by voluntary movements like playing a musical instrument, or involuntary movements like tremor. For example, the HHMI can be used in calculating tremor frequency and amplitude for assisting diagnosis. The HHMI can be used for detecting movement from electrical activity generated by the muscles 18 and nerves, and applying electrical stimulation to guide fingers into the position of a musical chord, to counteract tremor movement.

The human body can be considered a highly complex but modular machine, with muscles 18 that react consistently and predictably to an applied electrical signal. Although humans all share the same general anatomy, the specific locations for optimal electrode placement and the applied signal characteristics will vary significantly from person to person, and even from use to use by the same person. In an exemplary embodiment of a High Definition HHMI, the number of addressable electrodes 14 is increased, and can be as small as square millimeter or less although it is expected that square centimeter or larger electrodes 14 will be adequate for most muscles 18 and body parts such as the forearm 16, while smaller electrodes 14 may be better used for example, to detect and apply electrical signals to the muscles in the hand and the nerves located at the finger tips.

Also, higher density, smaller electrode clusters may be disposed at the locations of muscles 18 and nerves consistent with general human anatomy. The HHMI can have a mix of electrode sizes and shapes and needed, for example, to apply desired neuromuscular electrical stimulation.

The use of transcutaneous electrical nerve stimulation has been approved by the FDA for pain relief, and more recently for preventing migraine headaches. Others have offered some general mechanisms for using electrical stimulation to combat tremor. However, none disclose or suggest a wearable electronic device for precisely detecting electrical muscle and nerve activity using very small, individually addressed electrodes 14, and applying complex electrical signals via those same or other electrodes 14 to mitigate Parkinsonian tremor as the HHMI. Nor do any of the prior attempts indicate the use of a haptic Human Machine interface to provide haptic cues that are synchronized with computer-controlled audio and video cues to strengthen the brain's wiring of the voluntary motor control that is being taken over, for example, by the involuntary Parkinsonian tremor.

U.S. Pat. No. 6,892,098 B2, entitled Nerve Stimulation for Treating Spasticity Tremor Muscle Weakness. and Other Motor Disorders, issued to Shai, et al. discloses a method for treating spasticity by driving a current into a nerve to inhibit propagation of action potentials in one or more sensory fiber. U.S. Pat. No. 7,228,178 B2, entitled Surface stimulation for tremor control, issued to Carroll, et al. discloses non-invasive electrical stimulation of the brain through skin surface stimulation of the peripheral nervous system as a treatment for movement disorders. US Pat. App. No. 20030149457 A1, entitled Responsive Electrical Stimulation for Movement Disorders, issued to Tcheng, et al. discloses an implantable neurostimulator system for treating movement disorders. PCT Pat. App. No. PCT/US2014/012388, entitled Devices and Method for Controlling Tremor, issued to Rosenbluth et al. discloses the electrical stimulation of a peripheral nerve to combat tremor.

The HHMI provides a means for mitigating the embarrassing and often severely debilitating outward effects suffered by a Parkinson's disease patient. But this is just the beginning for the potential use of the HHMI to combat the psychological and physiological degeneration caused by Parkinson's disease.

In accordance with other aspects of the HHMI, a therapeutic treatment addresses the cognitive impairment caused by Parkinson's disease and other neurological disorders. The HHMI provides haptic cues synchronized with computer-controlled audio and video cues to strengthen the brain's wiring of the voluntary motor control that is taken over by the involuntary Parkinsonian tremor.

The haptic sensory cues may stimulate a processing center of the user 12 brain to form a learned response to the involuntary tremor, the learned response being reinforceable over time to mitigate the involuntary tremor.

The plasticity of the human brain is only now being realized. This therapeutic use of the HHMI may strengthen the neurological pathways in addition to re-enforcing the patient's ability to combat resting tremor. This rewiring of the patient's brain may be effective in further combating cognitive problems including dementia and thinking difficulties; and emotional changes, such as depression, fear, anxiety and loss of motivation. In accordance with this aspect of the invention, the sensory cues can be utilized to provide rehabilitation to a victim of a brain injury or other brain damage or learning dysfunction.

Accelerated Learning of a Musical Instrument

As shown, for example, in FIG. 62, the HHMI can be used to indirectly or directly transfer the nuances of a performer's musical skills and passion to students, and to multitudes of people, young and old, throughout the world and down through the generations. The HHMI may be used as a component in an Accelerated Learning System (ALS) that uses computer-controlled sensory stimulation that is synchronized and received by multiple senses of the student to more quickly build the muscle memory and pattern recognition necessary to learn an instrument. For example, audio cues (a piano melody) are combined with visual cues (image of a performer's fingers and hands correctly playing the piano melody) and haptic cues (vibration and/or electro-stimulation of the muscles/nerves of the student's fingers corresponding to the relevant muscles/nerves of the performer). This ALS stimulates the separate sensory processing centers of the brain to re-enforce and hardwire the brain/nerves/muscles 18 needed to learn and master the instrument, and the learning session can be done at any time, at the instrument or away, even while engaged in another activity.

Haptic sensory cues applied via the HHMI are dependent on hand position data and finger strike data related to the hand and finger position of fingers that strike one or more keys 34 of a musical instrument. The haptic sensory cues can include an electrical signal effective to cause involuntary body part motion and cause a perceived somatic and/or kinesthetic sensation so that the hand of the user 12 is urged towards a hand position to form an intended chord and the fingers that strike the keys 34 to make the chord receive a touch sensation, whereby a muscle memory may be created in the user 12 reinforcing the hand position and key strikes.

The specific nuances and personal stylistic details of a performance are captured and at any later time provided as synchronized sensory cues to a student (or even an entire audience) based on this recorded information. The HHMI can capture the subtleties that are the difference between a musician and a virtuoso, down to the timing and coordinate muscle movements that result in an artist's unique style.

In accordance with another aspect of the invention, a plurality of haptic sensory cues are generated capable of being perceived by a user 12. The plurality of haptic sensory cues are dependent on a determined condition of at least one movable member of a performing body performing an event. The plurality of haptic sensory cues are effective for stimulating a touch processing center of a brain of the user 12 based on the determined condition. A plurality of visual sensory cues are generated capable of being displayed to the user 12 on a video display device. The visual sensory cues provide a virtual visual indication to the user 12 of a position of at least one of the at least one moveable member and the performing body. The visual sensory cues are effective for stimulating the visual processing center of the brain of the user 12. The visual sensory cues may be synchronized with the haptic sensory cues so that the position is virtually visually indicated in synchronization with the haptic sensory cues and so that the visual processing center is stimulated with the visual sensory cues in synchronization with the haptic sensory cues stimulating the touch processing center.

The synchronized stimulation of the touch processing center and the visual processing center can be used for teaching the user 12 to perform a version of the event. The synchronized stimulation of the touch processing center and the visual processing center can be used for enabling the user 12 to remotely control the performing body performing the event. The performing body may be a human, and the movable member may comprise a body part of the human. The performing body may comprise an animal, and the moveable member may comprise a body part of the animal. The performing body may be a remotely controlled moving object, such as a drone or robot, and the moveable member may comprise a mechanical component of the remotely controlled moving object, such as a control surface or thruster. As shown in FIG. 62, the movable member may be a finger, the performing body may be a human, and the event may be playing a piece of music. The movable member may be a control surface, the performing body may be a drone, and the event may be flying the drone.

FIG. 62 shows an embodiment of a tactile information and visual information system used to learn to play the piano. In this case, the user 12 may wear a glove the produces a tactile stimulation including at least one of an electrical signal applied to illicit a virtual somatic system sensation or a physical sensation generator such as vibrators. When, for example, learning to play the piano, tactile stimulation, along with a view of the real world scene, along with a superimposed augmented reality of a virtual visual indication (such as a video of a hand with fingers pressing corresponding keys 34) can be used either when sitting at the piano and learning to play the piece of music or remotely from the instrument to construct the associative memory facilitating in learning the piece of music.

For example, the memories associated with the playing of a piece of music, in accordance with an embodiment of the invention, will be re-enforced by audio, visual, and haptic (muscle, tactile or other stimulation) cues that are generated and that can be repeated over and over to instill the associative memory that is built up during the course of conventional music practice at an instrument. Thus, the user 12 can virtually learn to play the instrument, and the distinct memory cues of vision, hearing, and touch will build up muscle memory in "automatic" type of memory installments.

In accordance with an exemplary embodiment, a user 12 (performer and/or student) wears haptic/visual gloves that indicate to the user 12 the haptic and visual cues corresponding to the learning session, for example, the playing of a piece of music during the recording and learning of the learning session. The user 12 may also wear headphones to hear the audio cues (or, the audio cues may be presented from speakers or other auditory stimulating mechanism). The user 12 may further wear a pair of visual/audio recording/display glasses or goggles, available, for example, from/as Google glass, Oculus Rift, Microsoft Hololens, and Meta VR goggles.

Thus, as will be described in more detail below, the user 12 receives different audio, visual, and haptic cues to indicate the notes or keys 34 being played, for example, on a piano during a learned piece of music. For example, the user 12 may receive visual cues through the lighting up of LED lights on the fingertips that correspond to the fingers playing a key on a piano. Simultaneously, or alternatively, the nerves of the skin and muscles 18 corresponding to the finger may be stimulated via vibrations or electrical impulses so that muscle memory of the learned piece of music is built up in conjunction with the auditory and visual cues. Using the inventive ALS, a student receives simultaneous sensory cues, which may be similar to the sensory cues that are received during an actual practice session at an instrument, or that may be different than an actual practice session experience. As an example of an actual practice session experience, a visual sensory cue may be a display showing the keyboard with the hand positions from the perspective of the performer. FIG. 62 illustrates for example a visual perspective of the keyboard that can be displayed to the student as a visual sensory cue, in this case the visual perspective corresponds to the viewpoint of the performer. In this case, the previous recording of the visual cues can be done using a head-mounted video camera 38, or a pair of augmented reality glasses that include a video camera 38. As an example of a sensory cue that is different than an actual practice session experience, a visual sensory cue can be artificially generated that corresponds to the learning session. In this case, for example, images, (such as the keyboard pattern when a chord is correctly played, or the music notation indicating which keys 34 to play that make up the chord) can be display to the student in synchronization with the audio sensory cues and/or the haptic sensory cues applied during the learning session. Further, different versions of the same type of sensory cues can be applied simultaneously. In this case, as an example, the viewpoint of the hand of the performer can be displayed in the center of the student's field of view while at the same time the generated sequence of images can be displayed in a peripheral portion of the student's field of view. Head tracking can be used to further immerse the student in the remotality session, allowing the student to naturally shift focus on virtual and/or actual keyboard, hands and sheet music. Simultaneously, the corresponding audio sensory cues and haptic sensory cues can be provided to the student.

Further, the audio sensory cues and the haptic sensory cues may also be varied to achieve a specific goal. For example, the left hemisphere controls movement on the right side of the body, so the audio sensory cues corresponding to the haptic sensory cues applied to right hand may be applied to the left ear of the student, or vice-versa, depending on the portions of the brain that are desired to be simultaneously stimulated. These generated sensory cues will be received by different parts of the user 12s brain, to create an associated processing and memories between the various parts of the brain that are stimulated. The student, or person being rehabilitated, or person being entertained, experiences, for example, the piece of music with the reinforcement of the associated memories resulting from the simultaneously applied sensory cues. This experience can occur during practice sessions at an instrument and/or remotely from the instrument.

In accordance with an embodiment of the inventive accelerated learning system, to further enhance the learning experience, chemicals released or electrical signals generated by the brain systems can be detected from a student that is actually learning the piece of music at a practice session at the instrument. As another example, the brain activity of a student can be sensed using well-known brain scan techniques (such as event related potential, ERP) and the applied sensory cues can be the focus of the different brain activities related to auditory, visual, and haptic sensory cue processing to further reinforce and enhance the learning experience. The inventive ALS can be applied to other activities, including but not limited to sports, school work, performing arts, military exercises, video gaming, etc.

An embodiment described herein pertains to learning to play music on a keyboard. However, the inventive accelerated learning system is not at all limited to keyboards, or to learning to play music. As is also described herein, aspects of the inventive accelerated learning system can be utilized for a number of different fields, including entertainment, military, sports, video gaming, remote controlled robots, drones and vehicles, other musical instruments, etc.

The HHMI utilized as a musical teaching aid can be part of an effective therapy for stroke injury and other brain damage that can be rehabilitated through rewiring of the damaged brain using the synchronized, computer-controlled haptic, audio and visual cues.

Figure 63:
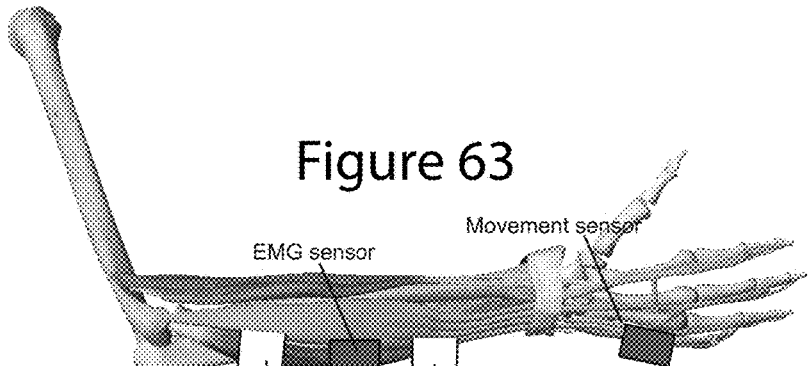
FIG. 63 illustrates the basic HHMI signal detection and application components.

To illustrate the basic HHMI signal detection and application components, FIG. 63 shows a simple signal detection and application where an EMG sensor is located at the belly of the extensor digitorum. A TENS signal-applying electrode is located at either end of the muscle. A movement detecting accelerometer is located on the back of the hand. In the actual HHMI system, the sensors and electrodes are more numerous, with an optimal size, number, type and shape of the electrodes dependent on the particular application.

Sports Training

Figure 64:
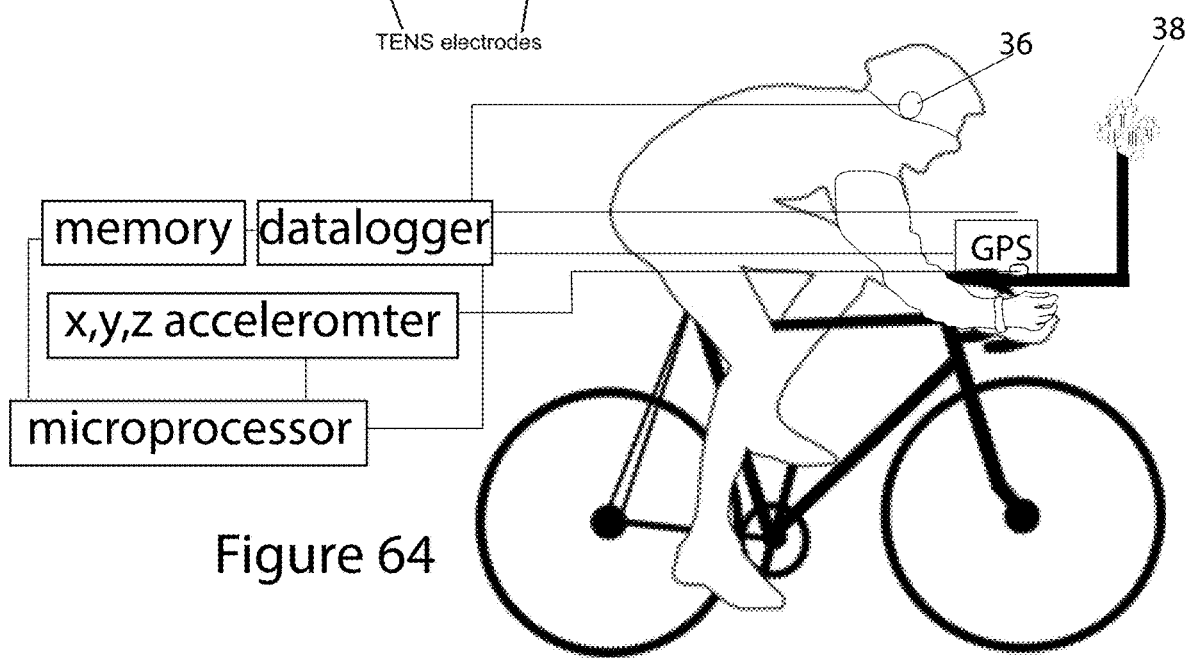
FIG. 64 shows data collection on a bicycle for use in sports training.
Figure 65:
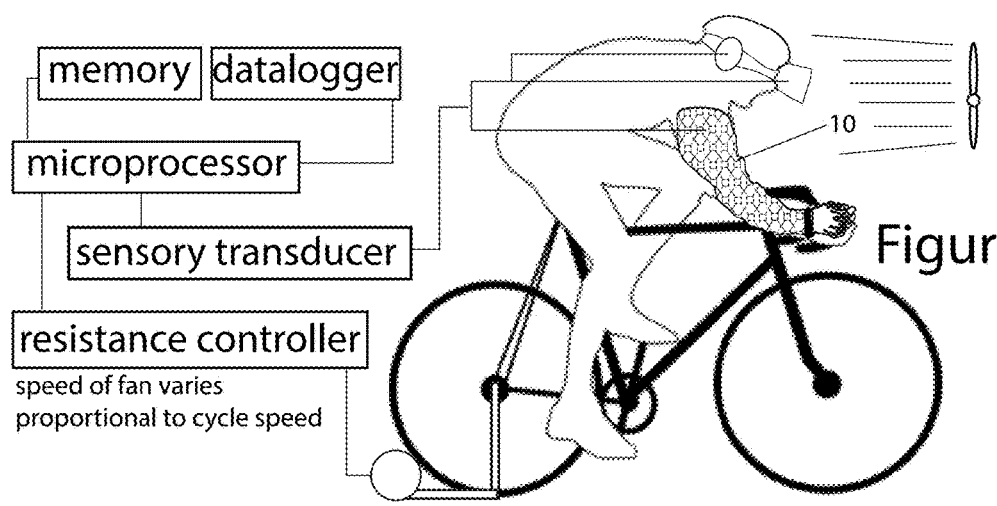
FIG. 65 shows the synchronized application of sensory cues dependent on the data collection of FIG. 64 during a training session.

FIG. 64 shows data collection on a bicycle for use in sports training. A microprocessor controls the reception of data from sources such as a GPS, microphone 36, camera 38, gyroscopes, accelerometers, speedometers, etc. This data is logged by a data logger and stored in a memory. FIG. 65 shows the synchronized application of sensory cues dependent on the data collection of FIG. 64 during a training session. During the training session, the logged data is retrieved from memory and used by the microprocessor to determine a plurality of first sensory cues. The sensory cues are generated by the microprocessor and made available for perception by the user 12, for example, the sensory cues can be a spherical point of view video that is viewable from all angles using head tracking AR goggles. The plurality of first sensory cue are time-sequentially generated and effective for stimulating at least one sense of the user 12, such as vision. A plurality of haptic sensory cues are generated capable of being perceived by the user 12. The haptic sensory cues may be received by the user 12 dependent on computer controlled time-sequentially generated electrical signals. For example, the haptic sensory cues can be applied using the HHMI and create the sensation of wind rushing over the arm 16$s$ of the user 12 where the wind speed is dependent on the virtual cycling speed. Additionally, or alternatively, the haptic sensory cues can be a varying resistance force applied to resist the pedaling motion of the user 12 as if the user 12 is cycling up and down the hills of the course. These electrical signals invoke a perception by the user 12 related to the sense of touch. The haptic sensory cues are generated in synchronization dependent on the time-sequentially generated plurality of first sensory cues. For example, as the speed of the bicycle goes faster, as indicated to the user 12 by the scene on the VR goggles, the apparent wind speed on the arm 16$s$ of the user 12 also increases by applying an appropriate computer controlled haptic signal.

Figure 66:
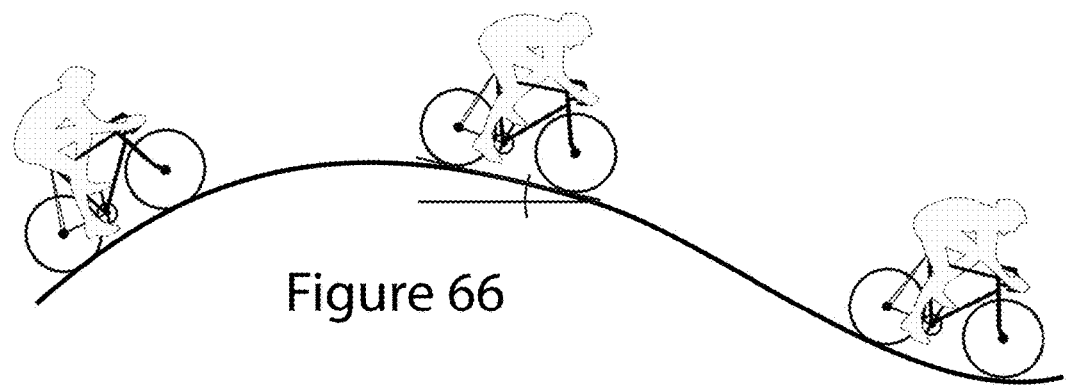
FIG. 66 shows the collection of data sampled along a route taken by a cyclist.
Figure 67:
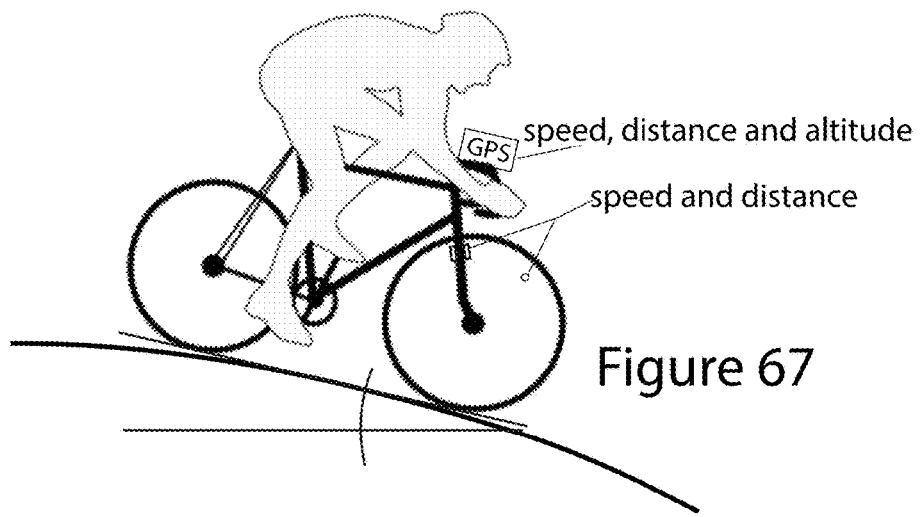
FIG. 67 is an isolated view of the collection of data sampled along the route showing the bicycle at an angle and height relative to sea level.
Figure 68:
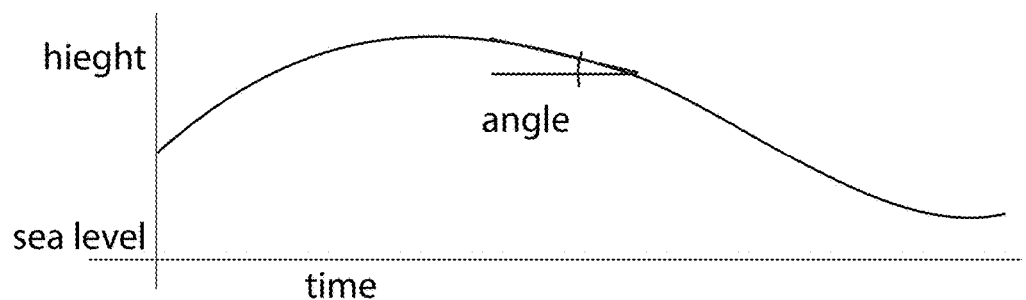
FIG. 68 is graph showing the collection of data as exemplary altitude and angle relative to sea level data collected over time along the route taken by the cyclist.

FIG. 66 shows the collection of data sampled along a route taken by a cyclist. FIG. 67 is an isolated view of the collection of data sampled along the route showing the bicycle at an angle and height relative to sea level. The collected data is used by the microprocessor, for example, shown in FIG. 65, to calculate a resistance value to be applied by a resistance controller to a training system of a stationary bicycle. FIG. 68 is graph showing the collection of data as exemplary altitude and angle relative to sea level data collected over time along the route taken by the cyclist. The resistance may be, for example, calculated dependent on data such as the angle of the bicycle relative to horizontal (e.g., the steepness of the hill when the actual cycle route is taken), user weight, GPS data, speed, etc. Some of the data can be directly collected during the ride along the route or calculated/approximated by the microprocessor. As an example, a cyclist can train on a stationary bicycle but experience the legs of the Tour de France as a virtual experience.

FIG. 70 illustrates an augmented reality visual sensory cue showing an actual tennis racket seen from the perspective of the user 12 with an video overlay of a virtual tennis ball generated using computer program code and displayed using an augmented reality display, such as augmented reality goggles. A performance object, in this case, a tennis racket and the position of the performance object can be detected by appropriate proximity sensor, motion detectors, tilt detectors, a laser positioning system, and other mechanisms used to detect the position of an object in three-dimensional space. A performance element in this case may be the handle of the tennis racket, and its position relative to an arm of the user as a tennis ball approaches and is struck by the racket can be determined. The tennis ball can be an actual tennis ball (in the case of augmented reality), or a computer generated tennis ball (in the case of virtual reality) that the user sees and reacts to during a recording of the sensory cues that will be used to teach the performance. This exemplary mechanism and method for detecting and recording the position of body parts and performance objects/performance elements is used to record the sensory cues that are used to teach the event and build up memory associations of the event in the various processing centers of the human brain. The body member that is detected during the recording of the event performance (for example, the body part of a tennis pro) and then stimulated during the learning lesson or entertainment session (for example, the body part of a tennis student) can be at least one of a finger, toe, hand, foot arm, leg, shoulder, head, ears and eyes. This technique of using the inventive accelerated learning system can be used, for example, to create a virtual sport video game. Similar alternatives can be constructed for other events, such as controlling a remotely controllable system, for example, the flying of a drone airship, a space exploration probe, the playing of a guitar, the assembly of a weapon, entertainment or brain rehabilitation to help "rewire" the brain of a stroke victim or brain damaged patient, other cognitive therapy including enhanced learning, or any other event where a user can benefit from recorded sensory cues that stimulate the various processing centers of the brain.

Entertainment

FIG. 69 illustrates a chair configured for an exemplary entertainment application. The haptic sensory cues can be mapped to a chair, bed, clothing or apparatus that can be worn by the user 12. A "massage" chair, for example, may have zones corresponding to areas of the body that can be individually applied with haptic data such as vibration or pressure. For example, in the case of a massage chair, a soothing massage can be applied where vibration and pressure applied to various parts of the body are mapped to the different frequencies of a piece of music. The different ranges of music frequency can also be mapped to visual stimulation in the form of light colors. The light colors can correspond, for example, to the sensitivity of the human eye to color stimulation. Thus, for example, the color can be generated by LED lights that match the peak wavelength sensitivity of the cones of the human eye. The three types of cones have peak wavelengths near 564-580 nm, 534-545 nm, and 420-440 nm, respectively. Head tracking goggles, binaural headphones and the haptic chair can be used to provide a deep immersion into a remotality that provides entertainment and learning experiences, etc., in a comfortable manner.

FIG. 71 shows a user 12 experiencing deep immersion of a virtual reality, a block diagram showing detection and application of data, and illustrating the processing centers of the brain stimulated by the applied synchronized sensory cues.

As shown, for example, in FIG. 71, the various portions of the brain related to the processing of sound, touch and vision can be controllably and simultaneously stimulated so that a weakened brain sensory, motor or cognitive processing center can be strengthen or rewired through the support of stronger brain sensory stimulation processing centers. For example, a stroke victim with damage to right side of the brain may have a loss of function in the motor control of the fingers of the left hand. In this case, the haptic sensory cues applied to the fingers of the left hand provide touch sensory stimulation to the dam-aged portions of the brain, while the corresponding visual and audio cues reinforce the re-learning or rewiring of the damaged portions of the brain through the touch sensory stimulation.

In accordance with another aspect of the invention, a plurality of first sensory cues are generated capable of being perceived by a user 12. The plurality of first sensory cue are time-sequentially generated and effective for stimulating at least one sense of the user 12. A plurality of haptic sensory cues may be generated capable of being perceived by the user 12. The haptic sensory cues may be received by the user 12 dependent on computer controlled time-sequentially generated electrical signals. The electrical signals invoke a perception by the user 12 related to, for example, the sense of touch. The haptic sensory cues may be generated in synchronization dependent on the time-sequentially generated plurality of first sensory cues.

The first plurality of sensory cues comprise visual sensory cues for providing a virtual visual indication to the user 12 of an event. The visual sensory cues may include video data mapped to at least one of color and intensity of an image of the event, and wherein the haptic sensory cues are generated dependent on the mapped video data. The first plurality of sensory cues may comprise auditory sensory cues for providing a virtual auditory indication to the user 12 of the event. The auditory sensory cues may include sound data mapped to stereo, multichannel and/or binaural channels; and wherein the haptic sensory cues are generated dependent on mapped sound data. A plurality of conductive patches may be provided for applying an electrical signal through the skin of a user 12 to stimulate electrical signal receptors.

A signal generator may be provided for generating a plurality of haptic cues in the form of electrical signals applied to the skin of the user 12 through the plurality of conductive patches, wherein the plurality of haptic sensory cues are capable of being perceived as a predetermined sensation or muscle movement of the user 12. The plurality of electrical signals may have at least one characteristic including location, timing, pulse length, frequency and amplitude effective to cause at least one of the predetermined sensation and muscle movement in the user 12. The electrical signal receptors may comprise at least one of muscles 18, nerves and touch receptors. The signal generator may further generate a plurality of first sensory cues capable of being perceived by a user 12, the plurality of first sensory cue being time-sequentially generated and effective for stimulating at least one sense of the user 12; and wherein the plurality of haptic cues are time-sequentially generated in synchronization dependent on the time-sequentially generated plurality of first sensory cues.

A conductor grid may be provided for electrical communication of the plurality of electrical signals from the signal generator to the conductive patches, whereby the conductive patches are driving as a matrix of individually addressable electrodes 14.

In accordance with another aspect of the invention, an apparatus comprises at least one processor, and at least one memory including computer program code. The at least one memory and the computer program code are configured to, with the at least one processor, cause the apparatus at least to detect a body part movement of a user 12 using a Human Machine interface. Electrical signals are determined having electrical characteristics effective to cause a desired action in response to the detached body part movement, and the electrical signals are applied to an object to cause the desired action. The desired action may be, for example, the future movement of a student's hand where the hand is the object.

The sensory cues can also include other senses, such as taste and smell. In this case, the senses of taste and/or smell can be utilized to provide positive and negative reinforcement of a learned activity. For example, in the case of a drone operator learning to determine how to recognize friend or foe, during a training exercise a visual sighting that challenges the operator with making a correct snap determination of friend or foe can be reinforced by providing a pleasant smell when a correct determination is made and an unpleasant smell when an incorrect determination is made. By this application of additional sensory cues as reinforcement to learned behavior or responses, another processing center of the brain is brought into the combined sensory processing learning experience.

In accordance with another aspect of the invention, a non-transitory computer readable memory medium stores computer program instructions which, when executed, perform operations described here.

Gaming

FIGS. 72-75 illustrate a use of the inventive HHMI and accelerated learning system (ALS) for teaching and/or improving hand-eye coordination for a control device such as a joystick, remote control unit and/or video game controller. In the case of a gaming controller, for example, the typical haptic feedback may be applied in addition to the haptic sensory cues provided by the inventive accelerated learning system. For example, the rumble pack of a video game can be used to provide further sensory information during the learning exercise. In this case, the rumble pack may be simulated by an additional vibrator disposed in the palm or on the back of the hand of the haptic gloves. In accordance with an embodiment of the inventive accelerated learning system, a drone operator can be placed, for example, into a sensory deprivation chamber, during the learning sessions and/or during actual drone flights. The nerve endings and muscles 18 of the user 12 can be stimulated by vibration or electrical impulse. Also, the electrical impulses traveling on the nerves and the muscle movements in response to those impulses can be detected to record a performance for uses such as a learning session, and/or to detect that a student is correctly applying the learned skill or behavior, and/or to provide cognitive and physical therapy to a patient.

FIG. 72 shows the inventive HHMI configured as a glove having smaller, higher density, higher resolution, smaller electrodes 14 disposed at nerve-rich finger tips of the user 12. The HHMI can be composed of a glove having tactile finger tips. The tactile finger tips can be constructed similar to the haptic sleeve and suit shown herein to map, detect and apply electrical activity at the user 12 fingers.

FIG. 73 shows the inventive HHMI configured as a sleeve and applied as a retrofit modification or OEM device in signal communication with a gaming controller. The HHMI may communicate over a wireless or wired connection with a console or hand controller, such as an X-box, Playstation, Wii, Nintendo, or other gaming platform. The typical gaming controller includes a vibrating element (sometimes called a "rumble pack"). Much of the gaming software makes use of the rumble pack to provide haptic feedback, for example, to provide a somatic vibrating sensation when a grenade explodes, or a rocket ship takes off, or a car engine revs. In accordance with this aspect of the invention, the HHMI can make use of the control of the rumble pack during game play of an existing game or using code written specifically for the HHMI so that a haptic cue is applied to the user 12. A microprocessor may be used to generate a specific haptic cue corresponding to the software code making up the game.

FIG. 74 illustrates a virtual reality controller having haptic pads for applying electro-tactile sensations to the finger tips of a user 12. The HHMI may be formed as an orb 40 having haptic and pressure active finger grooves. The orb 40 may have high resolution haptic and pressure active finger grooves.

FIG. 75 is a block diagram illustrating an embodiment of the inventive orb 40 for detecting data including user-applied pressure, bio-generated electrical signals, bio-active electrical signals, and changes in position and accelerations of the virtual reality controller, and other elements of a hand-controlled wireless haptic information transducer of the inventive Human Machine interface. In accordance with this non-limiting exemplary embodiment, transducers are provided for detecting and applying electrical signals to the finger tips of the user 12. A hand operated orb 40 can include finger grooves that receive each finger and are lined with the transducers for applying and receiving electrical energy and other tactile stimulation (e.g., vibrations or pressure). The orb 40 comprises a housing that holds transducers, accelerometers, microprocessors, vibrators, gyros, and transmitters, etc., enabling the use of the orb 40 as a human/machine interface such as a wireless three dimensional mouse or wireless joystick-like controller for gaming, entertainment, military, business, remote control and many other uses.

Figure 76:
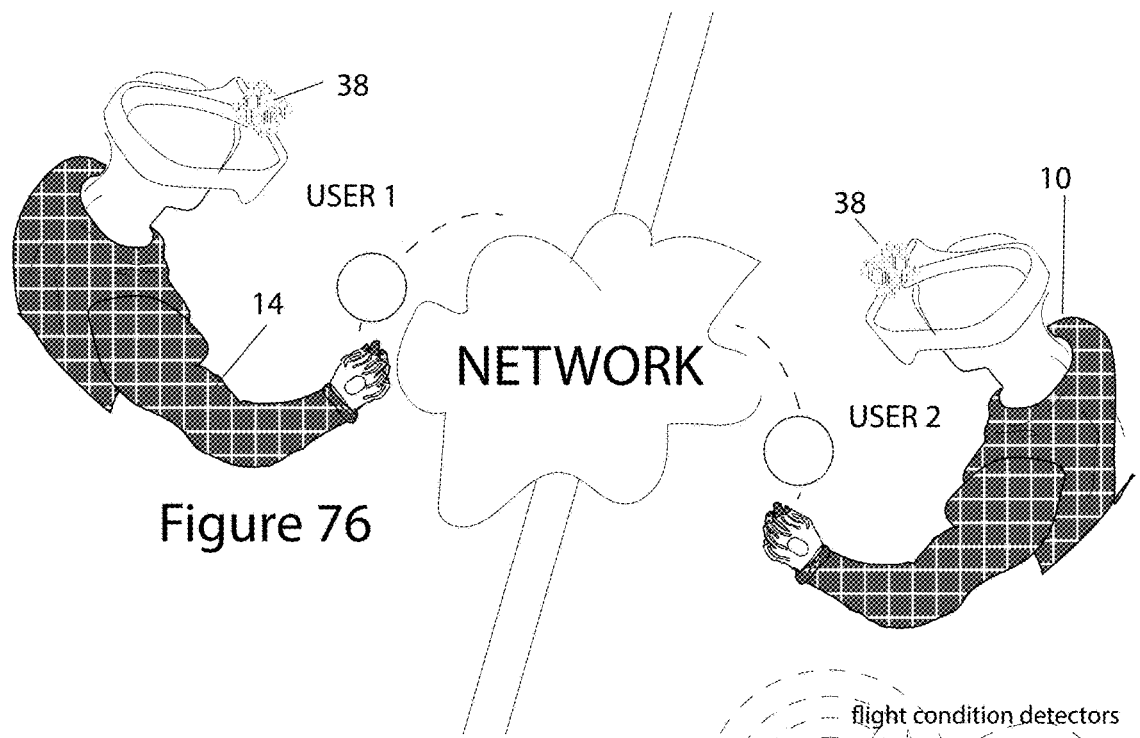
FIG. 76 illustrates the inventive HHMI with synchronized haptic, audio and video signals dependent on a virtual or augmented reality and dependent on actions of a remotely located second user for creating a human/human interface.

As shown in FIG. 76, for example, the electrical stimulation can be applied as a varied electrical signal that simulates the effects of gravity (for example, moving the hand and arm 16 as if catching a ball or even the ball hitting the hand with a jolt), or as another example, as a low frequency, variable intensity pulse, synchronized to counter a detected tremor oscillation. The electrical signal triggers, for example, the alpha motor nerves that cause muscle movement. The higher the intensity of the electrical stimulus, the more muscle fibers will be excited, resulting in a stronger induced contraction. The induced contractions can have different speeds and duration dependent on the characteristics of the applied electrical signal, for example, as necessary to simulate the force of the moving ball or to steady the tremor.

To accurately target the muscles 18 and nerves, the location for signal detection and signal application that is unique to an individual user 12 is accommodated. The HHMI enables accurate detection of the nuances of the relevant electrical signals generated by the human body; uses the computational power of microprocessor(s) to process these detected signals, and determines and generates a complex responding signal waveform applied to directly and effectively guide the body to a desired position, replicate the touch and movement sensations of a real-world object being virtually encountered by the body, or counter a detected tremor.

The inventive orb 40 with high resolution haptic pressure active finger grooves with solid state pressure sensors can be on/off or gradient. The rumble pack signal may be used to trigger the haptic sensation, the audio sound track used to trigger the haptic sensation, gaming sounds and video (loud explosions or bursts of light of a certain color indicating an explosion) can be used for detection to trigger the haptic sensation, or a user-determined sound (filtering) can be used to trigger the haptic sensation.

Human/Human Virtual Interaction

FIG. 75 illustrates the inventive HHMI with synchronized haptic, audio and video signals dependent on a virtual or augmented reality and dependent on actions of a remotely located second user 12 for creating a human/human interface. To simulate a sudden force, like catching a ball, the touch sensing cells of the user 12 are activated to simulate a detected force and cause an involuntary movement that is dependent on a determined weight, trajectory, and speed of a virtual ball as it is perceived to contact the user 12 hand (accompanied with sound and visual cues of the virtual ball and the contact with the skin). To avoid miscues, the signal from muscle movement may be determine from electrodes 14 that receive signal above a noise threshold.

USER 1 tosses a virtual ball, using the laws of physics the processor determines the ball's trajectory based on its virtual weight, air resistance, gravity, etc. Visual and audio cues are determined based on the ball's virtual appearance, the determined trajectory and other variables such as a virtual gust of wind, and both USER 1 and USER 2 see and hear the ball according their perspectives.

The HHMI is used to apply haptic cues including resistance to motion (inertia) experienced by USER1 and the sudden impact of the ball in the palm of USER2 when it is caught. The HHMI is used to create an experience for the USERs as if they are tossing the virtual ball between each other, even though they may be connected through the network as far distant physical locations.

Robotic and Drone Remote Control and Sensing:

Drones can be enabled to fly for prolonged duration and travel long distances at high speed with an energy efficient onboard computer and flight control system, and with no communications to the drone after take off. Such autonomous drones may even navigate through doorways and windows. The HHMI can be configured as an undergarment that is used with other VR or AR component to creates an electrically applied sensation tied into the in-flight drone conditions, like the change in angle (e.g., banking) haptic indicator mentioned in my last email. The pilot has a visual sphere from drone, and can view landscape from any angle. Computer extrapolation can put pilots point of view outside of drone, allowing the pilot to see the drone in conjunction with its moving position relative to the landmarks. The computer or microprocessor uses flight condition data from onboard detectors to generate corresponding haptic signals experienced by pilot. Haptic feedback give pilot real-time sense of drone orientation and flight conditions, as if the pilot is the drone. For example, as an entertainment use a virtual passenger can go "along for the ride." Or, in a war fighter situation, a drone that is enabled with advanced autonomous acrobatic flight capability can also include the control by a remote pilot that is relieved of at least some of the requirements for maintaining flight, allowing the pilot freedom to focus on aggressive dog fight maneuvers. In the case of a land robot, an autonomous robot may include active control of a remote operator that focuses on searching for a victim through a burning building.

Figure 77:
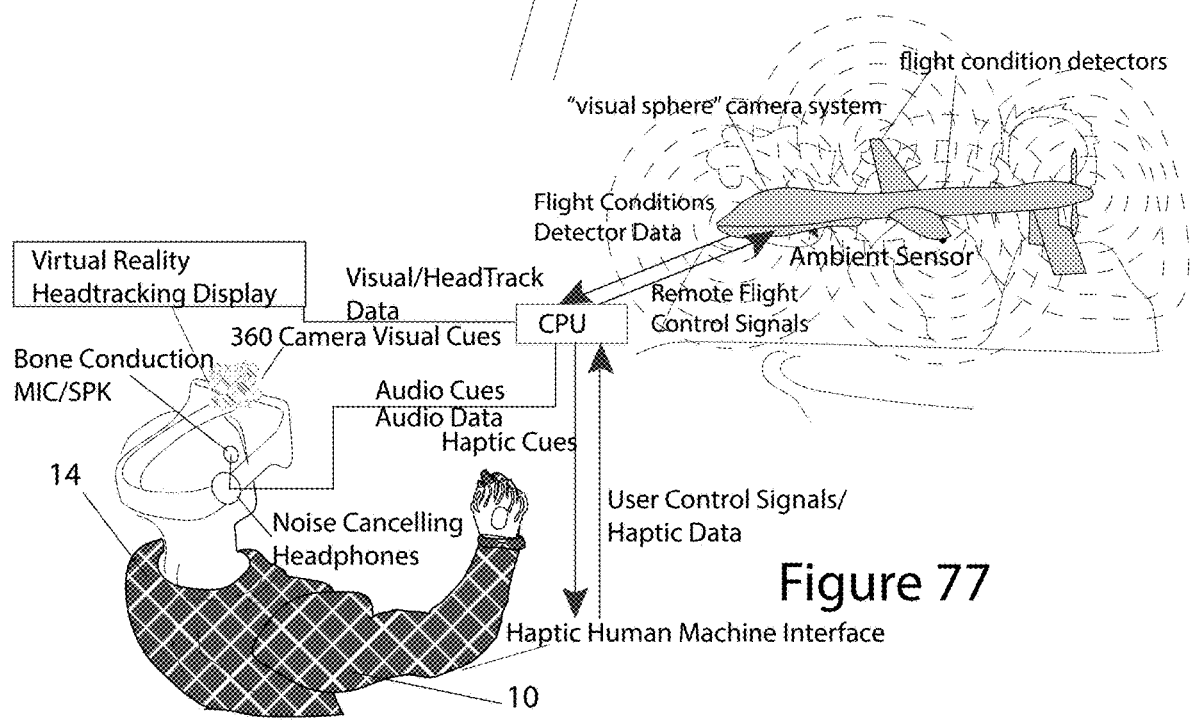
FIG. 77 illustrates the inventive HHMI for remote sensing and controlling of a drone.

FIG. 77 shows the human/robotic interface that uses the physiology of the human to integrate the onboard and ambient conditions of a remotely operated flying robot into the information pool used to control the robot. In addition to a view from what would be the cockpit of the drone (if it had a human occupant), an artificial real-time perspective view of the drone may be displayed on a visual cue system (e.g., virtual reality goggles). Data from onboard cameras 38 plus onboard accelerometers, gyroscopes, GPS, etc., plus stored image data of the drone can be used to create real-time artificial perspective of drone in flight that is received as the visual sensory cues. The pilot can perceive the visual image of the drone as if flying alongside the drone (e.g., information with the drone). Alternatively, the drone and the scene around the drone can appear to the pilot from any other visual perspective. This same basic system can be used, for example to provide human/human virtual interaction and human/instrument (tool, implement, etc) interfacing similar to the human/robotic interface described herein, but where another human or physical implement (for example, for robotic surgery) is interfaced with the user 12. Multiple sources of data can be used in the HHMI, including onboard real time, filtered, analyzed, prerecorded, computer generated or otherwise received, obtained or created. For example to obtain video data, a spherical view camera 38 system can be for collecting video information directly onboard a remote machine, such as a drone. This video data can be stored and used later, for example, in gaming or a training exercise, or it may be used in real or near-real time such as during a drone combat mission or robotic search and rescue operation.

In accordance with this non-limiting, exemplary embodiment the collected time sequential data (e.g., audio, video and haptic signals) are transmitted from the drone to the pilot and the flight electrical signals transmitted from the pilot to the drone.

At the location of the pilot, a plurality of haptic sensory cues are generated capable of being perceived by the pilot. The haptic sensory cues are received by the pilot as computer controlled serially generated electrical signals via the HHMI. The electrical signals invoke a perception by the pilot related to the sense of touch. These received haptic sensory cues can be applied as computer controlled electrical signals that are mapped to the body of the pilot so that different body parts receive different sensory stimulation. For example, the hands and arm 16s of the pilot may be considered the human embodiment of the control surfaces, such as flaps of a drone plane. The feet and legs of the pilot may be considered the human embodiment of propulsion components, such as the engines of the drone plane. In this example, the flexing of one or both feet of the pilot can be detected and converted to flight electrical signals to control the engine speed (and thereby control the speed of the drone). Engine speed time sequential data received from the drone can be converted into a haptic sensory cue that is displayed along with visual speed data, such as GPS determined speed relative to ground, so that the pilot has an intuitive sense of the drone engine speed (for example, intensity of a sensed vibration can be correlated with the RPM of the engine) and along with the visual confirmation of the drone speed relative to ground. In accordance with the inventive Human Machine interface, the pilot receives multiple sensory cues that are inter-related and synchronized to indicate the flight conditions of the remote drone.

As shown, for example, in FIGS. 77-80, an exemplary use of the HHMI is for controlling a remote machine, such as a robot or a drone. FIG. 77 illustrates the inventive HHMI for remote sensing and controlling of a drone. The inventive HHMI adds a novel dimension to the Human Machine interface. For example, the HHMI utilizes haptic sensory feedback creating relevant touch cues related the remote robot onboard/ambient conditions. The HHMI also uses the detection of body movements of the operator from muscular electrical signals to intuitively generate remote electrical signals. These features enable the operator to be alerted to subtle variances in conditions which over time could become problematic. When combined with other available virtual reality technologies, the HHMI makes possible the remotality experience and control of robotic operation as if the operator were indeed the robot rather than a remote observer/controller. The operator feels, sees and hears the synchronized sensory cues that put him in the skin of the robot whether it is real-time, recorded or virtual, or whether it is land based, water, space, macro-sized, microsized, nanosized, flying, or other moving or stationary machine. The HHMI utilizes the natural electrical physiology of the user 12 to interface the user 12 with the machine, to convey locally generated (e.g., the user 12) or remotely received or determined (e.g., the robot) information and to control the remotely located machine.

The advancement of robotic systems in many fields has been rapid and widespread. There has not been a concurrent evolution in the interface of a remote human operator with the robot, beyond the joystick and video display. The industry has focused on leaps forward for the main robotic system, while the joystick/video interface seems to have been left as a good-enough solution. Going forward, the good enough solution of the previous generations of Human Machine interfaces will be a constraint when paired with the capabilities of the next generations' robot and drone systems.

Electrical stimulation is applied through the skin on at least one of the arm 16s of the pilot dependent on a desired position to be achieved by the pilot's hand and arm 16. The desired body position can be related to a sensed parameter, such as flex, rotation, tilt, pitch, yaw, temperature, vibration, and other detectable stresses or conditions of a mechanical component (wing, fuselage, control surfaces, etc.) of the UVS. The sensed parameter could be air pressure experienced at a wing control surface while maneuvering. The sensed parameter is transmitted from the drone (using RF or line-of-sight optical), causing a computer-controlled neuromuscular electrical stimulation (NMES) cue (electrical stimulation) resulting in an auto-action response in the hand of the pilot feeling pressure to assume a position directly related to the drone's control surface. The pressure to move the hand is the result of muscle movements caused by the NMES cue. The pilot experiences the sensation of resistance or pressure because of the computer controlled electrical signals applied to the pilot's own sensory/muscular physiology. In addition to pressure and resistance, the physical sensation of vibrations, knocks and even scratches can be perceived as the result of subcutaneous controlled electrical signal stimulation. The muscle movements are involuntarily and automatic. There are no mechanical force simulators involved, although there can be. Vibration, for example, can be stimulated by both the applied electrical signal and mechanical buzzers (or rumble packs, etc.) that can be applied, for example, from a haptic chair (see, for example, FIG. 69) or from a transducer associated with one or more of the electrodes 14 of the HHMI sleeve. In the case of music and entertainment, for example, the transducer could deliver the vibration as low end bass notes, while applied electrical signal delivers the sensation of light scratches corresponding to higher notes. Bass beats, for example, could be perceived through a knock sensation resulting from an appropriately controlled electrical signal.

The hands of a human are particularly sensitive to haptic stimulation. For example, the muscles 18 that move the finger joints are in the palm and forearm 16. Muscles of the fingers can be subdivided into extrinsic and intrinsic muscles 18. The extrinsic muscles 18 are the long flexors and extensors. They are called extrinsic because the muscle belly is located on the forearm 16. The application of haptic sensation, such as the haptic sensory cues, can be applied to various parts of the body, and the inventive accelerated learning system adapted to enable a wide range of applications, from remote control operation to Human Machine interface to teaching to entertainment to rehabilitation. By noting the sensitivity to stimulation of the body parts (e.g., the fingertips are very perceptive to tactile stimulation, the application of haptic sensory cues can be selective in accordance with a desired interface, learning or entertainment enhancement. For example, the fingers (and/or the muscles 18 controlling the fingers and/or the nerves communication with those muscles 18) can receive haptic stimulation in the form of a pressure, vibration, electrical impulse or other stimulation.

Figures 78, 79:
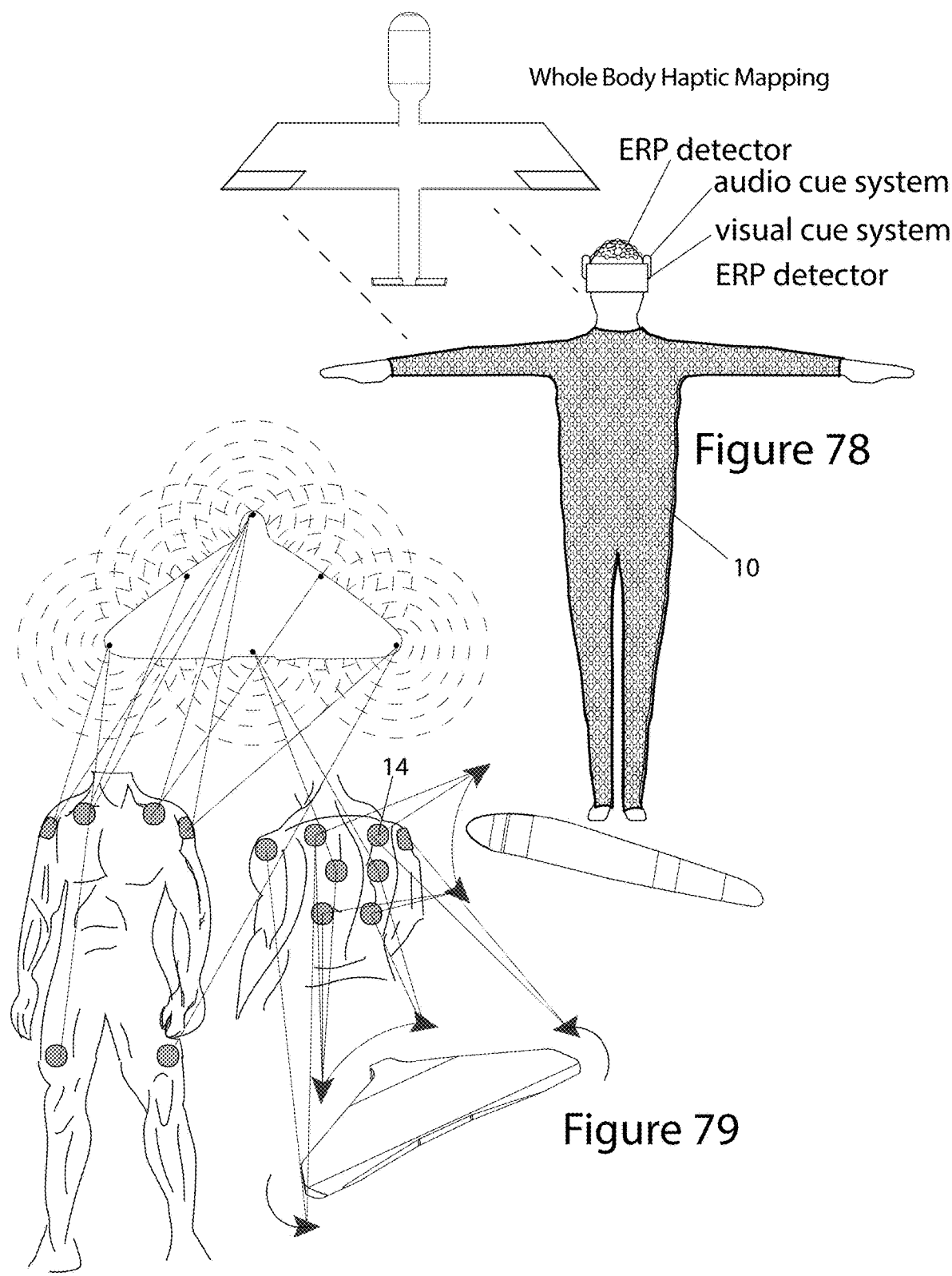
FIG. 78 illustrates the inventive HHMI configured as a full body suit mapped to a remote drone, and including haptic, audio and video sensory cue systems, body position and electrical activity sensing systems and brain activity sensing system.
FIG. 79 illustrates the inventive HHMI configured for applying electrical stimulation to large muscle groups to provide haptic cues of a manned or unmanned aerial vehicle.

FIG. 78 illustrates the inventive HHMI configured as a full body suit mapped to a remote drone, and including haptic, audio and video sensory cue systems, body position and electrical activity sensing systems and brain activity sensing system.

The haptic sensory cues are generated and applied to the pilot in synchronization dependent on the time sequential data that is received from the remote drone. In addition to the time sequential data that pertains to the haptic cues, time sequential first sensory data is also received from the remote transmitter. This time sequential first sensory data may be, for example, video or audio data that is collected by appropriate components on the drone. A plurality of first sensory cues are generated capable of being perceived by a pilot. The plurality of first sensory cues are serially generated in synchronization dependent on the first sensory data. That is, for example, the sequential frames of a video displayed to the pilot replicate the visual information collected by camera 38s on the drone in time sequence. The plurality of first sensory cues are effective for stimulating at least one additional sense of the user 12, including vision, hearing, smell and taste (in this example, vision). The haptic sensory cues are generated in synchronization dependent on the plurality of first sensory cues. That is, the haptic sensory cues represent the flight conditions (e.g., control surface orientation and air pressure, etc.) experienced by the drone synchronized to the visual information from one or more camera 38s on the drone. One or both of the time sequential data and the time sequential first sensory data may include at least one sensed condition that is sensed at a location remote from the user 12. The remote transmitter can be part of a remotely controlled vehicle, such as a drone, robot or remote vehicle. This enables, for example, the pilot to intuitively "feel" the forces on the drone while visually seeing the results of a flight maneuver of the drone, such as a banking turn. This sensory feedback to the pilot's control of the flight enables the pilot to have an intimate and immersive perception of the drone's flight.

For virtual or augmented reality, a full sphere of views may be made available to a pilot wearing, for example, a head tracking virtual reality headset, such as the Oculus Rift. As the pilot looks right, left, up, down, for example, the movement of the pilot's head is tracked and an appropriate video scene can be generated in 3D on the virtual reality video headset. The perspective and zoom of the camera 38 image data can be controlled via a microprocessor running a stored computer program set of instructions so that the pilot may experience the visual cues as if the pilot is physically located anywhere on the drone (cockpit, tail, wingtips, etc.). Also, the collected video data can be combined with computer generated images so that the perspective viewed by the pilot can be from outside the drone. For example, the pilot can view the drone he or she is remotely controlling as if flying along side or behind the drone.

Although this non-limiting exemplary embodiment describes haptic sensory cues combined with auditory and/or visual sensory cues, the combination of sensory cues could be any combination of the senses perceivable by a human, including smell, taste, hearing, sight and touch.

The HHMI configured as a full body undergarment can be a component of a virtual reality interface that deepens the immersion for the operator by tying in real-time head and body movements to a three dimensional, perceived visual sphere. High quality, binaural, audio provided through sound canceling headphones replicate the actual, real-time sounds that are ambient to the remote robot.

The HHMI can be configured as a sleeve, legging, jumpsuit, coverall, jacket, trouser, cap, glove or other wearable electronic. The HHMI may be comprised of a multilayered structure with the electrodes 14 in contact with the skin of the user 12, insulation and wiring layers, and the sleeve covering. The layers, such as the outer covering may be, for example, a thin, multi-axial stretchable fabric. The fabric can be electrically insulating, and contain conductive threads, patches, coatings or inks to conduct the detected and applied electrical signals. In some of the drawings the electrodes 14 are illustrated as being on the outside of the sleeve to show the concept of electrode size and location. In an exemplary embodiment, the sleeve is made from an opaque Lycra material with flexible conductive fabric electrodes 14 disposed on the interior of the sleeve and in direct face-to-face electrical contact with the skin on the arm 16 of the user 12. The fabric of the outer cover or other layer provides sufficient compression to urge the electrodes 14 into face-to-face electrical contact with the skin of the arm 16. In addition or alternatively, straps, bands, Velcro or other such mechanisms can be used for urging the electrodes 14 into face-to-face electrical communication with the user's skin. Flexible and conductive fabrics, such as copper/polyester fabric can be used to make electrode patches that are highly conductive, thin and flexible. Signal cross talk, interference from or to the electronics of the HHMI may be mitigated with shielding layers separating, as necessary, the conductive pathways and electrically active components.

FIG. 78 illustrates the HHMI configured as a full body undergarment that can be a component of a virtual reality interface that deepens the immersion for the operator by tying in real-time head and body movements to a three dimensional, perceived visual sphere. High quality, binaural, audio provided through sound canceling headphones replicate the actual, real-time sounds that are ambient to the remote robot.

For example, the haptic cues cause the operator to experience wind gusts as sudden jarring movements, or unbalanced stresses on the mechanical and control surfaces, such as experienced in a tight banking maneuver, as proportionally applied pressure or resistance to movement.

Thus, forces experienced by the robot are detected and transmitted, then converted to proportional electrical signals. The operator's body's receptors such as, nociceptors mechanoreceptors, thermoreceptors, proprioceptors and chemical receptors, receive the computer controlled haptic cues applied as electrical stimulation to replicate natural sensations received by the human body through the skin, muscles and bones.

In a teaching scenario, in a general embodiment, the NMES is applied as the generated sensory cue to the user 12 dependent on the position of a body part of a performer relative to a performance element of a performance object with which an event is performed. In a more specific embodiment, such as simulated flight training of manned or unmanned aerial vehicles, one or more sensory cues are computer controlled to stimulate the sense organs of the user 12 (e.g., student pilot) effective for stimulating various processing center of a brain of the user 12 so that user 12 learns how to position his body member corresponding to the position of the performer of the event. Sensory cues are applied to the user 12 and are dependent on a position of at least one body member of a performer relative to a performance element of a performance object with which an event is performed. For example, in addition to the haptic cue, audio and visual sensory cues can be applied synchronously to the user 12 senses. The sensory cues are effective for stimulating the various processing center of a brain of the user 12 so that user 12 learns how to, for example, rapidly achieve the position of a particular body member (e.g., hand on a joystick) corresponding to the position of an instructor or performer (e.g., actual pilot) performing the event (e.g., flying an actual plane or drone).

A key concern in the safety of aircraft flight is ensuring that the pilot maintains an appropriate understanding of the orientation of the aircraft. This is a concern both for manned aircraft flight, especially in Instrument Flight Rules conditions, as well as for unmanned aircraft operations. In manned flight, even with in-cockpit aids such as an artificial horizon, pilots can still become disoriented and often may trust their physical and proprioceptive senses as opposed to the cockpit aids.

In unmanned aircraft operations, pilots lack proprioceptive inputs and must instead receive all information about aircraft orientation through other means. Typically, this has been done through visual and auditory aids on the ground stations of remote controllers, each of which, if overused, can actually become a detriment to a pilot's awareness of the situation.

Haptic feedback provides an additional outlet for alerting the pilot to the true state of the aircraft, but historically, haptic interfaces have not been well-received. If improvements in haptic stimuli could reach the point that gentle, finely-located "pressures" could be applied to the pilot's body in varying locations (to promote a sense of being upside down or tilted to the side), it may provide an additional alerting mechanism to inappropriate aircraft orientations. In addition, a variety of other alerts could potentially be sent through a similar interface.

FIG. 79 illustrates the inventive HHMI configured for applying electrical stimulation to large muscle groups 18 to provide haptic cues of a manned or unmanned aerial vehicle. As described herein, the HHMI provides such an interface with haptic feedback in a product platform that can be integrated into the existing and future robotic systems. Data from sensors on a remote UAV is used to indicate remote flight conditions via an electrical stimulation (haptic cues) applied to the pilot (e.g., warning the pilot that the drone is in an unintended banking condition or is approaching an obstacle). The sensors of the drone are mapped to the operator so that the large muscle groups 18 of the back, shoulders and thighs become indicators to the operator of the flight conditions of the drone. A similar system can be used for pilots of aircraft, long haul truckers and others where an indication of important information can be of benefit and conveyed via the HHMI. For example, a pilot may be made aware of a subtle banking that is putting him off course but might otherwise not be noticed. A long haul trucker can be woken up if she falls asleep behind the wheel.

The HHMI is also an enabling technology for remotatlity that is to be integrated in a variety of existing and future products, not just for unmanned aerial systems and other robotic systems and the various other applications and uses described herein. The elements, construction, circuits, apparatus, computer programming code, methods and algorithms described herein with reference to the various exemplary embodiments may be employable as appropriate to other uses of the HHMI, some of which are described herein, other of which will be readily apparent when described and inherent features of the HHMI are considered.

As shown, the inventive Human Machine interface includes a virtual reality visual system that deepens the immersion for the user 12 (e.g., pilot, student, sports fan, patient, etc.) by tying in real-time head and body movements to a three dimensional, perceived visual sphere. Camera systems onboard the drone feed real-time video from enough camera 38 angles to create a seamless (after software cleanup) sphere of vision. As an example, if the pilot is sitting in the inventive chair shown in FIG. 69, this virtual visual sphere could give the pilot the impression that he is flying a glass chair rather than a drone.

The audio system of the ALS may include high quality, binaural, audio provided through sound canceling headphones to replicate the actual, real-time sounds that are ambient to the remote UVS, or other sounds such as white noise, soothing or aggressive music, depending on the intended mood and temperament of the user 12. The inventive Human Machine interface is intended to isolate the pilot from local ambient distractions, but the degree of this isolation can be easily controlled to maintain safe conditions. Also, although a bit more invasive than surface electrodes 14, the electrodes 14 used to apply or detect the electrical signals can be of a type where the skin is pierced. However, piercing the skin is not necessary to effect benefits from the inventive Human Machine interface and much less invasive gels, gel electrodes 14, carbon fiber electrodes 14, etc., can be used.

In addition to the full immersion of visual and auditory stimulation corresponding to the remote drone as it flies, the application of auto-action and other haptic cues enable the pilot, in a sense, to intimately "feel" the flight conditions experienced by the remote UVS. With the level of remotality immersion into the real-time conditions of the UVS created by the inventive Human Machine interface, the pilot does not just feel like he or she is flying the UVS, to the extent possible, the pilot becomes the UVS.

The HHMI configured as a tactile suit can treat autism by providing a sensation replicating light pressure thereby providing therapeutic benefits using a custom-calibrated, mobile and convenient system.

FIG. 80 shows the plurality of drones having proximity sensors for detecting other drones, ground, and other potential collision obstacles. A formation of such VR HHMI enabled drones could be effectively piloted by people anywhere in the world, all experiencing simultaneous side-by-side flight. The pilots would feel the presence of their flying neighbors, with head tracking VR goggles and binaural audio that completes the immersion. Such as system may be useful, for example, for search and rescue in remote areas, even expanding the volunteer base far beyond the local area.

The drones could be a commercial package delivery service flying autonomously in formation along defined skyways. Then, "pick up" a human VR pilot to safely complete the flight from the skyway to the door step package delivery. The human is only flying the drone when needed, when more things could go wrong and the agility of the VR HHMI would be most useful.

The data from proximity sensors can be used to allow drones to fly in formation for example, when delivering packages from a central warehouse to a neighbor hood. The formation flying can be achieved with an operator providing flight control for a squadron of drones so that cost of having a human operator controlling each drone during the common formation flight is avoided. The squadron of drones maintain safe formation by each drone knowing and responding to proximity details much as a real-world flock of birds or school of fish achieves their seemingly impossibly timed individual maneuvers. Once the neighbor hood has been reached, the flight of each drone can be take over or monitored by a human operator to safely deliver the package. Once the packaged is delivered, the drones may for up in formation again and again achieve a safe flight back to the warehouse under the control of a signal remote operator.

The proximity signals can also be applied to the drone operator for military, gaming or entertainment purposes, such as for an aerial combat between drones. In addition to the proximity data being applied as haptic cues, for example, other haptic cues may cause the pilot to experience wind gusts as sudden jarring movements, or unbalanced stresses on the mechanical and control surfaces, such as experienced in a tight banking maneuver, as proportionally applied pressure or resistance to movement. Even subtle nuances such as the warm 16th of the sun shining on the top surfaces of the drone can be experienced at a corresponding location on the back of the pilot. It isn't yet known what degree of immersion and which nuances might be optimal for a given set of circumstances, the inventive Human Machine interface is designed with the intention of enabling the high quality resolution of multiple computer generated, enhanced and real-time synchronously applied, immersive sensory cues.

Thus, forces experienced, for example, by the drone, are detected and transmitted, then converted to proportional electrical signals. The pilot's body's sensation receptors such as, nocireceptors mechanoreceptors, and thermoreceptors including proprioceptors and chemical receptors, receive the computer controlled haptic cues applied as electrical stimulation to replicate, for example, natural sensations received by the human body through the skin, muscles 18 and bones. Since the nervous system of the human body operates via electrical impulses, any nerve, nerve ending, muscle or receptor can be triggered by electrical stimulation. Signal characteristics such as; the location, timing, pulse length, frequency and amplitude of the electrical stimulation are applied under the control of the computer depending on the intended type of sensation or muscle movement to indicate to the pilot the drone's onboard and ambient conditions.

Depending on the applied NMES cue, the pilot experiences the haptic cue as pressure, as if pushing against resistance and/or being forced to move into the position related to the wing control surface, and/or a vibration or even a blow as if being jarred by an external force (e.g., being buffeted from a wind gust).

The inventive Human Machine interface has an advanced multi-sensory system that uses the physiology of the pilot to integrate the onboard and ambient conditions of a remotely flown drone into the information pool used by the pilot to control the drone's flight.

As shown and as described herein throughout, the inventive HHMI adds a new mode of interaction to the Human Machine interface. Haptic sensory feedback is used to provide touch cues related to the remote robot internal and ambient conditions. Also, using the same basic structure, the detection of body movements of the operator from muscular electrical signals can be utilized to generate remote electrical signals. The HHMI, when combined with available virtual reality products and proprietary software and hardware, completes the immersion so that the brain of the operator processes the received haptic, visual and auditory cues for a new form of robotic teleoperation and telepresence.

Remote Surgery

The HHMI can be employed to provide haptic feedback to a surgeon performing robotic surgery. FIG. 82 is a configuration of the inventive HHMI configured for robotic surgery. For example, at a location remote to the surgeon, a robotic surgical station can use, for example, a scalpel to cut through the skin of a patient. The robotic surgical station is capable of operating under the control of the remotely located surgeon. However, using a typical remote surgery system, the remotely located surgeon is relegated to viewing the skin being cut on a two dimensional video screen and typically receives little or no feedback related to the mechanical forces that are involved in cutting through the skin. The surgeon does not feel the initial resistance to the tip of the scalpel as the skin is cut, and then the quick change in resistance once the skin has been penetrated. This can cause over penetration and too deep of a cut, especially when performing delicate operations involving reconstruction of skin such as facial surgeries or when removing a tumor from a highly sensitive area where nerves, blood vessels or other delicate body constituents are present. Skin reconstruction is just an example operation that benefits from the tactile feedback and VR/AR remotality experience enabled in accordance with this use of the HHMI.

In accordance with this aspect of the invention, the remote surgeon can view the surgery using head tracking 3D goggles, hear the ambient sounds of the operating room, and feel the mechanical forces involved in the surgery.

In accordance with this aspect of the invention, a force is detected resulting from a robotic surgical operation, such as the resistance to the scalpel tip at the beginning of the cut, followed by less resistance once the skin has been penetrated and is being cleanly sliced. A transmittable signal is generated dependent on the detected force. Following this example, the detected force can be pressure needed to overcome the resistance by the skin to the scalpel and the pressure of rapid change in resistance once the skin has been penetrated, which in an non-remote surgical procedure would provide direct tactile feedback to the surgeon to immediately ease up on the pressure exerted through the scalpel tip and edge to the patient's body. The transmittable signal is by an appliance in physical communication with a body part of a user 12 performing the robotic surgical procedure. For example, the appliance can be a remotely controlled robotic arm holding the scalpel. The remote surgeon may hold a stylus that has a weight and shape consistent with a surgical scalpel. The stylus may be in contact with a variable viscosity material (such as an electrical rheological fluid) so that there is a physical structure in contact with the stylus that resists the movement of the tip of the scalpel in proportion to the detected skin resistance. Alternatively, or addition-ally at the same time when the scalpel is making the actual cutting, haptic cues can be applied to the remote surgeon that are dependent on the received transmittable signal. The combination of the variable viscosity physical structure and the HHMI applied haptic cues (e.g., involuntary movement and somatic/kinesthetic sensations) provides valuable feedback to the surgeon so that a safer, more effective remote surgical procedure can be performed.

Immersive Sporting Event Observation and Participation

One can envision a virtual sporting event where the players are located geographically remote from each other, as shown in FIG. 75, and observe and participate in the sport as shown in FIG. 83-54, using the remotality enabled by the HHMI, AR and VR systems described herein. FIG. 83 shows a sport apparatus configured as sensory data detecting shoulder pads worn by a football player. FIG. 84 shows a sport apparatus configured as a sensory data sensing helmet worn by a football player. The shoulder pads, helmet and other gear, including an HHMI configured to be worn as a shirt or full body undergarment by a player, provide data that is sensed during the on-field game play. The sensory data is collected from the perspective of the player. FIG. 85 illustrates sensory data detected by an on-field player, where the data is applied as sensory cues for virtual immersion by a football fan. The sensory (haptic) data detected by an accelerometer, pressure and other transducers embedded in pads, gear and clothing, along with the audio and visual data collected from helmet can be transferred to a remotely located fan wearing an HHMI and associated VR/AR equipment.

For example, the locations and relative strength of force felt by the ball carrying player on the field in the grips of opposing side tacklers can be mapped to an HHMI worn by the sports fan and proportionally sensed by the fan as somatic and/or kinesthetic sensations. Similarly, these force data can be mapped to the haptic chair and vibrations and/or pressures exerted to the body of the fan while viewing the play from the ball carrying player's perspective. The HHMI can be configured to look like the jersey worn by the fan's favorite team. If more than one player has the data determining equipment, such as video, auditory and haptic transducers, then the fan can switch around and experience the game from the perspective of multiple players.

The audio and haptic sensory cues provided by haptic chair may be binaural sound, vibration, electrical signals, etc. that are dependent on the haptic and audio data detected from the player on the field. The haptic chair can provide sensory cues responding to on field data from player so that a fan experiences haptic sensations that are synchronized to a 3D head tracking image and binaural sound from the perspective of the player on the field (using cameras 38 and microphones 36 embedded, for example, in the helmet worn by the player). FIG. 86 shows sports apparatus configured as sensory data sensing helmet, glove, baseball and bat used by a baseball player. Haptic, visual and audio data detected by sensors on gloves, helmet, bat, ball, etc. is transmitted to fan for virtual immersion in a manner similar to the football example described above. The haptic Human Machine interface (HHMI) can be used to alleviate disabling motor systems of Parkinson's Disease (PD). The HHMI sleeve provides transcutaneous electrical activity detection of the muscles and nerves involved in oscillating limb movement of a PD tremor. In response to the detected tremor, the HHMI sleeve applies an electrical signal to cause involuntary motor unit impulses that counteract the undesirable trembling that would have otherwise occurred. Among the advantages of this approach is on-demand, immediate and automatic relief without drugs or surgery.

Treatment of Movement Disorders

The pharmacological treatment of tremor often has undesired side effects. For example, Levodopa is a potent drug for controlling PD symptoms. However, over time levodopa frequently results in motor complications, such as fluctuations and dyskinesias, making the use of higher dosages of levodopa a difficult decision, especially for relatively younger patients. Although deep brain stimulation has been shown to be more effective than the pharmacological approach for treating tremor, it is a highly invasive surgical procedure that is associated with an increased risk of serious adverse events.

Physiological tremor is measured in healthy individuals as a low amplitude postural tremor with a modal frequency of 8-12 Hz. The physiological tremor measured in a healthy individual at rest is a normally occurring, low amplitude oscillation determined by mechanical limb properties and cardioballistics. The degree of regularity, measured by approximate entropy, in the limb acceleration signal (measured movement data) and the coherence between limb acceleration and muscle output (measured EMG data) has also been shown to be useful in characterizing both physiological and pathological tremors.

EMG measurements have been demonstrated to be reliable predictors of motor unit synchronization in tremors. Studies have shown that even under varying loads on the tremor-effected limb, the dominant tremor rate of PD tremors as measured by EMG showed constant frequency reflected by corresponding sharp peaks in the EMG spectra irrespective of changes in mechanical resonant frequency.

The HHMI makes use of this ability to determine tremor muscle contractions using EMG and movement sensors, and is designed to adapt to the physiology of different patients by automatically determining the dominant tremor muscles by analyzing the detected signals received from a number of electrodes located at the various muscles of the patients forearm. Tremor in PD is classified as a resting and/or postural tremor, which also has increased amplitude, regularity, and tremor-EMG coherence 10 Hz. The modal frequency of resting tremor in PD is between 3 and 5 Hz and postural tremor frequency ranges from 4 to 12 Hz. In addition to determining the dominant tremor muscles, the HHMI also analysis the EMG and movement data and makes adjustments to the application of the mitigation signal so that changes in tremor frequency and strength is automatically accommodated.

The HHMI can be used in conjunction with traditional therapeutic choices, and may reduce the dosage or aggressiveness of the drug conventionally used to treat tremor, and may obviate or at least delay the need for invasive deep brain surgery.

The use of transcutaneous electrical nerve stimulation has been approved by the FDA for pain relief, and more recently for preventing migraine headaches. In accordance with an embodiment, the detection side of the HHMI uses an EMG system, such as the DelSys Trigno wireless sensor system and EMGworks® Acquisition and Analysis software. Computer analysis of the detected EMG and movement data is done on the output from the EMGworks® software, and/or from the analog-out of the Trigno base station, integrated with our HHMI proprietary software running on an Arduino YUN microprocessor.

For signal generation and application, the HHMI multiplex electronic circuit shown in FIGS. 34-42, for example, works with the microprocessor to create a selectable array of electrodes. The multiplex electronic circuit adds further adjustability to the waveform of the applied signal, and iterations of this circuit are explored using, for example, pulse width modulation, passive/active matrix electrode selection, AC, DC pulses, and high-speed transistor switching. The microprocessor controls signal switching elements of the multiplex circuit to determine which of the individually addressable electrodes apply the different TENs signals (or no signal). The EMG detection electrodes are also individually addressable through the multiplex circuit. As an example, with the high speed switching multiplex circuit, very high sample and signal application rates can be achieved allowing a large number of individually addressable electrodes to selectively detect and apply signals.

Parameters such as type, number, size, and shape of the electrodes can be varied. The range, timing, sampling rate, etc., of the detected and applied signals can be semi-automatically and automatically adjusted, with an onscreen graphical user interface for adjusting the digitally controlled electronic circuit elements and generated signal characteristics.

Design flexibility can include using wireless Bluetooth connectivity to allow, if necessary or beneficial, the off-loading of parts of the real-time signal analysis to a more powerful desktop or networked computer, with local and/or cloud storage. An efficient chip-based detecting system can be constructed, for example, working with Neurosky (San Jose, Calif.) and their BMD101 biosensor chip. A chip based sensor enables local amplification the weak signal close to its source, using the chip's analog front end to condition the weak signal to achieve a more easy to process SNR. A built in digital processor in the chip can employed to off-load much of the number crunching that would otherwise have to be done by the general purpose microprocessor.

Dry electrodes, such as the examples shown in FIGS. 47-54 can be used for detection and application of electrical signals. Dry electrodes are more convenient, comfortable and much longer lasting than gel electrodes, and therefore more suited to a wearable electronic. A version of the dry electrodes may be constructed with a concentric separated signal detector/signal applier electrode configuration fabricated by saturating the surface of a conventional gel electrode with microscopic conductive beads to form a hybrid dry/gel electrode. Another electrode configuration includes a rubber bristle structure fabricated using soft polymer bristles that are electroplated with Ag/AgCl. The bristles may be thin and flexible, terminating in a flattened skin contact area to maximize the face-to-face electrical communication between skin and bristle gang. As part of the HHMI sleeve, the spaced bristle structure also promotes airflow at the skin surface. The Ag/AgCl electrical contact optimizes the ionic conduction for EMG detection and TENS signal application. As an example, to make the bristles conductive they can be coated with a conductive ink, silver is electroplated on the conductive ink and then anodized in a solution of KCl or similar salt to form an adherent AgCl coating on the silver.

Dry electrodes have higher contact impedances as compared to gel electrodes. For example, because there is such a weak EMG signal available for transcutaneous detection, the a very short distance and/or Faraday cage-type shielding of the conductor between the electrode (where the signal is received) and the first amplification of the received signal may be used. If there is too much noise or crosstalk interference, active electronic elements to amplify the EMG signal very close to the source (skin surface) will be built directly into the dry electrode pad. Real-time impedance monitoring of the quality of the dry electrode contact enhances the ability to make adjustments as necessary to the electrodes and the conduction path of the detected and applied signals. If the detected signal from the dry electrodes has too much noise or crosstalk and is not adequate for real-time analysis, the HHMI software and hardware can include known elements/techniques to obtain low latency between tremor EMG signal detection, mitigation signal determination and TENS signal application.

Movement disorders are chronic, often painful, and debilitating conditions that affect the ability to control movement. Having a movement disorder can make it difficult—even impossible—to do the routine things in life. More than 40 million Americans—nearly one in seven people—air affected by a movement disorder, including tremor, Parkinson's disease, Tourette's syndrome, dystonia, and spasticity The HHMI can be used in combination with a core-steadying gyroscope shown in FIGS. 87 and 88 to be a wearable electronic for treatment of balance and gait disorders. Vision, the vestibular system and the somatosensory system all work harmoniously to maintain posture and balance in a healthy individual.

Vision is primarily used in movement planning and avoiding obstacles. The vestibular system senses linear and angular accelerations, and the many sensors of the somatosensory system are used to determine body part position, contact and orientation.

The HHMI can be configured in combination with augmented reality (AR) and virtual reality (VR) vision and auditory systems for use as a wearable electronic for cognitive therapy. The HHMI may be used for exploring disease trends and diagnosis using advancements in cloud-storage, and the analysis of Big Data with artificial intelligence (network-connected HHMIs can upload anonymous and encrypted collected medical information from potentially millions of patients). The HHMI combined with recently available Augmented and Virtual Reality systems provide computer-controlled sensory cues (haptic, audio, and visual) applied to "re-calibrate" or "re-wire" the brain and nervous system through the simultaneous application of synchronized sensory cues. The cognitive therapies can take advantage of neuroplasticity and rebuild damaged processing capabilities that are the cause of movement disorders' physical symptoms. There is growing evidence that learning a new skill such as playing the piano, can be an effective tool for rehabilitation. The practicing and playing of a musical instrument reinforces the association of motor actions with specific sound and visual patterns (musical notation) while receiving continuous multi-sensory feedback. The connections between auditory and motor regions (e.g., arcuate fasciculus of the brain's frontal lobe) are strengthened while multimodal integration regions (e.g., around the intraparietal sulcus of the brain's parietal lobe) are activated. A virtual cognitive experience can be created that is composed of simultaneously applied sensory cues that stimulate the touch, hearing and visual processing centers of the subject's brain. The visual sensory cues of the experience will be seen by the subject through the VR/AR headset. The audio sensory cues will be heard through high quality binaural headphones. The touch sensory cues are applied through the HHMI garment.

Although exemplary embodiments are adaptable to all or partial computer generation of the sensory cues (e.g., similar to a video game), recorded or real-time sensory information can be obtained from a performer, such as a pianist, interacting with a physical object, such as a piano. In this case, the HHMI and other hardware/software components are used to detect the hand and finger positions of a pianist. A head-mounted video camera, such as a Nikon Keymission 360, can record the piano playing from the pianist's perspective, and high quality audio will be recorded, again from the pianist's perspective, using a Freespace Binaural Microphone. The haptic, audio and visual sensory information is thus obtained using the EMG and motion detection capabilities of the HHMI combined with available pattern recognition software and hardware (e.g., Leap Motion). In this example, the actual movements of a real pianist are used to determine the sensory cues that will be applied in an effort to teach piano to the subject. A cognitive therapy session can occur either remotely or at the instrument. The HHMI can be used for cognitive therapy with the subject at the piano, and also while sitting in a comfortable easy chair. In either case, the combination of haptic, audio and visual cues are applied to reinforce the learning of the piece of music, and rewiring damaged neuronal communication links.

As shown in FIGS. 87 and 88, the HHMI can be configured with a Gyro-Vest that holds a core-stabilizing gyroscope adjacent to the chest of the wearer. A review of the literature indicates that the swaying of a healthy individual while maintaining balance can be modeled as an inverted pendulum. The HHMI uses a detectable EMG signal that corresponds to the muscle groups that are activated to maintain the inverted pendulum sway (i.e., the BCMs), and that up to a point (determined by the spinning gyroscope mass and rotational speed), the swaying of the torso core will undergo proportional inertial resistance from the gyroscope. The HHMI detects EMG, movement and inertia data at the limbs, BCMs and torso core. Using the HHMI Torso Suit shown in FIGS. 87 and 88, the Balance Control Muscles (BCMs) of a test subject are determined and involuntarily activated in conjunction with a core-steadying Gyro-Vest. The HHMI is applicable, among other uses, to cognitive therapy, accelerated learning, brain/spinal cord rehabilitation, balance restoration and tremor mitigation.

The HHMI can be configured for an interface between a human operator and a remote machine where inertia changes of the subject wearing the HHMI detect Movement Disorder Motion (MDM). Electromyography detects the actual MDM causing muscles. The detected information is digitally analyzed to determine MDM-opposing muscles and MDM mitigation signals. The MDM mitigation signals are applied to stimulate the MDM-opposing muscles. The target for detection is the muscle/nerve motor units resulting in MDM, with the mechanism of action for mitigation being MDM-opposing muscle contractions that restrain the MDM.

Remote Control and Sensing

The advancement of unmanned vehicle systems for many applications has been rapid and widespread. There has not been a concurrent evolution in the interface of a remote human operator with the unmanned vehicle, beyond the joystick and video display. The industry has focused on leaps forward for the main robotic system, while the joystick/video interface seems to have been left as a good-enough solution. Going forward, the good-enough solution of the previous generations of robotics will be a constraint when paired with the next generations.

A haptic interface uses touch and movement to allow a human to interact with a computer. The interaction can be through bodily sensations, where computer-controlled touch sensory cues are received as the input to the human, and detected movement, where the determined movement of the human body is received as input to the computer.

UVS operators and the UVs they control are typically remotely located from each other. This remoteness creates human factors issues. Operators of UAVs note a number of interface issues physical arrangement of the displays (too far apart), the unnecessarily complicated retasking processes, and difficult-to-read displays.

Looking back at least several UVS technology generations ago, critical principles of aviation display design was developed through an understanding of the psychology of information processing. Alerts are another aspect of the Human Machine interface that should be carefully considered. It is important for alerts to be easily interpreted. Alerts, visual, auditory, or otherwise, must signal to operators if there is a situation that requires attention, but ideally with minimal work-flow disruption.

There is already a lot of multisensory information provided to the remote operators to convey the status of the unmanned vehicle. Onboard sensors and cameras can provide real-time visual, kinaesthetic, vestibular and auditory information. Most of this information is conveyed using instruments and displays monitored by the remote operator. Even with the best display technologies and graphical-user-interfaces, the status and environment of the UVS is difficult to absorb.

With conventional interfaces, remote operators do not have adequate multi-sensory cues, like one has in a manned vehicle, to really comprehend changing conditions such as orientation, speed, impacts and vibrations. The kinaesthetic cues available from the motion of a manned vehicle are not available to the remote operator to give an ambient sense of movement and gravitational forces. For example, the operator of a UAV has to rely on a visual or audio warning for a condition that the pilot of a manned aircraft would detect through non-visual/audio motion and touch senses. The pilot knows by proprioception, by the internal sense of the relative position of the body's musculoskeletal system and resistance to movement, when a sudden banking occurs due to a gust a wind. The lack of adequate sensory cues available to the remote operator can result in a failure to detect or correctly diagnose a problem, compromising the safe and effective control of the vehicle, or jeopardizing the mission.

The Multiple Resource Theory holds that different sensory modalities draw from different attentional resources. It has long been suggested to make multisensory cues available to the operators of remote vehicles. It has been suggested that a multisensory interface reduces the overload on an operator experienced when a particular sensory mode, for example, vision, is swamped with information.

Over four decades ago, Professor Steve Mann, who has been called the father of wearable computing, foresaw a new approach to the computer/human interface where the apparatus is always ready for use because it is worn like clothing. This led to the evolution of a concept Mann calls Humanistic Intelligence where video and audio sensory cues create a "perceptual reality mediator." This generalized mediated perception system can include deliberately induced synesthesia where neurological stimulation of one sensory or cognitive pathway leads to automatic, involuntary experiences in a second sensory or cognitive pathway.

Humanistic Intelligence theory thinks of the wearer and the computer with its associated input and output facilities not as separate entities, but regards the computer as a second brain and its sensory modalities as additional senses, in which synthetic synesthesia merges with the wearer's senses. In this context, wearable computing has been referred to as a "Sixth Sense". Now, due in large part to Moore's Law and the continuous miniaturization of electronics, and other technologies, such as small, lightweight, ultra high resolution displays, Dr. Mann's decades-long vision for Humanistic Intelligence and wearable computing will soon be as common place as the ubiquitous cellphone.

It is hard to doubt that a multi sensory Human Machine interface would offer significant advantage for all kinds of uses of remotely controlled unmanned systems. The enabling technologies for a truly Deep Immersion Human Machine Interface now exist and soon, in an artificial but still very perceivably real sense, the operator will "become" the unmanned vehicle.

The HHMI brings the "sixth sense" of Humanistic Intelligence to the forefront of Unmanned Vehicle Systems by combining wearable computing, an immersive haptic interface and augmented/virtual reality.

There have been envisioned wearable computing systems that use the inputs from biosensors located on the body as a multidimensional feature vector with which to classify content as important or unimportant. In the context of the HHMI/AR/VR system described herein, sensed EMG and movement data is provided as input to a microprocessor. The data is analyzed and used to control a remote UV, while audio, video and haptic information related to onboard UV conditions is provided to the operator.

The HHMI is configured in combination with augmented reality (AR) and virtual reality (VR) vision and auditory systems to create a wearable electronic for unmanned vehicle systems. The HHMI provides transcutaneous electrical activity detection of the muscles and nerves involved in the intended control movements of the remote control operator. In response to the detected control movements, control signals are transmitted to the remote unmanned vehicle. Sensed information from the unmanned vehicle is in turn received by the HHMI and applied as an electrical signal to cause involuntary motor unit impulses and simulated skin and proprioception sensations that counteract the undesirable trembling that would have otherwise occurred.

The HHMI creates a computer-controlled artificially created sense or perception that replicates actual proprioception sensations at a subconscious level. This artificially created perception is further confirmed by the augmented and virtual reality visuals creating an ultra-deep immersion that is experienced as an altered reality. The sense of proprioception is gained primarily from input from sensory nerve terminals in muscles combined with input from the body's vestibular apparatus. The HHMI stimulates the nerves and muscles to produce a haptic sensory experience that is directly related to the remote ambient environment and sensed conditions of the UV. The HHMI maximizes information placement and prioritization on an augmented reality headset where the information is superimposed data on the actual visual scene of the user (allowing for interactions in the real-world, more immediately accessible, better for short range unsafe conditions such as battle field and first responders). The HHMI can also be used with a virtual reality headset to create total immersion where computer-controlled interactions can place anything anywhere. With the binaural features of the HHMI, sound can be used to focus the pilots visual attention in the virtual space towards a certain direction. The haptic and biosensing features of the HHMI allow predefined, intuitive movements to determine the operator's remote control intentions, and to apply involuntary movements and simulated sensations to convey real-time flight conditions to the operator.

The HHMI adds a novel dimension to the Human Machine interface. The HHMI utilizes haptic sensory feedback creating relevant touch cues related to the remote UV onboard/ambient conditions, and the detection of body movements of the operator from muscular electrical signals to intuitively generate remote control signals. These features enable the operator to be alerted to subtle variances in conditions which over time could become problematic. When combined with the recently available augmented and virtual reality technologies, the HHMI makes possible the experience and control of UV operation as if the operator were indeed the UV rather than a remote observer/controller. The operator feels, sees and hears the synchronized sensory cues that put him in the skin of the UV.

Augmented and virtual reality headsets, and binaural headphones, are paired with the HHMI to enable varying degrees of altered reality immersion, enabling the control of a remote unmanned vehicle system and creating an experience as if the pilot were onboard the unmanned vehicle system. In fact, an altered reality experience can be created where the pilot experiences the remote vehicle control as if he is the vehicle.

A key concern in the safety of aircraft flight is ensuring that the pilot maintains an appropriate understanding of the orientation of the aircraft. This is a concern both for manned aircraft flight, especially in IFR conditions, as well as for unmanned aircraft operations. In manned flight, even with in-cockpit aids such as an artificial horizon, pilots can still become disoriented and often may trust their physical and proprioceptive senses as opposed to the cockpit aids. In unmanned aircraft operations, the remote pilot lacks proprioceptive inputs and must instead receive all information about aircraft orientation through other means. Typically, this has been done through visual and auditory aids on the ground stations of remote controllers, each of which—if overused—can actually become a detriment to a pilot's awareness of the situation.

Haptic feedback provides an additional input for alerting the pilot to the true state of the aircraft, but historically, haptic interfaces have not been well-received. If improvements in haptic stimuli could be improved to the point that gentle, finely-located "pressures" could be applied to the pilots body in varying locations (to promote a sense of being upside down or tilted to the side), it may provide an additional alerting mechanism to inappropriate aircraft orientations. In addition, a variety of other alerts could potentially be sent through a similar interface.

The HHMI is combined with recently available Augmented and Virtual Reality systems to explore computer-controlled sensory cues (haptic, audio, and visual) applied in an attempt to "recalibrate" or "re-wire" the brain and nervous system through the simultaneous application of synchronized sensory cues. For example, the HHMI can be paired with the Oculus Rift virtual reality headset or with the Meta augmented reality headset.

In a teaching mode, the HHMI VR/AR configuration takes advantage of the brain's neuroplasticity to build muscle and pattern memories that are the "best practices" of top remote control pilots. The HHMI VR/AR configuration is usable in an accelerated learning system to teach novice pilots from the perspective of a top gun. In this flight simulation mode, the HHMI is used to reinforce the association of motor actions with specific sound and visual patterns corresponding to the control of an unmanned vehicle, while receiving continuous multi-sensory feedback. The connections between auditory and motor regions (e.g., arcuate fasciculus of the brain's frontal lobe) are strengthened while multimodal integration regions (e.g., around the intraparietal sulcus of the brain's parietal lobe) are activated. In this mode, the HHMI is a tool for exploring the use of a wearable electronic with the latest advancements in virtual reality for creating the ultimate flight simulation.

In this flight simulation mode, the HHMI and VR/AR configuration creates a virtual cognitive experience composed of simultaneously applied sensory cues that stimulate the touch, hearing and visual processing centers of the subject's brain. The visual sensory cues of the experience will be seen by the subject through the VR/AR headset. The audio sensory cues will be heard through high quality binaural headphones. The touch sensory cues are applied through the HHMI garment.

Although the flight simulator mode is adaptable to all or partial computer generation of the sensory cues (e.g., similar to a video game), the recorded sensory information can be obtained directly from an actual flight with the nuances of control movements from a performer, such as expert remote control operator. In this case, the HHMI and other hardware/software components are used to detect, for example, the hand and finger positions of the pilot expert on the control interface of the unmanned vehicle system.

The HHMI can be used with an artificial real-time perspective view of a UAV as displayed on a visual cue system such as an augmented or virtual reality headset. Data from onboard cameras and onboard accelerometers, GPS, etc., plus stored image data of the UVS are used to create a real-time artificial perspective of the UV in flight that is received by the remote pilot as the visual sensory cues. The UV and the scene around the UV can appear to the pilot from any visual perspective.

The electrical signals applied by HHMI invoke a perception by the pilot related to the sense of touch. These received haptic sensory cues can be applied as computer-controlled electrical signals that are mapped to the body of the pilot so that different body parts receive different sensory stimulation. For example, the hands and arms of the pilot may be considered the human embodiment of the control surfaces, such as flaps of a drone UV. The feet and legs of the pilot may be considered the human embodiment of propulsion components, such as the engines of the drone. In this example, the flexing of one or both feet of the pilot can be detected and converted to flight control signals to control the engine speed (and thereby control the speed of the drone). Engine speed data received from the drone can be converted into a haptic sensory cue that is displayed along with visual speed data, such as GPS determined speed relative to ground, so that the pilot has an intuitive sense of the drone's engine speed (for example, intensity of a sensed vibration can be correlated with the RPM of the engine) and along with the visual confirmation of the drone's speed relative to ground. The pilot receives multiple sensory cues that are inter-related and synchronized to indicate the flight conditions of the remote UV.

This enables, for example, the pilot to intuitively "feel" the forces on the UV while visually seeing the results of a flight maneuver of the UV, such as a banking turn. This sensory feedback to the pilot's control of the flight enables the pilot to have an intimate and immersive perception of the UV's flight.

A 360 degree camera system collects video information onboard the UV. The placement and number of cameras enable a full sphere of views available to a pilot wearing a head tracking virtual or augmented reality headset. The perspective and zoom of the camera image data can be controlled via software so that the pilot may experience the visual cues as if the pilot is physically located anywhere in or on the UV (cockpit, tail, wingtips, etc.).

The HHMI is intended to provide such haptic feedback in a product platform that can be integrated into the existing and future robotic systems. The HHMI represents a possible paradigm shift in the interface, and therefore the utility, of the robotic system.

The HHMI adds a new mode of interaction to the Human Machine interface. Haptic sensory feedback is used to provide touch cues related to the remote robot onboard and ambient conditions. Also, using the same basic structure, the detection of body movements of the operator from muscular electrical signals can be utilized to generate remote control signals. The HHMI, when combined with available virtual reality products and proprietary software and hardware, completes the immersion so that the brain of the operator processes the received haptic, visual and auditory cues for a new form of robotic teleoperation and telepresence.

Computer-controlled electrical signals are applied with signal characteristics effective to stimulate one or more of the tactile receptors found in the skin. The signal characteristics are controlled to selectively stimulate the receptors that have, for example, different receptive fields (1-1000 mm2) and frequency ranges (0.4-800 Hz). For example, broad receptive-field receptors like the Pacinian corpuscle produce vibration and tickle sensations. Small field receptors such as the Merkel's cells, produce pressure sensations. Flight condition data is used to determine the characteristics of the computer-generated electrical activity applied through the HHMI to causes a desired automatic and involuntary movement of the operator's body parts. The result is the operator perceives the involuntary movement as though caused by an externally applied force, for example, as through the operator's hand is the flight control surface deflecting air.

The HHMI can be configured as a full body suit that can be a component of a virtual reality interface that deepens the immersion for the operator by tying in real-time head and body movements to a three dimensional, perceived visual sphere. High quality, binaural, audio provided through sound canceling headphones replicate the actual, real-time sounds that are ambient to the remote UV.

For example, the haptic cues cause the operator to experience wind gusts as sudden jarring movements. Unbalanced stresses on the mechanical and control surfaces, such as experienced in a tight banking maneuver, are experienced as proportionally applied pressure or resistance to movement.

Thus, forces experienced by the UV are detected and transmitted, then converted to proportional electrical signals. The operator's body's receptors such as, nocireceptors mechanoreceptors, and thermoreceptors including proprioceptors, receive the computer-controlled haptic cues applied as electrical stimulation to replicate natural sensations received by the human body through the skin, muscles and bones.

Data from sensors on a remote UAV is used to indicate remote flight conditions via electrical stimulation (haptic cues) applied to the pilot (e.g., warning the pilot that the UV is in an unintended banking condition or is approaching an obstacle). The sensors of the UV are mapped to the operator so that the large muscle groups of the back, shoulders and thighs become indicators to the operator of the flight conditions of the UV. The applied signal causes a desired body position related to a sensed parameter, such as flex, rotation, tilt, pitch, yaw, temperature, vibration, and other detectable stresses or conditions of a mechanical component (wing, fuselage, control surfaces, etc.) of the UVS. The sensed parameter could be air pressure experienced at a wing control surface while maneuvering. The sensed parameter is transmitted from the UV, causing a computer-controlled neuromuscular cues (electrical stimulation) resulting in an auto-action response in the hand of the pilot feeling pressure to assume a position directly related to the UV's control surface. The pressure to move the hand is the result of muscle movements caused by the electrical stimulation. The pilot experiences the sensation of resistance or pressure because of the computer-controlled electrical signals applied to the pilot's own sensory/muscular physiology. In addition to pressure and resistance, the physical sensation of vibrations, knocks and even scratches can be perceived as the result of subcutaneous controlled electrical signal stimulation. The muscle movements are involuntarily and automatic. There are no mechanical force simulators involved.

The uses for the HHMI go beyond UVS. The HHMI opens new avenues in Human Machine interaction and control, that also impacts areas of accelerated learning, physical training and rehabilitation. The ability to identify muscle groups at a sufficient level of definition, and the ability to apply electrical signals at a similar level, enables an HHMI system in which previously-known actions and muscle movements could be developed for improved physical training and correction of physical motion. Muscle memory associated with nearly all kinds of human activities can be more quickly developed to learn, for example, a musical instrument or sport technique. For military applications, beyond the robotics and drones, rapid muscle memory build up could enhance the training of soldiers in basic and advanced weapons. Additionally, new forms of safety restraints could be imagined in which the human user is prevented from taking an action that may result in injury or a catastrophic vehicle accident.

The invention claimed is:

1. An apparatus, comprising:
   a wearable electronic garment having individually addressable electrodes for detecting electrical activity from at least one of muscles and nerves of a user and for applying electrical signals to said at least one of muscles and nerves of a user, wherein at least some of the individually addressable electrodes both detect the electrical activity and apply the electrical signals;
   at least one processor,
   and at least one memory including computer program code,
   the at least one memory and the computer program code configured to, with the at least
   one processor, cause the apparatus at least to perform:
   detecting the electrical activity received by the individually addressable electrodes from said at least one of muscles and nerves of a user; and
   generating a plurality of haptic sensory cues capable of being perceived by the user wherein the haptic sensory cues are received from the individually addressable electrodes by the user as computer controlled serially generated electrical signals, and wherein the electrical signals invoke at least one of an involuntary muscle contraction and a perception by the user related to the sense of touch.

2. The apparatus according to claim 1, further performing:
   determining control intentions of the user dependent on the detected activity;
   determining an electrical signal having signal characteristics based on the detected activity; and
   applying the determined electrical signal to control an object dependent on the determined control intentions of the user.

3. The apparatus according to claim 1, wherein the wearable electronic garment includes the individually addressable electrodes having relatively more densely packed electrodes and relatively less densely packed electrodes.

4. The apparatus according to claim 1, wherein the haptic sensory cues cause at least an urging towards at least one of a predetermined motion and a predetermined position of a body part dependent on the computer controlled serially generated electrical signals.

5. The apparatus according to claim 4; further performing: detecting the onset of an involuntary tremor; and wherein the urging is effective to mitigate the involuntary tremor.

6. The apparatus according to claim 1, wherein the haptic sensory cues invoke at least one of the involuntary muscle contraction and the perception by the user related to the sense of touch as a perception by the user related to at least one of proprioception, mechanoreception, thermoception and nociception.

7. The apparatus according to claim 1, wherein the wearable electronic is connected to a network for uploading the detected electrical activity are a portion of a big data set, and further performing using artificial intelligence to analyze the big data set and identify at least one of disease trends from multiple users of the wearable electronic garment and for diagnosis of a disease of the user based on the analyzed big data set.

8. The apparatus according to claim 1, wherein the plurality of haptic sensory cues are dependent on a determined condition of at least one movable member of a performing object performing an event.

9. The apparatus according to claim 8, where the performing object comprises at least one of a biological component of the user, another user, or a remotely located machine.

10. The apparatus according to claim 1, wherein an electrical signal is determined having characteristics based on the detected electrical activity, where the electrical signal is generated and applied to an object to cause an action dependent on the detected electrical activity.

11. The apparatus according to claim 10, where the object is one of a biological component of the user, another user, or a remotely located machine.

12. The apparatus according to claim 1, wherein the computer controlled electrical signals cause contracting and relaxing the muscles of the user.

13. The apparatus according to claim 1, further performing, determining user control intentions dependent on the detected electrical activity, wherein the control intentions include machine-implemented actions including moving a cursor on a display screen, selecting a button for a hyperlink in an HTML document, controlling home automation equipment, control gaming actions, remote controlling of unmanned vehicles, controlling of a remote probe.

14. The apparatus according to claim 1, further performing detecting the electrical activity during a known user movement for mapping sources of the detected electrical activity for determining a calibrated set of the individually addressable electrodes to at least one of detect and apply the electrical signals for the user.

15. The apparatus according to claim 1, wherein the individually addressable electrodes include a plurality of signal detection electrodes having relatively smaller size and a plurality of signal application having relatively larger size than the signal detection electrodes, and wherein the individually addressable electrodes are addressed in selectively grouped clusters to form an electrode pattern matching a shape of a targeted biological component.

16. The apparatus according to claim 1, wherein the individually addressable electrodes are addressed in selectively grouped clusters to form an electrode pattern matching a shape of a targeted biological component comprising at least one of a muscle, nervous, lymphatic, organ, skin, sensory and other biological system of the user.

17. The apparatus according to claim 1, wherein a same electrode of the individually addressable electrodes is used to detect the electrical activity and apply the computer controlled serially generated electric signals.

18. An method, comprising:
   providing a wearable electronic garment having individually addressable electrodes for detecting electrical activity from at least one of muscles and nerves of a user and for applying electrical signals to said at least one of muscles and nerves of a user, wherein at least some of the individually addressable electrodes both detect the electrical activity and apply the electrical signals;

detecting the electrical activity received by the individually addressable electrodes from said at least one of muscles and nerves of a user; and generating a plurality of haptic sensory cues capable of being perceived by the user wherein the haptic sensory cues are received from the individually addressable electrodes by the user as computer controlled serially generated electrical signals, and wherein the electrical signals invoke at least one of an involuntary muscle contraction and a perception by the user related to the sense of touch.

19. The method according to claim 18, further comprising;

determining control intentions of the user dependent on the detected activity;

determining an electrical signal having signal characteristics based on the detected activity; and applying the determined electrical signal to control an object dependent on the determined control intentions of the user.

* * * * *